United States Patent
Yamada et al.

(10) Patent No.: US 6,934,494 B2
(45) Date of Patent: Aug. 23, 2005

(54) DRIVING FORCE RECEIVING MEMBER AND DRIVING MECHANISM

(75) Inventors: Yusuke Yamada, Ibaraki-ken (JP); Yutaka Ban, Tokyo (JP); Fumio Tazawa, Abiko (JP); Hironori Minagawa, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/944,133

(22) Filed: Sep. 4, 2001

(65) Prior Publication Data

US 2002/0031638 A1 Mar. 14, 2002

(30) Foreign Application Priority Data

Sep. 4, 2000 (JP) ........................................ 2000-266733
May 30, 2001 (JP) ........................................ 2001-162729

(51) Int. Cl.$^7$ ............................................. G03G 15/08
(52) U.S. Cl. ................. 399/262; 222/DIG. 1; 399/120
(58) Field of Search .................... 222/DIG. 1; 399/120, 399/111, 262, 263, 119

(56) References Cited

U.S. PATENT DOCUMENTS

| 5,149,573 A | 9/1992 | Kobe et al. | .................... 428/93 |
|---|---|---|---|
| 5,307,129 A | 4/1994 | Miura et al. | |
| 5,634,245 A | 6/1997 | Rouser et al. | ................. 24/452 |
| 5,691,021 A | 11/1997 | Kobe | .......................... 428/40.1 |
| 5,482,962 A | 12/1998 | Yamada et al. | ................ 492/18 |
| 6,256,470 B1 * | 7/2001 | Taniyama et al. | ........... 399/262 |

FOREIGN PATENT DOCUMENTS

| JP | 64-49720 | 2/1989 |
|---|---|---|
| JP | 7-44000 | 2/1995 |
| JP | 7-113796 | 12/1995 |
| JP | 10-20744 | 1/1998 |

* cited by examiner

Primary Examiner—Hoang Ngo
(74) Attorney, Agent, or Firm—Fitzpatrick, Cella, Harper & Scinto

(57) ABSTRACT

A driving force receiving member for receiving a driving force from an image forming apparatus includes a driving force receiving portion for receiving the driving force from a driving force applying portion of the image forming apparatus. The driving force receiving portion is movable relative to the driving force applying portion to permit engagement and disengagement relative to the driving force applying portion. The driving force receiving portion is provided with a surface fastener for engaging a surface fastener provided on the driving force applying portion.

39 Claims, 43 Drawing Sheets

DRIVING FORCE RECEIVING MEMBER AND DRIVING MECHANISM

FIELD OF THE INVENTION AND RELATED ART

The present invention relates to a driving force receiving member for receiving a driving force from an image forming apparatus using an electrostatic recording type or an electrophotographic type, and a drive transmission mechanism between the image forming apparatus and the driving force receiving member. More particularly, it relates to a driving force receiving member for receiving a driving force from the image forming apparatus such as a copying machine, a printer, a facsimile machine or the like and a drive transmission mechanism between the image forming apparatus and the driving force receiving member.

In an electrophotographic image forming apparatus such as an electrophotographic copying machine or a printer, a developer, namely, fine toner powder is used. When the toner in the main assembly of the image forming apparatus is used up, the toner is supplied into the main assembly using a toner supply container (toner replenishing container).

Since the toner comprises very fine particles, the toner supply container, when the toner is replenished, is placed inside the image forming apparatus so as to prevent the toner from scattering, and the toner is discharged little-by-little through a small opening, as is known.

With such a system, some toner feeding mechanism is required since the toner does not easily fall by the gravity.

Japanese Patent Application Publication 7-113796, for example, discloses a toner supply container provided with a toner feeding mechanism for such a use. In this example, the toner supply container is generally cylindrical, and a relatively small opening for permitting toner discharging is formed in a part of the outer peripheral surface. Inside the container, there is provided a spiral toner feeding member, which receives a driving force from outside of the container through an end wall of the container.

The toner supply container is kept inside the main assembly of the apparatus in use, and the toner is fed by rotating the toner feeding member by the main assembly side of the apparatus, so that the former is discharged little-by-little through the opening.

On the other hand, Japanese Laid-open Patent Application 7-44000 discloses a toner supply container provided with a toner feeding means. In this example, the toner supply container is in the form of a cylindrical bottle, and the inner surface thereof is provided with a spiral projection, and there is provided a small toner discharge opening adjacent the center of one end of the container.

The toner supply container, as contrasted to the foregoing example, no feeding member is provided inside. It is placed in the main assembly of the apparatus in use, and the main body of the container per se is rotated by a driving force from the main assembly, so that toner is fed out.

In any of the examples, the toner is discharged by driving the feeding member or the main body of the container by receiving a driving force from the main assembly of the image forming apparatus. As for a drive transmitting means for such a purpose, there are some. For example, (1) a gear portion is provided on the outer surface of the toner bottle and is brought into meshing engagement with a driving gear engaged with a driving force so that toner bottle is rotated, (2) a projection for rotational drive is provided on an end surface of the toner bottle, and is engaged with a recess provided in a driving portions of the main assembly of the image forming apparatus so that projection is rotated, and (3) a recess, in place of the projection, is provided in the end surface of the toner bottle and is engaged with a projection provided on the driving portion of the main assembly of the image forming apparatus so that toner bottle is rotated.

However, there are several problems to be solved.

(1) In the first case, it is required to properly engage the gear portion provided on the outer surface of the bottle with a driving gear portion of the main assembly of the image forming apparatus when the toner bottle is inserted into the main assembly, and the operation requires special attention of the user, and therefore, this system places demands on the user. The rotation of the toner bottle by engagement between gears produces a force tending to cause lateral deviation of the toner bottle with the result of the toner bottle deviating to prevent correct rotation. It would be required in order to prevent such a deviation that the entire surface of the toner bottle is enclosed and supported. If this is done, the mounting and demounting of the toner bottle would not be easy. In addition, the structure for the supply system would be complicated, leading to an increase in cost.

(2) In the second and third case, the positioning in the direction of the rotation of the toner bottle is required when the projection (recesses) of the end surface of the toner bottle is brought into the engagement with the recess (projection) of the main assembly driving portion. This degrades the supplying operativity since it places a demand on the user. Even a small deviation might prevent proper drive transmission.

In order to prevent such an improper engagement, a guiding rib may be provided on the outer surface of the toner bottle for indexing, or a rotating operation may be controlled for the proper engagement. These will increase complication and cost of the supplying system.

Most of the coupling drive transmissions using the engagement between projection and recess require the main assembly driving portion is resiliently retractable in case of the phase deviation between the toner bottle and the main assembly driving portion upon the insertion, and the main assembly driving portion takes the normal position upon the phase alignment. With such a structure, even if the rotational phase of the bottle is not aligned with the phase of the main assembly driving portion, the proper engagement is reached sooner or later when the bottle is rotated. However, the structure of the main assembly driving portion is complicated, and an additional space is required to permit retraction of the main assembly driving portion, against downsizing of the main assembly.

SUMMARY OF THE INVENTION

Accordingly, it is a principal object of the present invention to provide a driving force receiving member in which the driving force can be transmitted from the driving force applying portion of the image forming apparatus to the driving force receiving portion of the driving force receiving member.

It is another object of the present invention to provide a developer container in which the driving force can be transmitted from the driving force applying portion of a developer receiving apparatus to the driving force receiving portion of a developer container with a simple manipulation.

It is a further object of the present invention to provide an image bearing member unit in which the driving forces can be transmitted from the driving force applying portion of the image forming apparatus to the driving force receiving portion of an image bearing member unit with a simple manipulation.

It is a further object of the present invention to provide a driving mechanism in which the driving force can be transmitted from the driving force applying portion of the image forming apparatus to the driving force receiving portion of the driving force receiving member with a simple manipulation.

It is a further object of the present invention to provide a driving mechanism in which the driving force can be transmitted from the driving force applying portion of a developer reception apparatus to a driving force receiving portion of the developer container.

It is a further object of the present invention to provide a driving mechanism in which the driving force can be transmitted from the driving force applying portion of the image forming apparatus to the driving force receiving portion of the image bearing member unit.

DESCRIPTION OF THE PREFERRED EMBODIMENTS

Hereinafter, the preferred embodiments of the present invention will be described with reference to the appended drawings.

Figure 1:
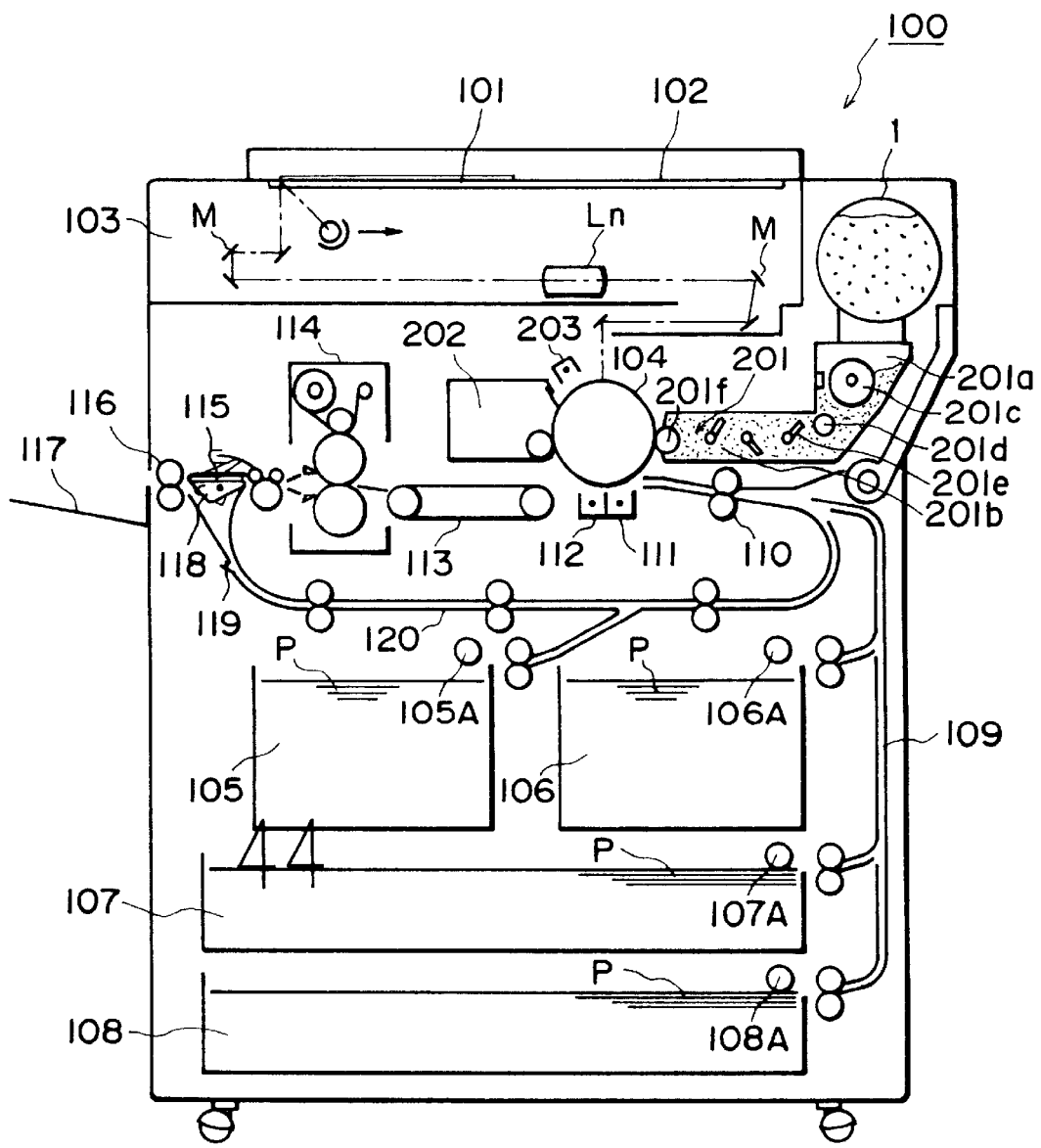
FIG. 1 is a schematic longitudinal sectional view of a main assembly of an image forming apparatus (copying machine) according to an embodiment of the present invention.

First, referring to FIG. 1, an electrophotographic copying machine, that is, an example of an electrophotographic image forming apparatus, in which a toner supply container in accordance with the present invention is mounted, will be described regarding its structure.

Electrophotographic Image Forming Apparatus

In the drawing, a referential code 100 designates the main assembly of an image forming apparatus (which hereinafter will be referred to as apparatus main assembly). A referential code 101 designates an original, which is placed on the original placement platen 102. Consequently, an optical image of the original is formed on the photoconductive drum 104 through a combination of a plurality of mirrors M and a lens Ln of the optical portion 103. Designated by referential codes 105–108 are cassettes. Among the different recording media P (which hereinafter will be referred to as "paper") placed in layers in these cassettes 105–108, a paper P which is most compatible with the data inputted by a user through a control panel shown in FIG. 2, or the paper size of the original 101, is selected based on the paper size information of the cassettes 105–108. The choice of recording medium does not need to be limited to paper. For example, an OHP sheet, or the like, may be used.

A paper P is fed into the apparatus main assembly from one of the plurality of cassettes, and conveyed to a registration roller pair 110, by the corresponding sheet feeding/separating apparatus 105A, 106A, 107A, or 108A, and a paper conveying portion 109. The registration roller pair 110 forwards the paper P in synchronism with the rotation of the photoconductive drum 104 and the scanning timing of the optical portion 103. Designated by referential codes 111 and 112 are a transfer charger and a separation charger, respectively. A toner image having been formed on the peripheral surface of the photoconductive drum 104 is transferred onto the paper P by the transfer charger 111. Then, the paper P onto which the toner image has been transferred is separated from the photoconductive drum 104 by the separation charger.

Thereafter, the paper P is conveyed to a fixing station 114 by a conveying portion 113. In the fixing station 114, the toner image on the paper P is fixed to the paper P by heat and pressure. When the image forming apparatus is in the single-sided mode, the paper P is sent through a reversing portion 115, and is discharged into a delivery tray 117 by a discharge roller pair 116. When in the two-sided mode, the paper P is sent to the registration roller pair 110 through re-feeding paths 119 and 120 by controlling the flapper 118 in the reversing portion 115. Then, it is discharged into the delivery tray 117 after being put through the image formation path through which the paper P is put when in the single-sided mode.

When in the multilayer mode, the paper P is sent through the reversing portion 115, and is partially discharged out of the apparatus by the discharge roller pair 116. Then, while the trailing end of the paper is still held by the discharge roller pair 116 after passing through the flapper 118, the discharge roller pair 116 is reversely rotated at the same time as the flapper 118 is controlled. Consequently, the paper P is sent back into the apparatus main assembly 100. Then, the paper is conveyed again to the registration roller pair 110 through the conveying portions 119 and 120, and is discharged into the delivery tray through the same path as that through which the paper P is sent when in the single-sided mode.

In the apparatus main assembly 100 structured as described above, a developing station 201, a cleaning station 202, a primary charging station 203, and the like, are disposed around the photoconductive drum 104. The developing station 201 develops, with the use of toner, an electrostatic latent image having been formed on the photoconductive drum 104. The apparatus main assembly 100 is provided with a toner supply container 1 for supplying the developing station 201 with toner. The toner supply container 1 is removably mountable into the apparatus main assembly 100 by a user. The developing station 201 has a toner hopper 201a and a developing device 201b. The toner hopper 201a is provided with a stirring member 201c. After being stirred by the stirring member 201c, toner is sent to the developing device 201b by a magnetic roll 201d. The developing device 201b has a development roller 201f and a toner conveying member 201e. After being sent from the toner hopper 201a to the toner conveying member 201e by the magnetic roll 201d, toner is sent by the toner conveying member 201e to the development roller 201f, by which toner is supplied to the photoconductive drum 104.

The cleaning station 202 is provided for removing the toner particles remaining on the photoconductive drum 104. The primary charger 203 is provided for charging the photoconductive drum 104.

Figure 2:
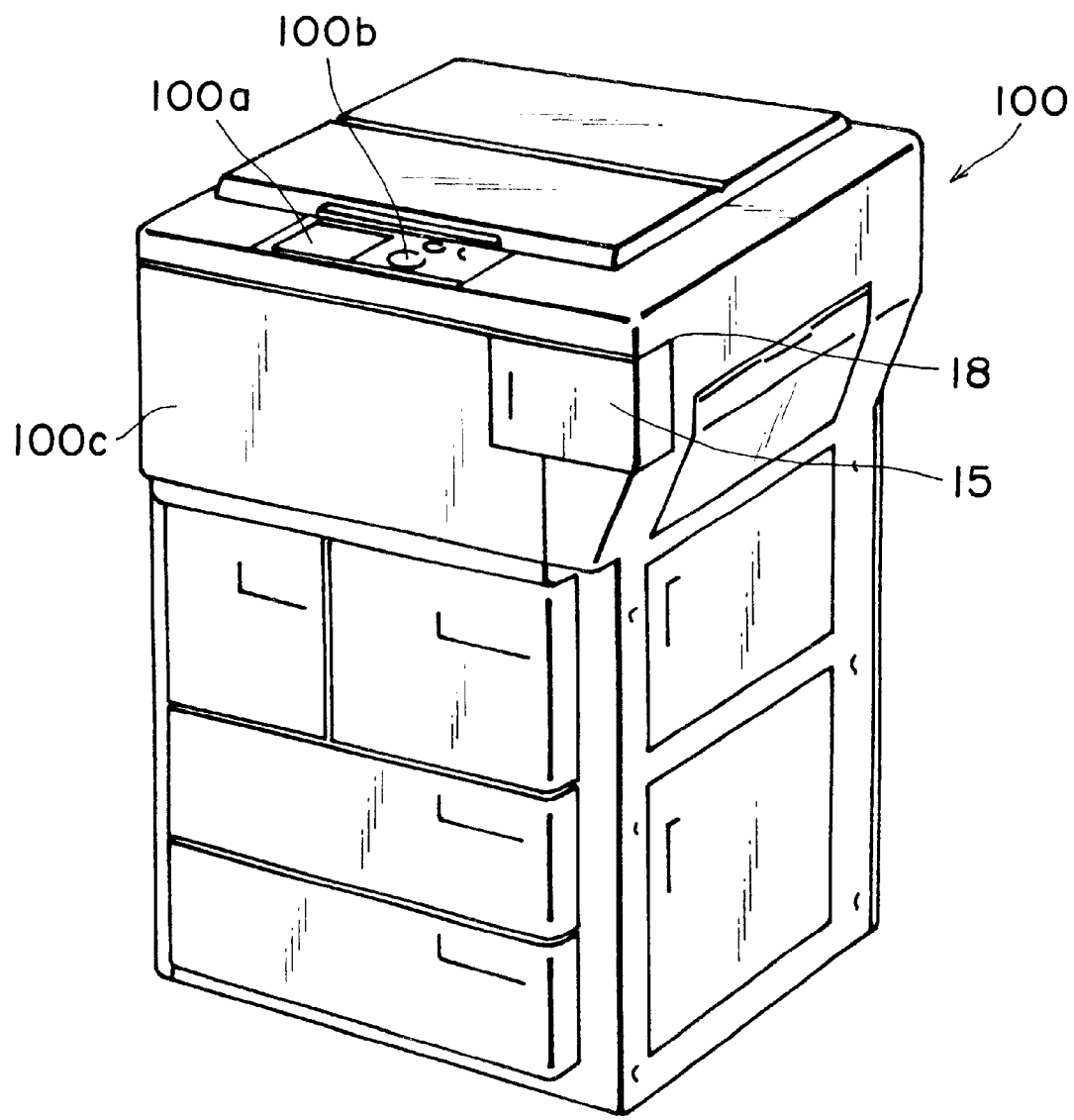
FIG. 2 is a perspective view of the electrophotographic copying machine.
Figure 3:
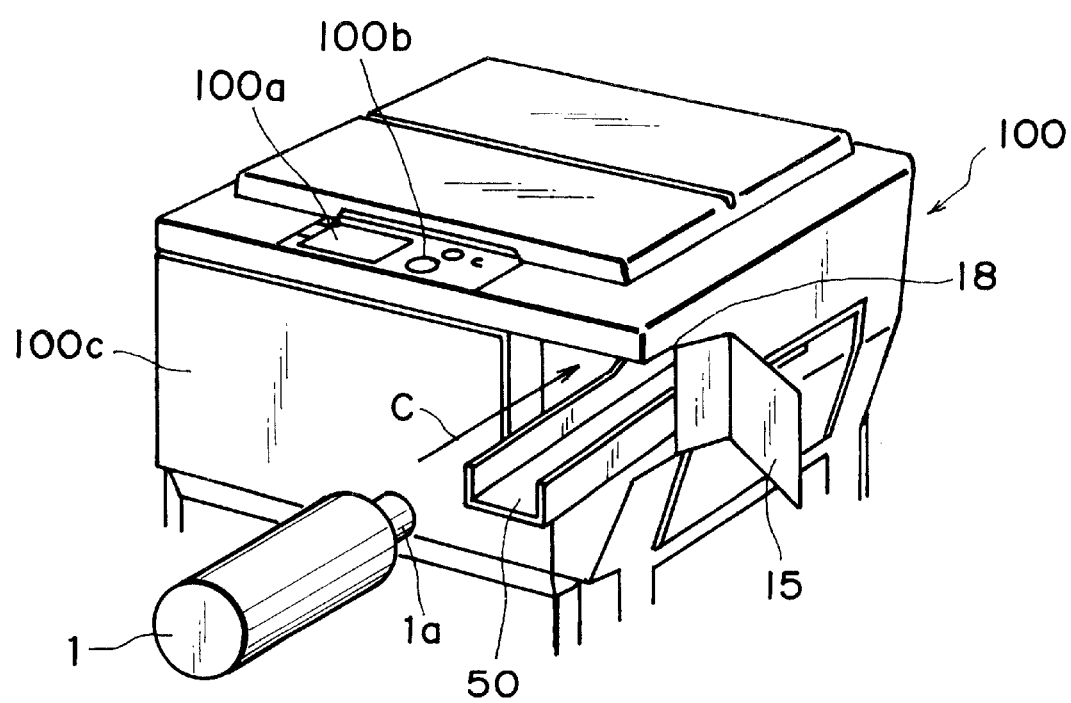
FIG. 3 is a perspective view illustrating mounting of a toner supply container into an electrophotographic copying machine, a toner container exchange cover of which is opened.

When a cover 15 for replacing a toner supply container (which hereinafter will be referred to as container placement cover), which is a part of an external cover shown in FIG. 2, is opened by a user as shown in FIG. 3, a container holder 50 is pulled out to a predetermined position by a driving system (unshown). The toner supply container 1 is placed on this container holder 50. When the user removes the toner supply container 1 from the apparatus main assembly 100, the user removes the toner supply container 1 on the container holder 50 after the container holder 50 is pulled out. The container placement cover 15 is such a cover that is dedicated for mounting or dismounting (exchanging) the toner supply container 1. Therefore, it is opened or closed only for mounting or dismounting the toner supply container 1. The maintenance of the apparatus main assembly 100 is performed by opening the front cover 100c.

The provision of the container holder 50 is not mandatory; the toner supply container 1 may be directly mounted into, or dismounted from, the apparatus main assembly 100.

Embodiment 1

Next, referring to FIGS. 4 and 5, the first embodiment of the toner supply container in accordance with the present invention will be described.

Figure 4:
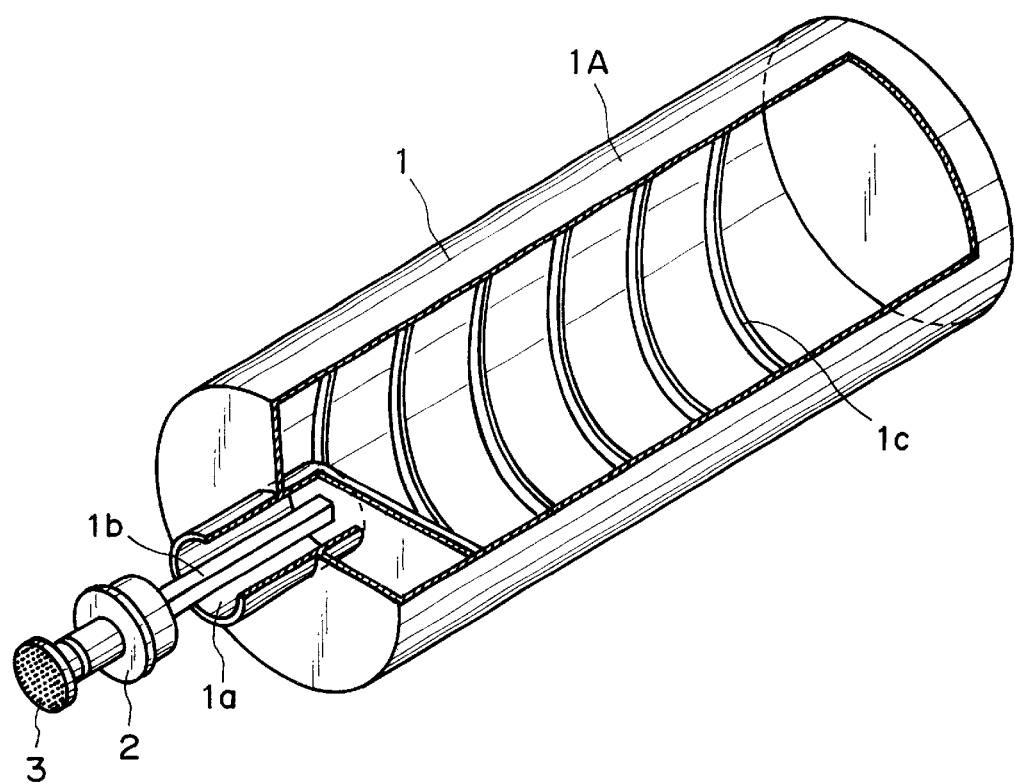
FIG. 4 is a perspective view of a toner container according to an embodiment of the present invention.
Figure 5:
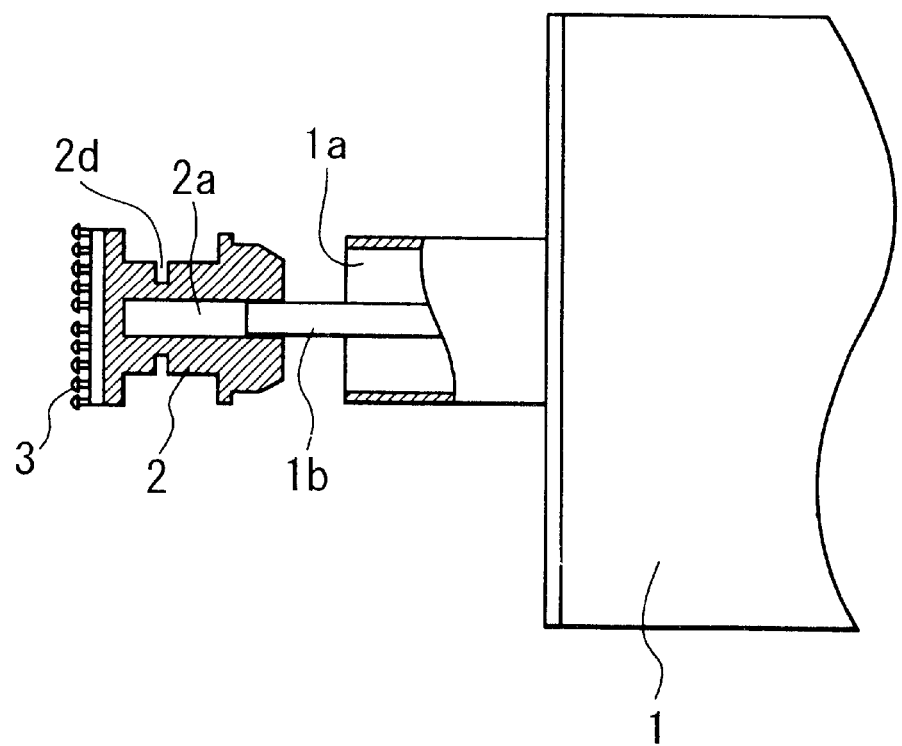
FIG. 5 is a partial enlarged sectional view of a drive transmitting portion.

FIG. 4 is a perspective view of an example of this embodiment of the toner supply container, and FIG. 5 is a sectional view of the driving force transmitting portion of the toner container, for showing the structure thereof.

Toner Supply Container

The toner supply container 1, which hereinafter may sometimes be referred to as the toner bottle, is virtually cylindrical, and has a toner outlet 1a, which is smaller in diameter than the main structure of the toner bottle 1, and projects from the approximate center of the outward surface of one of the end walls of the toner bottle 1. The toner outlet 1a is provided with a sealing member for sealing the toner outlet 1a. The sealing member 2 is slidable in the axial direction of the toner bottle 1 to open or close the toner outlet 1a. The end of the sealing member 2 is provided with the toner supply container side 3, that is, one of the two pieces of a surface (surface-to-surface) fastener, which engages with the main assembly side 30, that is, the other of the two pieces of the surface fastener 30, which is attached to the surface of the driving portion 20 (FIG. 9) of the image forming apparatus main assembly, which will be described later, to transmit rotational force to the toner bottle 1. The configurations of the two sides 3 and 30 of the surface fastener will be described later in detail.

First, the internal structure of the toner bottle 1 will be described.

The toner bottle 1 has a virtually cylindrical shape, and is approximately horizontally disposed within the image forming apparatus main assembly. It is structured to rotate by receiving a rotational force from the apparatus main assembly 100. The toner bottle 1 has a spiral rib 1c, which is provided on the internal surface of the bottle 1. As the toner bottle 1 rotates, the toner therein is conveyed in the axial direction of the bottle 1 along the spiral rib 1c, and is discharged from the toner outlet 1a located at one end of the toner bottle 1.

There are no specific requirements regarding the shape and internal structure of the toner bottle 1 in accordance with the present invention. In other words, the shape and internal structure of the toner bottle 1 do not matter as long as the toner therein is discharged from the toner outlet 1a by the rotation of the toner bottle 1. The gist of the present invention is that a toner supply container, or the toner bottle 1, which discharges the toner therein as the toner bottle 1 is driven, is provided with one of the two sides of a surface fastener, and this side 3 of the surface fastener is attached to the driving force receiving portion of the toner bottle 1. Thus, as far as the structure of the toner bottle 1 is concerned, it does not matter whether the internal surface of the toner bottle 1 is provided with the spiral rib 1c as an ordinary toner bottle is structured, or is differently structured from the spiral ribs 1c.

FIG. 4 shows an example of an ordinarily structured toner bottle, that is, a toner bottle in which the spiral rib 1c is disposed.

The type of the method for driving the toner bottle 1 in accordance with the present invention does not need to be limited to the rotational driving method as the method in this embodiment; there are no specific requirements regarding the method for driving the toner bottle 1, as long as the toner within the bottle is properly discharged from the toner outlet 1a. For example, the toner supply container, or the toner bottle 1, may be vibrated, oscillated, or may be driven by any other driving method, as long as the toner is properly discharged. In other words, as far as the present invention is concerned, as long as a toner supply container, or the toner bottle 1, is structured so that it properly discharges the toner therein as it rotates by receiving driving force from the image forming apparatus main assembly 100, any driving method may be employed; for example, the toner supply container may be rotationally driven, oscillated, or vibrated.

The main structure 1A of the toner bottle 1 is provided with the toner outlet 1a and a drive shaft 1b. The toner outlet 1a is attached to one of the end walls of the toner bottle main structure 1A, and the drive shaft 1b is integral with the toner bottle main structure 1A and projects outward through the toner outlet 1a. The drive shaft 1b approximately coincides with the toner outlet 1a in terms of axial line, and fits in the hole 2a of the sealing member 2. The drive shaft 1b is provided for transmitting rotational driving force to the bottle main structure 1A from the apparatus main assembly 100 by way of the sealing member 2. Thus, the drive shaft 1b having such a cross section enables the drive shaft 1b to transmit rotational driving force to the toner bottle main structure 1A; the cross section of the drive shaft 1b is in the form of a square, a letter H or D, or the like. Further, the drive shaft 1b is solidly fixed to the bottom main structure 1A.

Sealing Member

Figure 6:
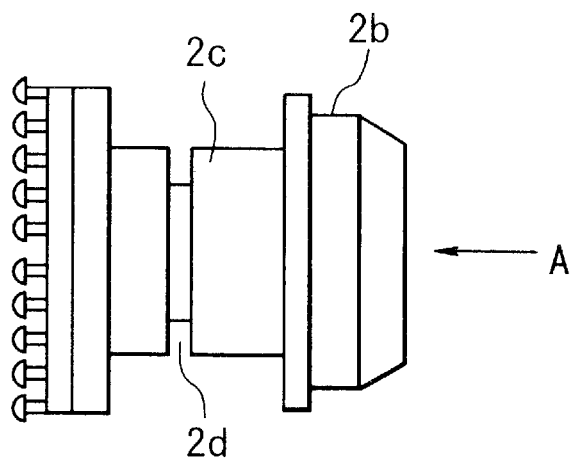
FIG. 6 is a side view of a sealing member of the toner supply container.
Figure 7:
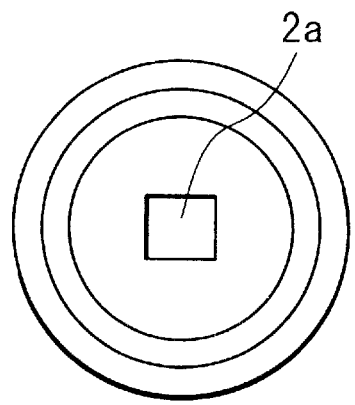
FIG. 7 is a view as seen in the direction of arrow A shown in FIG. 6.

Next, referring to FIGS. 6–8, the sealing member 2 will be described. FIG. 6 is a front view of the sealing member 2, and FIG. 7 is a plan of the sealing member 2 as seen from the direction indicated by an arrow mark A in FIG. 6. FIG.

8 is a sectional view of the sealing member 2 at a plane inclusive of the axial line of the sealing member 2.

Figure 8:
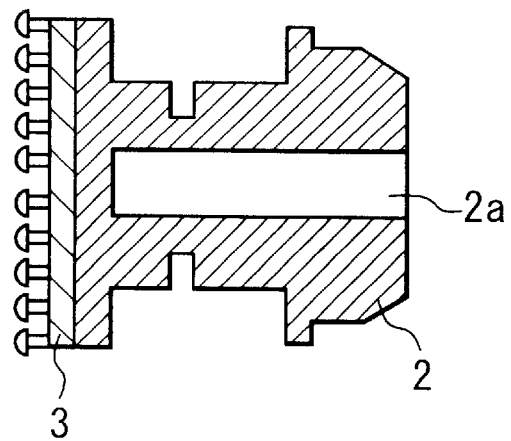
FIG. 8 is a sectional view of the device shown in FIG. 6.

In FIGS. 6–8, a referential code 2b designates a sealing portion which enables the sealing member 2 to resealably seal the toner outlet 1a of the toner supply container 1. The external diameter of the sealing portion 2b is rendered greater than the internal diameter of the toner outlet 1a by an appropriate amount for sealing the toner outlet 1a. As the sealing portion 2b is pressed into the toner outlet 1a, the toner supply hole, that is, the hole of the toner outlet 1a, is hermetically sealed.

The sealing member 2 is provided with a hole 2a, through which the drive shaft 1b is fitted so that the driving force which the sealing member 2 receives from the apparatus main assembly 100 is transmitted to the driving shaft 1b. The axial line of this hole 2a coincides with that of the sealing member 2. The hole 2b extends through the sealing portion 2b and coupling portion 2c of the sealing member 2. The cross section of the hole 2b is the same in shape as the drive shaft 1b, and is rendered slightly larger in size than the drive shaft 1b. Thus, the drive shaft 1b loosely fits in the hole 2a. More specifically, the cross sections of the hole 2a and drive shaft 1b are polygonal. In this embodiment, they are square.

Since the drive shaft 1b loosely fits in the hole 2a, the bottle main structure 1A and sealing member 2 lock with each other in terms of the rotational direction of the toner bottle main structure 1A, while being allowed to freely move relative to each other in terms of their axial direction. Thus, when the toner supply container is mounted into the toner supplying apparatus, the sealing member 2 can be separated from the toner bottle main structure 1A to unseal (open) the toner outlet hole, as will be described later.

The length by which the hole 2a and drive shaft 1b engage with each other in terms of their axial direction is sufficient to prevent the drive shaft 1b from becoming disengaged from the hole 2a when the sealing member 2 is separated from the toner bottle main structure 1A. Thus, even when the sealing member 2 is apart from the toner bottle main structure 1A, the drive shaft 1b can receive driving force through the sealing member 2.

Although the sealing member 2 is preferred to be formed of resinous material such as plastic by injection molding, it may be formed of a material other than resinous material and by a manufacturing method other than injection molding. Further, it may be formed in one piece, or may be molded in multiple pieces, which are joined together. Further, the sealing member 2 is required to have a proper amount of elasticity so that it can be pressed into the toner output 1a to hermetically seal the toner outlet 1a. For this purpose, the low density polyethylene is most desirable as the material for the sealing member 2. Also polypropylene or a straight chain polyamide, that is, nylon in commercial name, high density polyethylene, or the like, may be used with desirable results.

Structure of Surface Fastener

Figure 9:
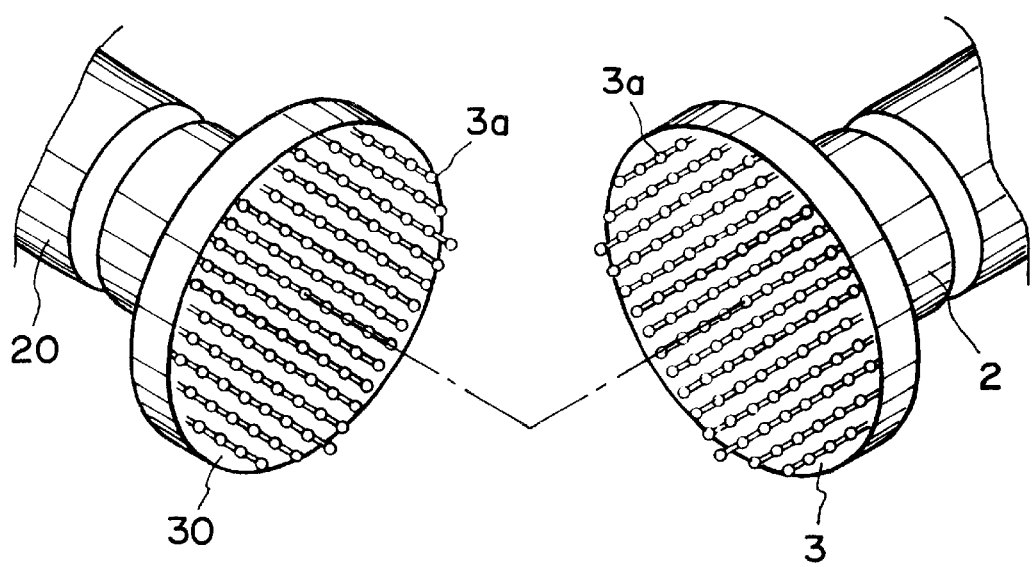
FIG. 9 is a perspective view of a drive transmitting portion according to Embodiment 1 of the present invention.
Figure 10:
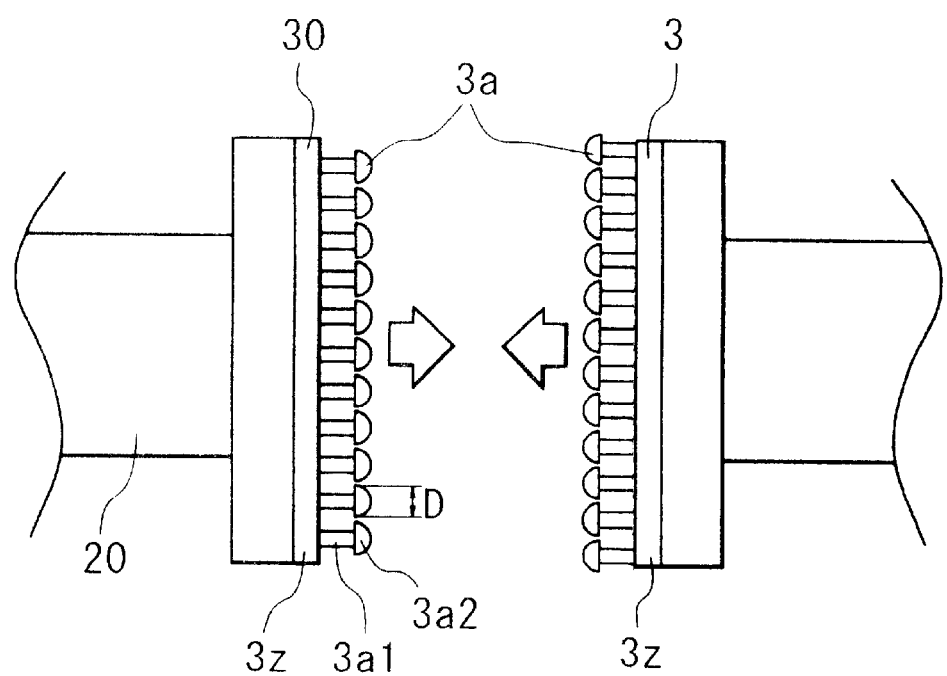
FIG. 10 is a side view of a drive transmitting portion according to Embodiment 1 of the present invention.

Next, referring to FIGS. 9 and 10, the structure of the toner supply container side 3 of a surface fastener, which best characterizes the present invention, will be described.

The toner supply container side 3 of the surface fastener constitutes the driving force receiving portion of the toner supply container 1, and receives driving force from the driving force transmitting portion 30 of the driving force transmitting portion of the toner supplying apparatus.

As for the definition of a surface fastener in present invention, it means fastening means which comprises two sides, the functional surface of each of which has a plurality of tiny elastically deformable projections (stems) 3a, and which are engageable with each other at the projections by pressing one of its two sides to the other, or it may means either one of the two sides of such fastening means. More specifically, each projection 3a of the functional surface comprises a stem portion 3a1 and a head portion 3a2. The head portion 3a2 of the projection 3a is greater in diameter than the stem portion 3a1, and is rendered semispherical, on the side opposite to the stem portion 3a1. Thus, as the two sides of the connecting means are pressed against each other, functional surface to functional surface, the projections on the functional surface of one side lock with those on the functional surface of the other side.

The projection 3a is integral with the base 3z, or is integrally attached to the base 3z. The base 3z in this embodiment is shaped like a disk. However, the shape of the base 3z does not need to be limited to that of a disk. For example, it may be that of a hollow cone. When the base 3z is in the form of a hollow cone, if the projections 3a on the driving side are on the outward side of the hollow cone, the projections 3a on the driven side will be on the inward side of the hollow cone, and vice versa.

As for one aspect of the essential characteristics of a surface fastening means, the functional surface of the toner supply container side 3 of the surface fastener, and the functional surface of the main assembly side 30 of the surface fastener, are provided with a large number of the above described projections 3a. Thus, as the two sides 3 and 30 of the surface fastening means are pressed to each other, with the two functional surfaces facing each other, the two sides 3 and 30 are securely bonded to each other, providing the surface fastening means with a large amount of tensile disengagement force. This is due to the fact that even though each projection 3a is very tiny, the two sets of the large number of the projections 3a engage with each other. On the other hand, all that has to be done in order to separate the two sides 3 and 30 of the surface fastening means, is to individually disengage each projection 3a of one side of the surface fastening means from only a small number of the projections 3a of the other side, requiring only a small force. In other words, the surface fastening means is characterized in that two sides of the surface fastening means can be easily connected or disconnected.

Another aspect of the essential characteristics of a surface fastening means is that when the surface fastening means in accordance with the present invention is used as a coupling means, the coupling means does not require the rotational phase synchronization between the two sides of the coupling as is required by a conventional coupling comprising a male side and a female side. This is due to the fact that the large number of very tiny elastically deformable projections 3a, with which the functional surface of each side of the surface fastening means, or the coupling means in this embodiment, are provided, are evenly distributed across the entirety of the functional surface, and therefore, the two sets of the large number of the projections mesh with each other regardless of the rotational phase synchronization between the two sides; in other words, two sides securely bond with each other. Therefore, when a user replaces the toner bottle 1 in the apparatus main assembly with a brand-new toner bottle 1, the user can set the replacement toner bottle 1 in the apparatus main assembly 100 without being concerned with the rotational phase of the replacement toner bottle 1. In other words, the employment of the surface fastening means as a means for coupling the toner bottle 1 with the driving force transmitting portion of the apparatus main assembly 100 drastically improves the operability of the apparatus, and eliminates the coupling failure which results from the synchronism in rotational phase, or the like problems.

The toner supply container side 3 of the surface fastening means is attached to the end of the sealing member 2, and engages with the main assembly side 30 of the surface fastening means attached to the end of the driving force transmitting portion of the apparatus main assembly 100. It plays a role in transmitting the driving force from the apparatus main assembly 100 to the toner bottle 1 through the sealing member 2.

Figure 11:
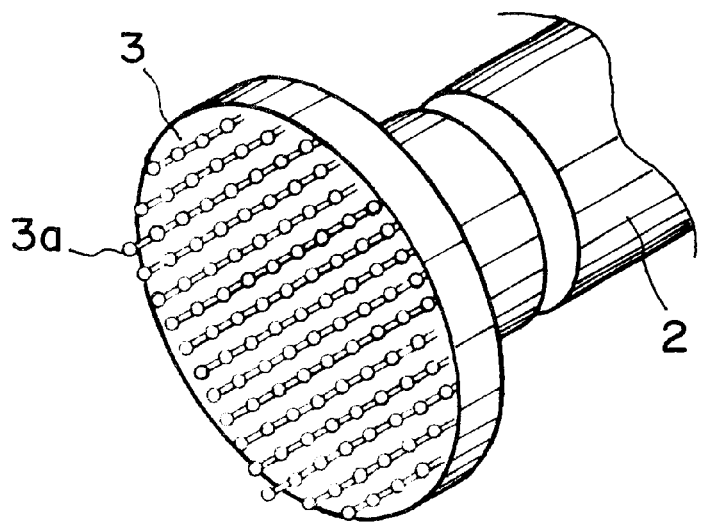
FIG. 11 is a perspective view of an example of connection between a surface fastener and a sealing member.
Figure 12:
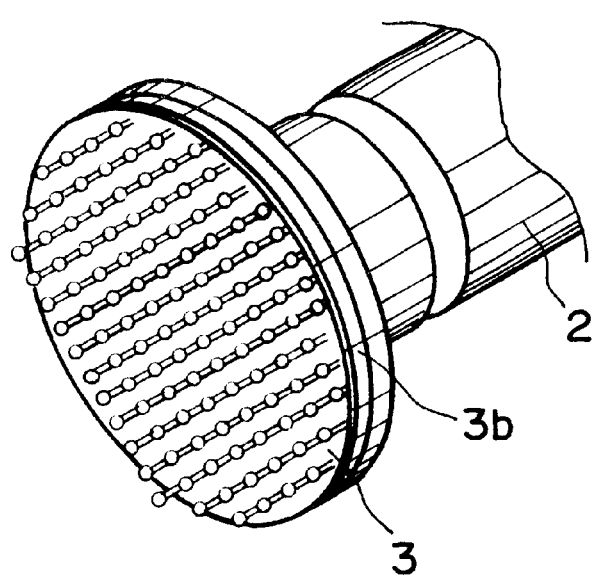
FIG. 12 is a perspective view, an example of a connection between a surface fastener and a sealing member.
Figure 13:
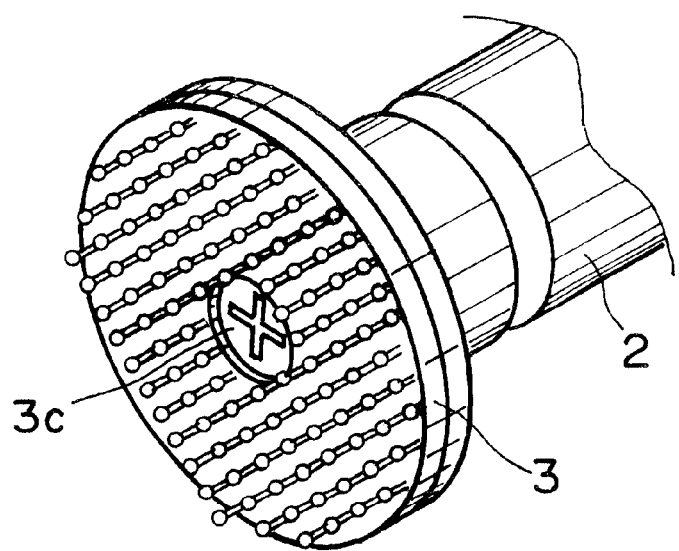
FIG. 13 is a perspective view, an example of a connection between a surface fastener and a sealing member.

Although the toner supply container side 3 of the surface fastening means in this embodiment is attached to the end of the sealing member 2, this side 3 of the surface fastening means may be molded as an integral part of the sealing member 2 as shown in FIG. 11. Further, this side 3 of the surface fastening means may be solidly adhered to the surface of the sealing member 2, with the interposition of an adhering member 3b between the back side of the side 3 of the surface fastening means and the surface of the sealing member 2 as shown in FIG. 12. Further, the toner supply container side 3 may be attached to the end of the sealing member 2 with the use of any of many methods other than the above mentioned ones, for example, a small screw, a bolt, or the like.

Figure 14:
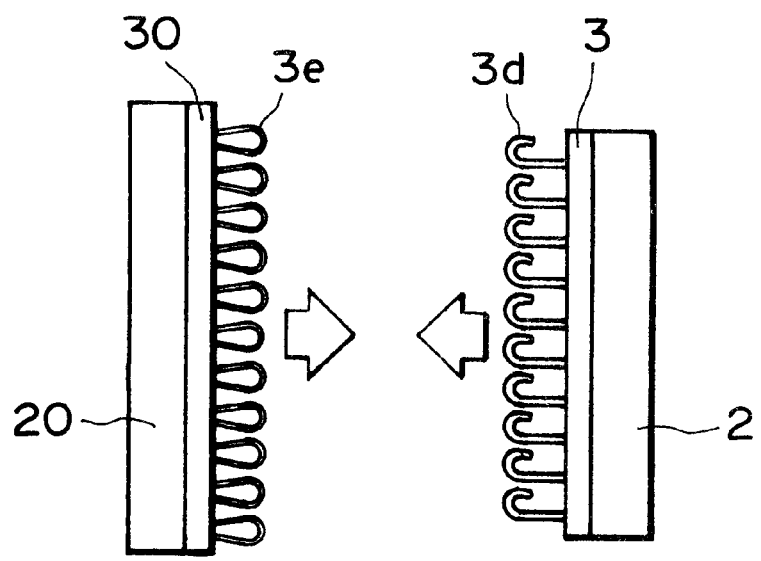
FIG. 14 is a side view of another example of a surface fastener.
Figure 15:
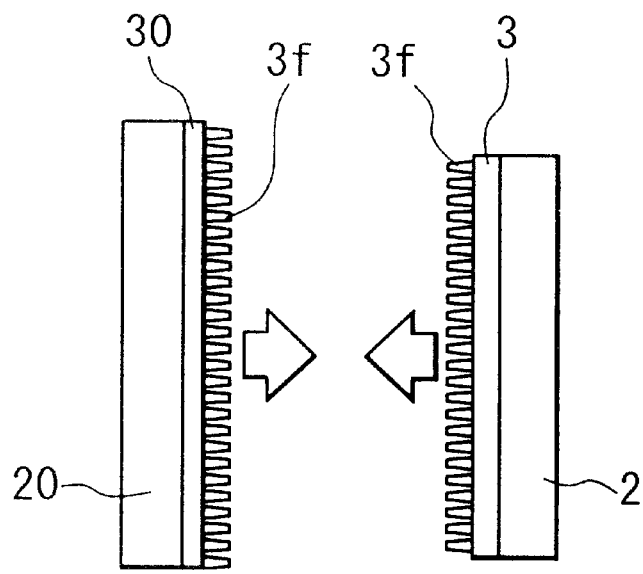
FIG. 15 is a side view of another example of a surface fastener.
Figure 16:
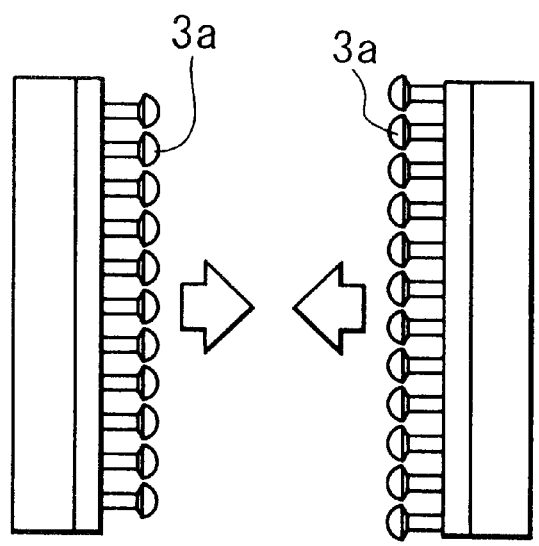
FIG. 16 is a side view of another example of a surface fastener.
Figure 17:
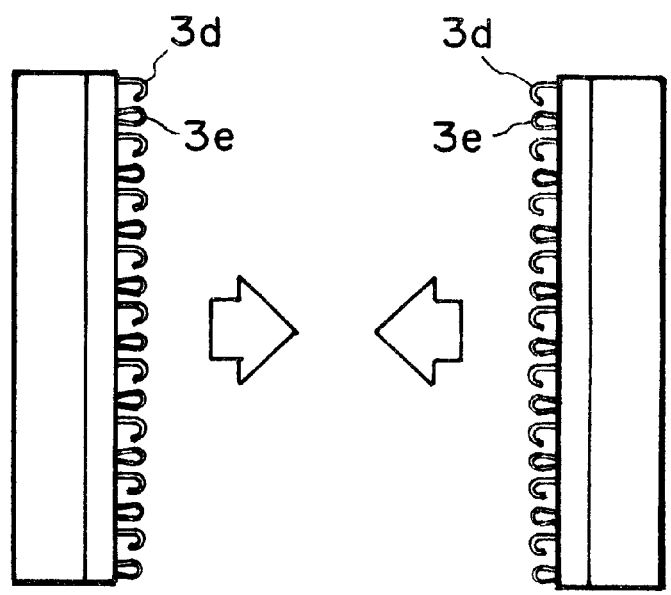
FIG. 17 is a side view of another example of a surface fastener.
Figure 18:
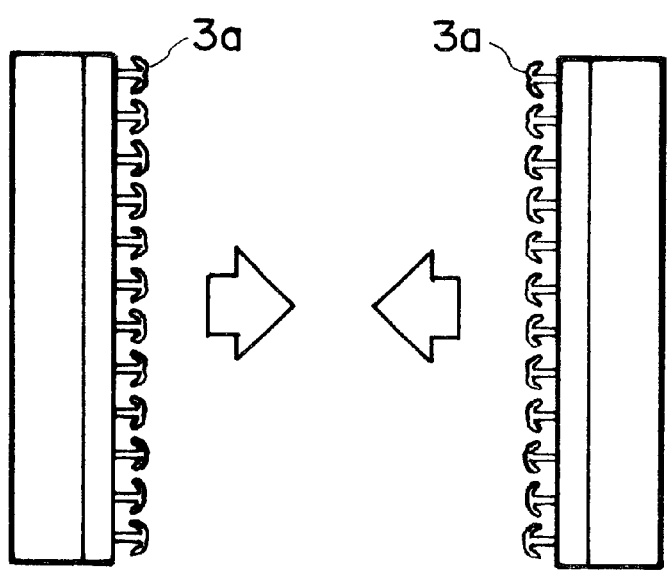
FIG. 18 is a side view of another example of a surface fastener.
Figure 19:
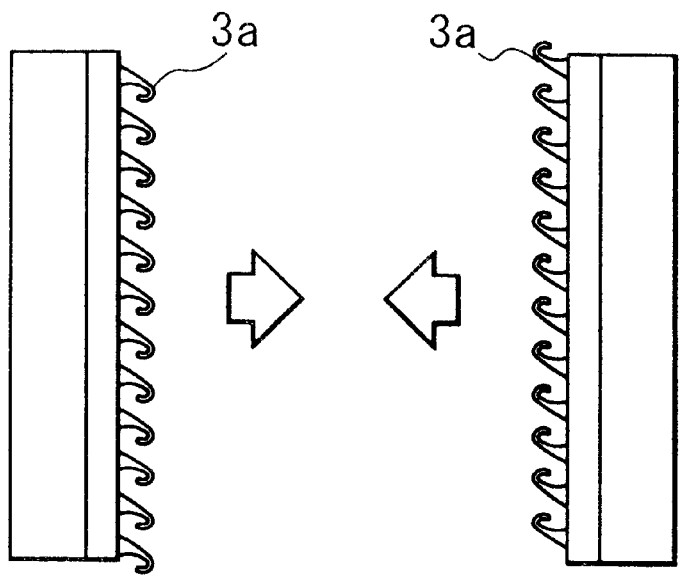
FIG. 19 is a side view of another example of a surface fastener.
Figure 20:
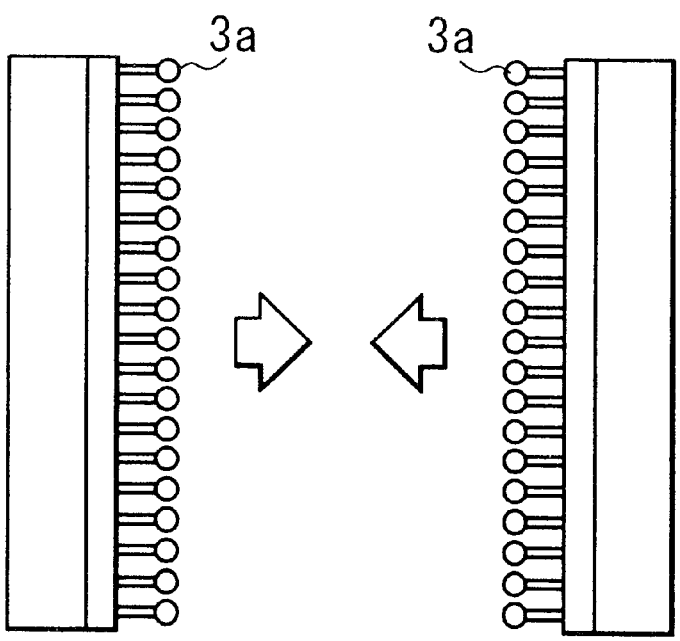
FIG. 20 is a side view of another example of a surface fastener.

As for the configuration of the projection 3a of both sides 3 and 30 of the surface fastener, there are various types which are shown in FIGS. 14–20, besides the above described projection 3a comprising the mushroom-like head and stem, and any of these configurations may be employed. In FIG. 14, the fastening means is a combination of a set of a large number of hooks 3d (male side) and a set of a large number of loops 3e (female side), and in FIG. 15, it is a combination of two sets of a large number of projections 3f in the form of a truncated pyramid. In FIG. 16, the fastening means is a combination of two sets of a large number of projections, which have a stem portion and a head portion, the head portion having a semispherical portion, as the end portion, and a truncated cone-like portion, as the base portion, and in FIG. 17, it is a combination of two sets of a mixture of a large number of alternately positioned hooks 3d and loops 3e. Further, the fastening means may be a combination of two sets of a large number of projections in the form of a letter T as shown in FIG. 18, or a combination of two sets of a substantial number of projections in the form of the crest of a wave as shown in FIG. 19. Also, the fastening means may be a combination of two sets of a substantial number of projections comprising a spherical head portion and a stem portion. In other words, there are no specific requirements regarding the configuration of the fastening mechanism of the surface fastener, and the fastening mechanism of the surface fastener may assume any shape according to intended usage. There are also no specific requirements regarding the measurements of the entirety of the surface fastener, and the measurements of the components of the fastening mechanism thereof.

As far as the present invention is concerned, it is unnecessary that the fastening mechanism be one of the combinations of two sets of projections shown in FIGS. 14–20. For example, the fastening mechanism may be a combination of two sets of a substantial number of projections, which are different in projection configuration, such as a combination of a set of a substantial number of alternately positioned hooks 3d and loops 3e as shown in FIG. 17, and a set of a substantial number of projections in the form of a wave crest a shown in FIG. 19. As is evident from the above description, according to the present invention, there ares no specific requirements regarding projection configuration and projection combination. In other words, as long as two sides of the fastening mechanism securely bond with each other, any shape may be employed as the projection shape, and the two sides of the fastening mechanism of the surface fastener may be the same or different in configuration, projection form, projection mixture, and the like. Further, the current driving force receiving side of the fastening mechanism can also be used as the driving force transmitting side of the fastening mechanism, and vice versa. In other words, referring to FIG. 14, the toner supply container side 3 of the fastening mechanism, which has hooks 3d, may be used as the driving side of the fastening mechanism, while using, as the following side, the main assembly side 30 of the fastening mechanism, which has the loops 3e.

Further, the projection (stem) arrangement may be freely varied to change the direction in which the projections on one side engage with the corresponding projections on the other side, so that the surface fastener is reduced in the directionality of tensile disengagement force, or is increased or reduced in tensile disengagement force.

Figure 21:
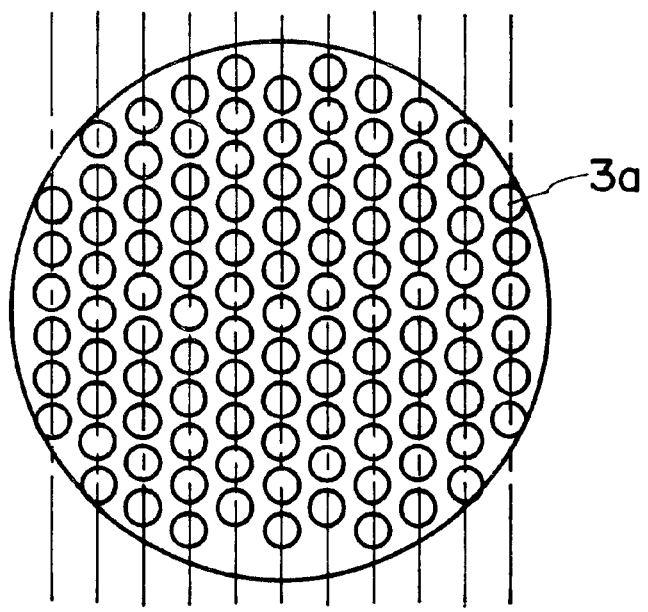
FIG. 21 is a front view illustrating an arrangement pattern of a surface fastener.
Figure 22:
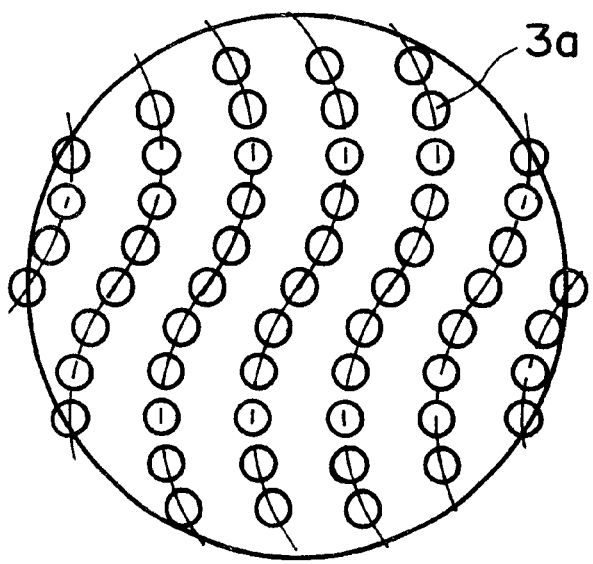
FIG. 22 is a front view illustrating an arrangement pattern of a surface fastener.
Figure 23:
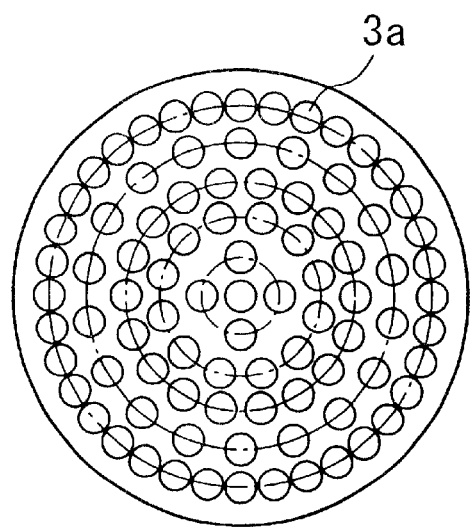
FIG. 23 is a front view illustrating an arrangement pattern of a surface fastener.

In other words, the tensile disengagement force of the surface fastener in terms of the thrust or radial direction of the surface fastener can be controlled by changing the arrangement of the projections. For example, the projections may be arranged in parallel straight lines as shown in FIG. 21, in parallel curved lines as shown in FIG. 22, in concentric lines as shown in FIG. 23, or in the like manners. Further, when the surface fastener needs to be increased in tensile disengagement force, it has only to be increased in projection density. The opposing two sets of the projections of the surface fastener do not need to be the same in projection arrangement. For example, the opposing two sets of projections may be rendered different in projection arrangement as shown in FIGS. 21 and 22, in FIGS. 22 and 23, or in FIGS. 21 and 23, respectively.

Further, the projections may be freely varied in height and/or shape to allow the opposing two sets of projections to smoothly mesh with each other while increasing the tensile disengagement force of the surface fastener. In other words, the present invention does not restrict the surface fastener for the toner bottle, in terms of projection shape or projection arrangement; they may be freely designed.

In this embodiment, the length of the projection 3a of the toner supply container side 3 of the surface fastener is desired to be in a range of 0.5–5.0 mm, preferably, in a range of 1.0–2.0 mm. The diameter of the projection 3a is desired to be in a range of 0.1–2.0 mm, preferably, in a range of 0.5–1.0 mm.

As for the material for the surface fastener described above, resinous material such as plastic is desirable, and as for the production method therefor, injection molding is desirable. However, the material and production method other than the above may be employed. The toner supply container side 3 and main apparatus side 30 of the surface fastener are required to have a proper amount of elasticity, when they are engaged or disengaged. Therefore, it is preferable that resinous material, for example, polyolefin resin, straight chain polyamide resin such as Nylon (commercial name), polypropylene resin, or the like is employed as the material for the toner supply container side 3 and main apparatus side 30 of the surface fastener.

Toner Supply Container Replacement Method

Next, a method for replacing a toner supply container will be described.

As virtually the entirety of the toner within the toner bottle 1 is consumed through image formation, the virtually empty condition of the toner bottle 1 is detected by the toner supply container emptiness detecting means of the apparatus main assembly 100, and a user is informed through a displaying means 100b (FIG. 2) such as a liquid crystal display that the virtually the entirety of the toner within the toner supply container has gone.

The toner supply container 1 in this embodiment is replaced by a user. The replacement procedure is as follows.

Figure 24:
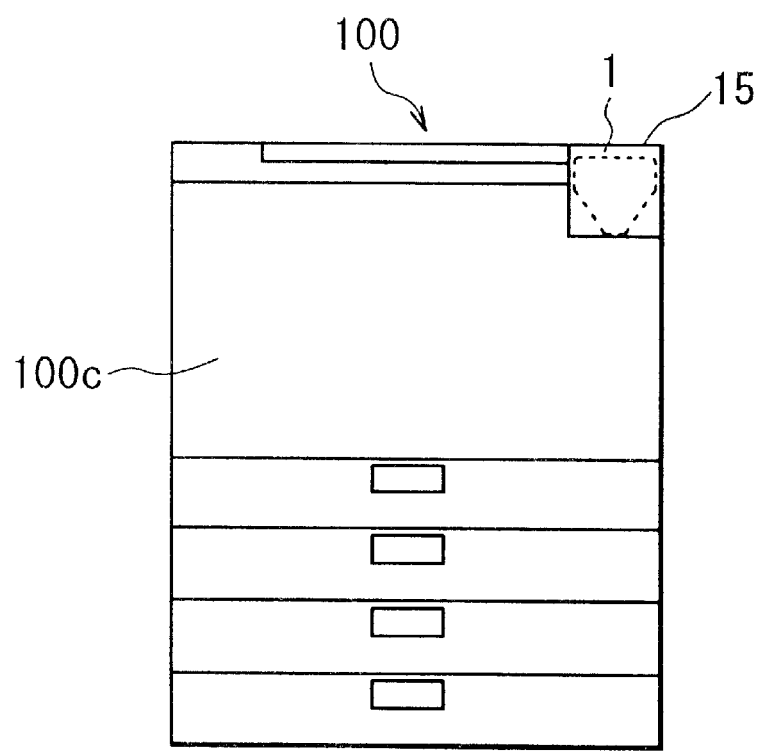
FIG. 24 is a front view of an electrophotographic copying machine.
Figure 25:
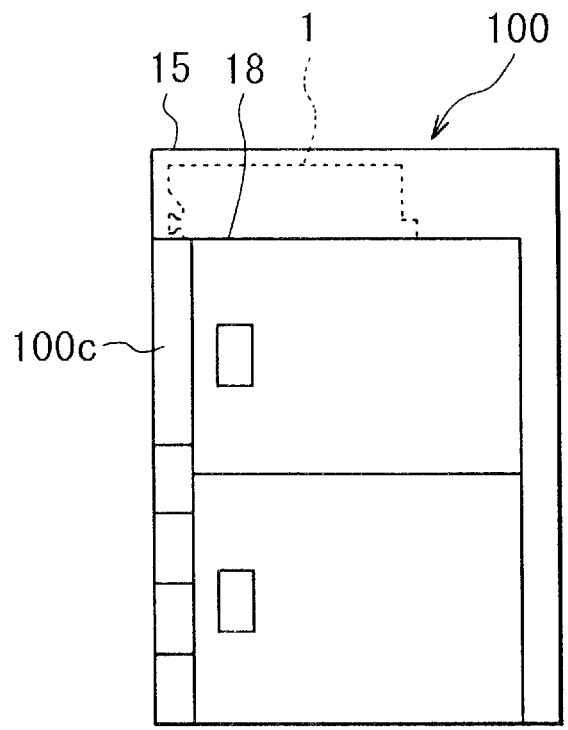
FIG. 25 is a side view of an electrophotographic copying machine.
Figure 26:
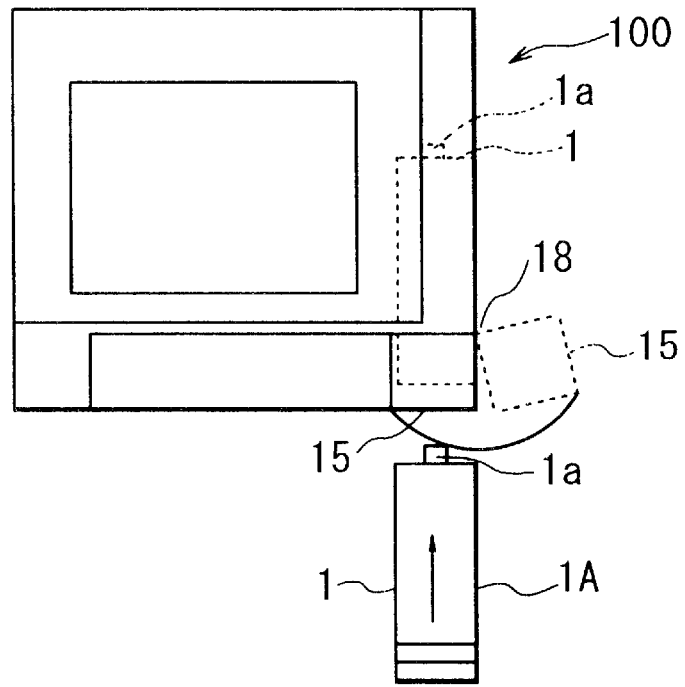
FIG. 26 is a top plan view of an electrophotographic copying machine, a toner container exchange cover of which is opened.

First, referring to FIGS. 2, 24, and 25, the closed cover 15 for toner supply container replacement is opened; it is rotated to the position contoured in a broken line in FIG. 26 about the hinge 18 as shown in FIGS. 3 and 26. As the cover 15 is opened, the toner bottle 1 is moved in the direction indicated by an arrow mark in FIG. 28, by a means for opening or closing the toner supplying portion, the movement of which is linked to the movement of the cover 15, and which will be described later. As a result, the sealing member 2 (FIG. 29), which has been at a position at which the sealing member 2 is apart from the toner outlet 1a of the toner supply container 1, leaving therefore the toner bottle 1 open, is pressed into the toner outlet 1a, closing therefore the toner bottle 1 (FIG. 28).

Figure 27:
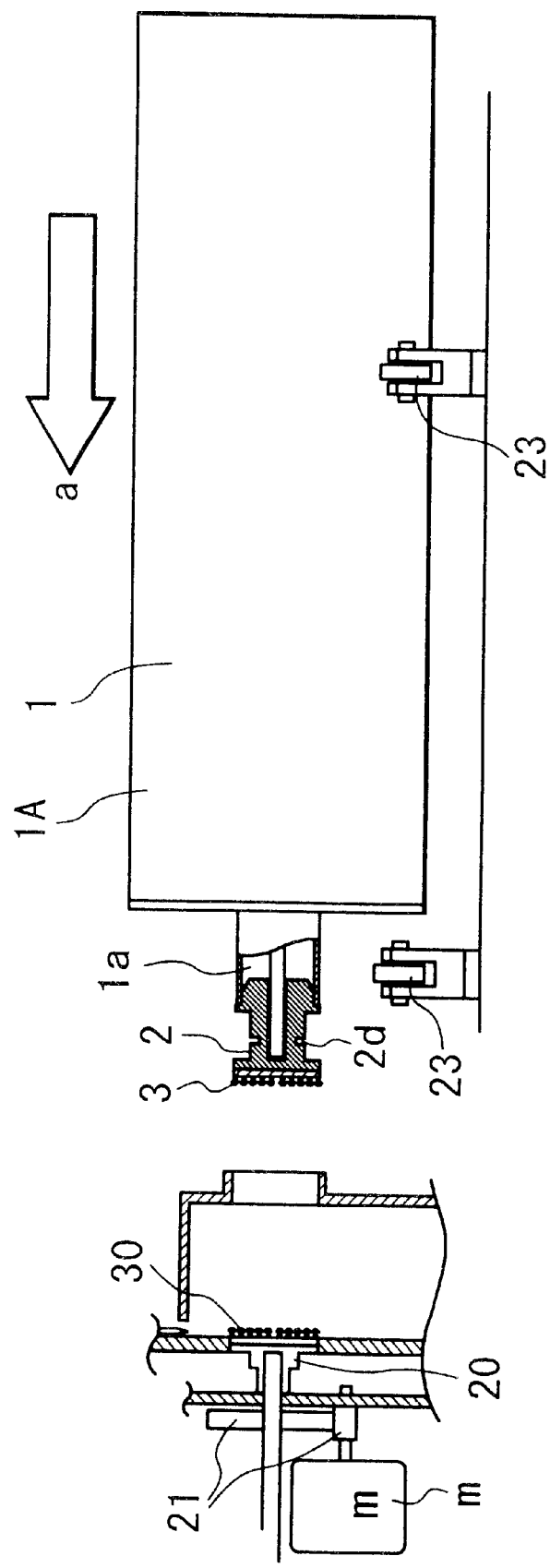
FIG. 27 is a side view illustrating a mounting operation of a toner supply container (start of mounting) according to an embodiment of the present invention.
Figure 28:
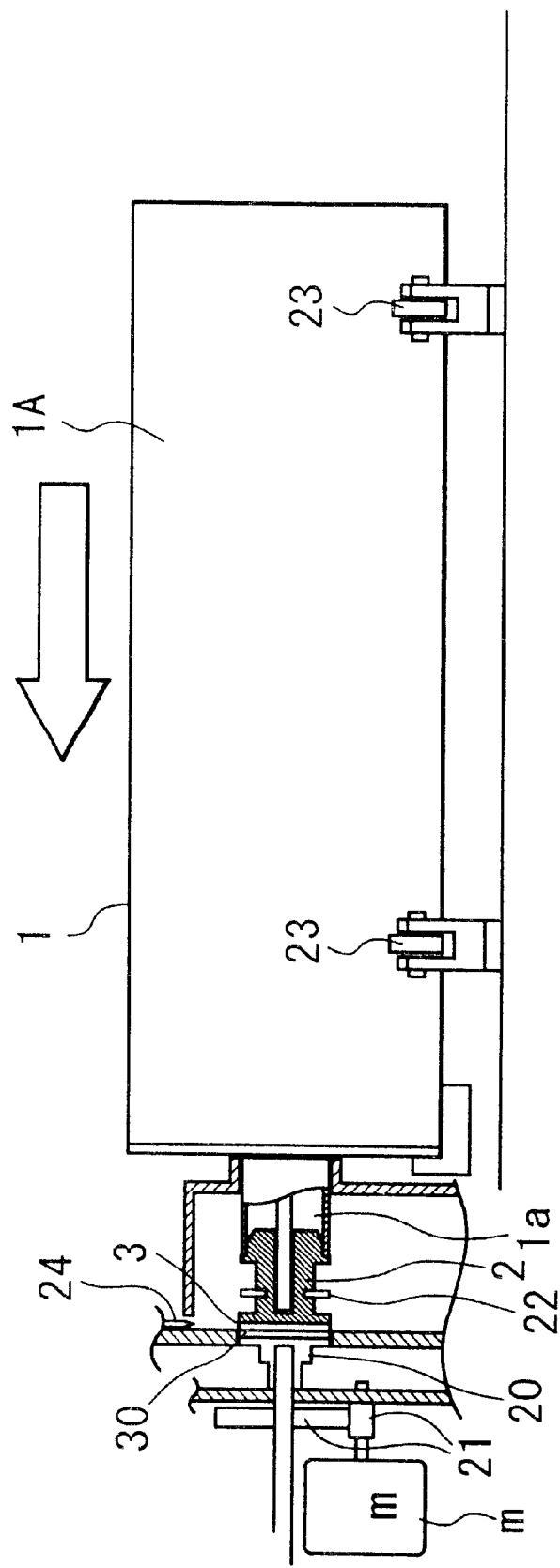
FIG. 28 is a side view illustrating a mounting operation of the toner supply container (during the insertion) according to an embodiment of the present invention.

Next, the toner bottle 1 within the apparatus main assembly 100, which has been depleted of the toner therein, is pulled out of the apparatus main assembly 100 by the user in the direction opposite to the direction indicated by an arrow mark in FIG. 28. Then, a brand-new toner supply container 1 is inserted into the apparatus main assembly 100 by the user in the direction indicated by an arrow mark Ua/U in FIG. 27, and the cover 15 is closed. As the cover 15 is closed, the sealing member 2 of the brand-new toner bottle 1 is separated from the toner bottle main structure 1A by the toner outlet opening/closing means, opening the toner outlet 1a. The above is the toner supply container replacement procedure.

Description of Toner Replenishment Process

Figure 29:
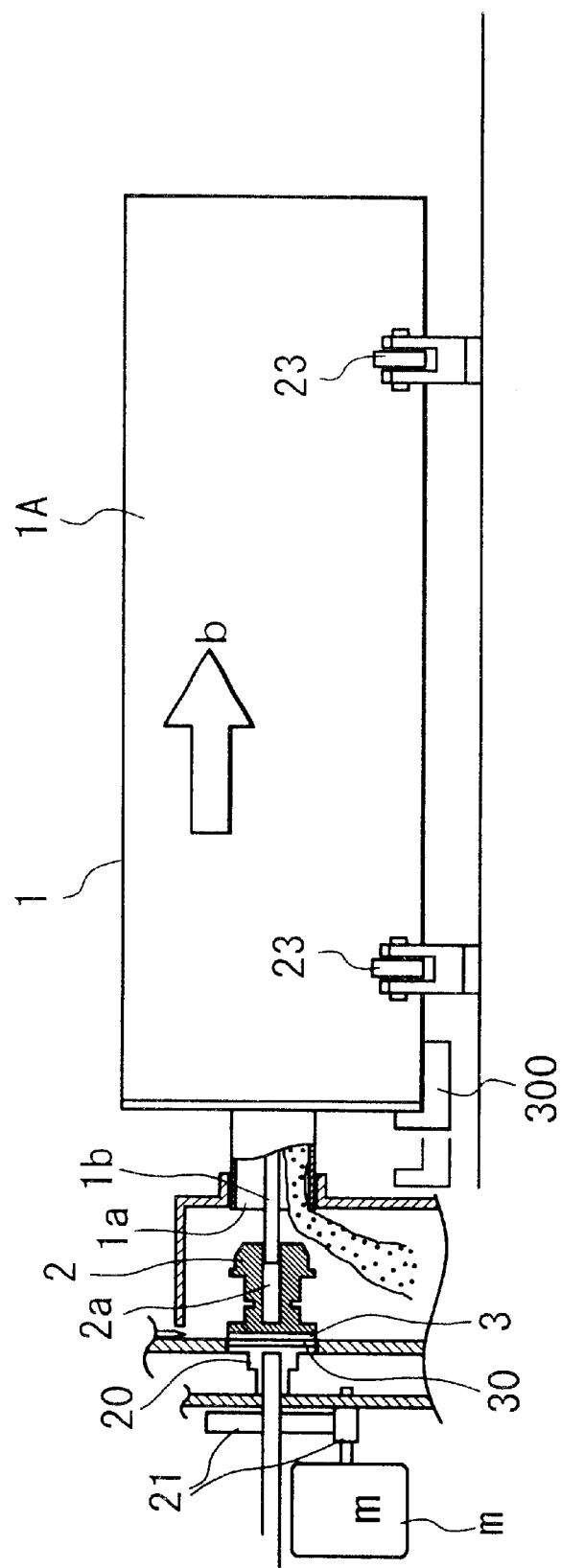
FIG. 29 is a side view illustrating a mounting operation of the toner supply container (at the end of the mounting operation).

Next, referring to FIGS. 27–29, the process through which the apparatus main assembly is replenished with the toner from this embodiment of the toner supply container in accordance with the present invention will be described. FIGS. 27–29 each shows one of the sequential steps through which an image forming apparatus is replenished with a fresh supply of toner by inserting the toner bottle 1 in accordance with the present invention into the apparatus main assembly 100. In these drawings, a referential code m designates a motor disposed within the apparatus main assembly 100. The motor m rotationally drives a driving portion 20, which is connected to the toner supply bottle through a pair of intermediary gears 21. The end surface of the driving portion 20 is provided with the main assembly side 30, that is, the main assembly side, of the surface-to-surface fastener for rotationally driving the toner bottle 1.

FIG. 29 is a drawing, which shows one of the sequential steps through which the toner bottle 1 is inserted into the apparatus main assembly 100. In this step, the toner outlet 1a located at the leading end of the toner bottle 1 is sealed with the sealing member 2.

FIG. 28 represents the state of toner bottle 1 and its adjacencies, in which the toner bottle 1 has been further inserted to a point at which the toner supply container side 3 of the surface fastener, located at the end of the sealing member 2, has engaged with the main assembly side 30 of the surface fastener, of the driving portion 20 of the apparatus main assembly 100. This engagement between the main assembly side 30 and toner supply container side 3 of the surface fastener, is caused by the force applied to the toner bottle 1 by the user to insert the bottle into the apparatus main assembly 100. More specifically, in this state, as the toner bottle 1 was inserted, a retaining member 22 for holding the sealing member 2 in the predetermined position in terms of its thrust direction (axial direction) has been engaged into a sealing member positioning groove 2d of the sealing member 2, and therefore, the position of the sealing member 2 has become fixed in terms of its thrust direction (axial direction). The retaining member 22 is attached to the apparatus main assembly 100, being allowed to move in the direction parallel to the radius direction of the sealing member 2, and also to slide within the groove 2d as the sealing member 2 rotates. The positioning groove 2d encircles the peripheral surface of the cylindrical coupling portion 2c of the sealing member 2 (FIG. 6).

FIG. 29 shows the state of the toner bottle 1 and its adjacencies, which has occurred after the engagement of the sealing member 2 and driving portion 20, more precisely, the engagement between the toner supply container side 3 and the main assembly side 30 of the surface fastener. That is, as the unshown front cover of the apparatus main assembly 100 is closed, a sliding member 300 is retracted in the direction indicated by an arrow mark b, causing therefore the toner bottle 1 to be moved back. As a result, the sealing member 2 is separated from the toner bottle 1, leaving the toner outlet 1a open to enable the toner bottle 1 to discharge the toner therein. During this movement of the toner bottle 1, the drive shaft 1b fixed to the main structure 1A of the toner bottle 1 does not completely disengage from the sealing member 2; in other words, a portion of the drive shaft 1b remains within the sealing member 2. The drive shaft 1b is not circular in cross section; it is given such a cross section that enables the drive shaft 1b to transmit rotational driving force. For example, it is given a square or triangular cross section, or the like.

As the motor m is driven in the state shown in FIG. 29, rotational driving force is transmitted from the driving portion 20 of the apparatus main assembly 100 to the sealing member 2, and is further transmitted to the drive shaft 1b of the toner bottle 1. As a result, the toner bottle 1 rotates. In other words, the sealing member 2 performs two functions; it seals the toner bottle and also transmits rotational driving force to the toner bottle 1. Since the toner bottle 1 is rotationally supported by four bottle holding rollers 23, it smoothly rotates, and requires only a very small amount of torque for rotation. The four bottle holding rollers 23 are disposed at four different points, one for one, in a manner to cradle the main structure 1A of the toner bottle 1, like a saddle. The bottle holding rollers 23 are rotationally attached to the toner supplying apparatus of the apparatus main assembly 100. As the toner bottle 1 rotates, the toner which has been stored therein, is supplied into the image forming apparatus; the toner is gradually discharged from the toner outlet 1a, into the hopper 201a of the image forming apparatus main assembly 100.

Separating Method

Next, referring to FIGS. 30 and 31, a method for separating the toner supply container side 3 of the surface fastener from the main assembly side 30 of the surface fastener will be described.

After the completion of the toner supplying operation, that is, after the toner bottle 1 becomes empty, the empty toner bottle must be replaced with a brand-new toner bottle. In order to remove the old empty bottle, the sides 3 and 30, that is, the toner container side and driving portion side, respectively, of the surface fastener, which have been remaining engaged with each other, must be separated from each other.

Figure 30:
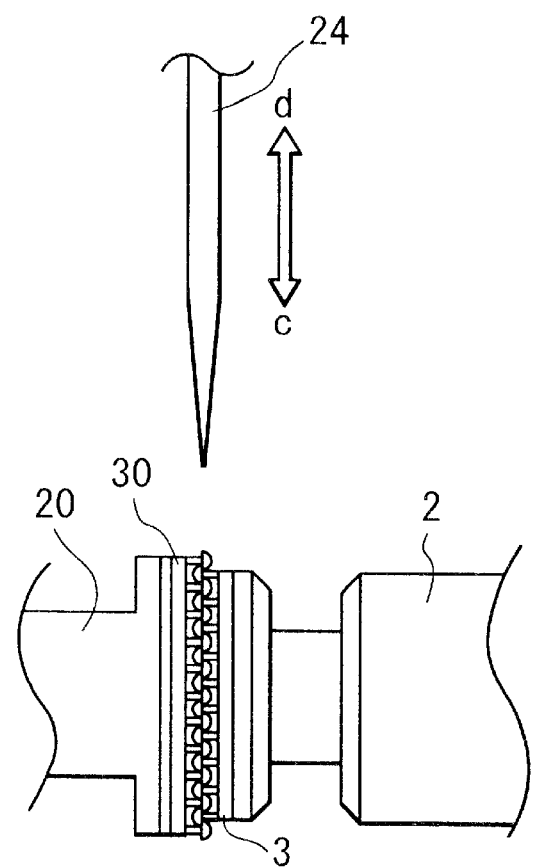
FIG. 30 is a side view illustrating separating means for the surface fastener according to an embodiment of the present invention.
Figure 31:
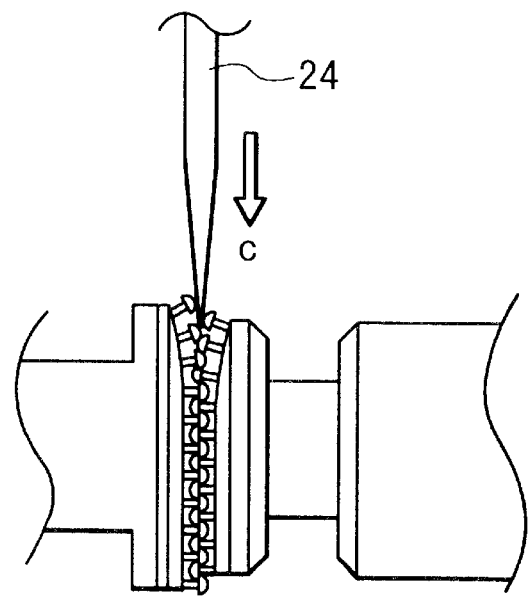
FIG. 31 is a side view illustrating separating means for the surface fastener according to an embodiment of the present invention.

Referring to FIGS. 30 and 31, a referential code 24 designates a separating member shaped like a knife. This separating member 24 is disposed within the apparatus main assembly 100, and is movable in the directions c and d indicated by a bidirectional arrow mark. In order to separate the toner supply container side 3 from the main assembly side 30, the knife-shaped separating member 24 is moved into the interface between the sides 3 and 30 in the direction c to sequentially and individually disengage the projections 3a of sides 3 and 30 from their counterparts so that the sides 3 and 30 of the surface fastener are separated from each other in a manner to be severed by the knife-shaped separating member 24. The movement of the knife-like separating member 24 may be linked to the opening/closing movement of the unshown cover of the image forming apparatus main assembly 100, so that as the front cover is opened, the knife-like separating member 24 descends in the direction c to separate the toner supply container side 3 and main assembly side 30 of the surface fastener, whereas as the front cover is closed, the knife-like separating member 24 moves in the direction d. Further, instead of linking the movement of the knife-like separating to the movement of the front cover of the apparatus main assembly 100, an additional motor or the like may be provided to move the knife-like separating member 24 independently from the movement of the front cover, or a lever for manually moving the knife-like separating member 24 may be provided. In other words, it does not matter how the knife-like separating member 24 is moved.

Figure 32:
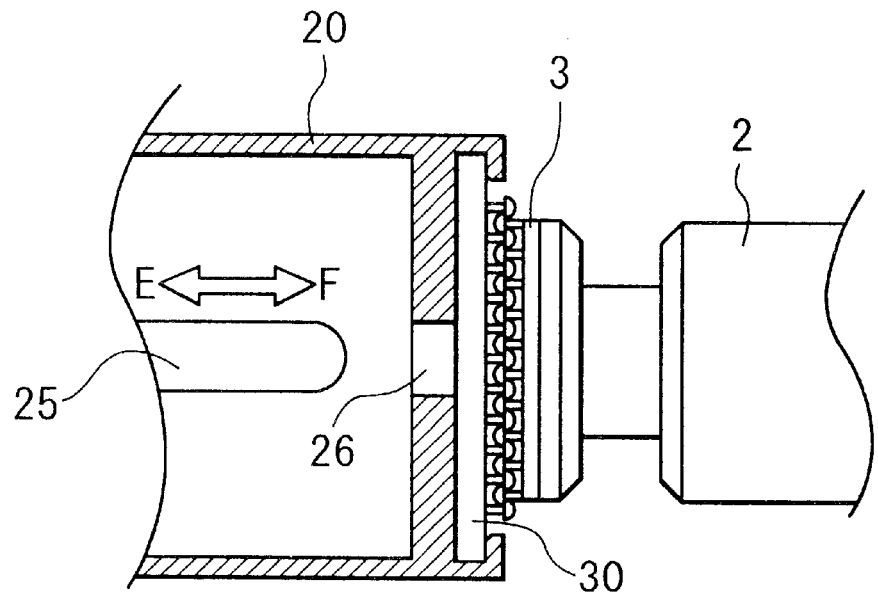
FIG. 32 is a side view of another example of the separating means for the surface fastener.
Figure 33:
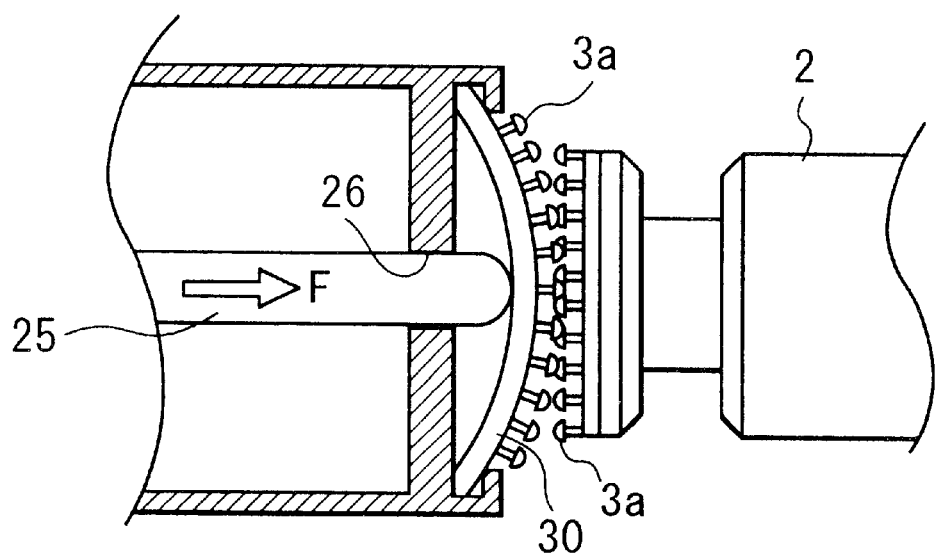
FIG. 33 is a side view of a further example of the separating means for the surface fastener.

Next, referring to FIGS. 32 and 33, another method for separating the toner supply container side 3 and main assembly side 30 of the surface fastener will be described.

According to this method, the driving portion 20 of the apparatus main assembly 100 is provided with a pushing rod 25, which is disposed on the rear side of the driving portion 20. This pushing rod 25 is enabled to move in the directions E and F indicated by a bidirectional arrow. Further, the end wall of the driving portion 20, to which the main assembly side 30 of the surface fastener is attached, is provided with a through hole, which is located in the center of the wall. In order to separate the main assembly side 30 from the toner supply container side 3, the pushing rod 25 is moved in the direction F from the base side of the main assembly side 30 as shown in FIG. 33, to push the main assembly side 30. As a result, the main assembly side 30 is caused to spherically bulge toward the toner supply container side 3 as shown in FIG. 33. Since the main assembly side 30 is formed of resin, it elastically deforms, causing the projections 3a of the main assembly side 30 to individually and sequentially disengage from their counterparts on the toner supply container side 3, starting from the peripheries of the main assembly side 30. As a result, the main assembly side 30 becomes separated from the toner supply container side 3.

Obviously, the above described two methods for separating the toner supply container side 3 and main assembly side 30 of the surface fastener may be employed in combination. When the two methods are employed in combination, first, the main assembly side 30 is pushed out by the pushing rod 25 to semispherically warp the main assembly side 30 toward the toner supply container side 3, and then, the two sides 30 and 3 of the surface fastener are separated by the above described knife-like separating member 24. Thus, the two sides 30 and 3 are separated more smoothly, that is, in an effortless manner.

According to the present invention, there are no specific requirements regarding the above described methods for separating the two sides 3 and 30 of the surface fastener. In other words, the employment of a separating method other than the above described one does not cause any problem, which is obvious.

Positioning and Structure of Surface Fastener

Next, referring to FIGS. 34–36, the positioning and structure of the toner supply container side 3 of the surface-to-surface in accordance with the present invention will be described.

The positioning and structure of the surface fastener in accordance with the present invention does not need to be limited to such that the one of the two sides of a surface fastener is attached to the end of the above described sealing member 2. The locations to which the two sides of a surface fastener are attached one for one may be freely selected as long as the force for driving the toner bottle 1 can be transmitted to the toner bottle 1.

Figure 34:
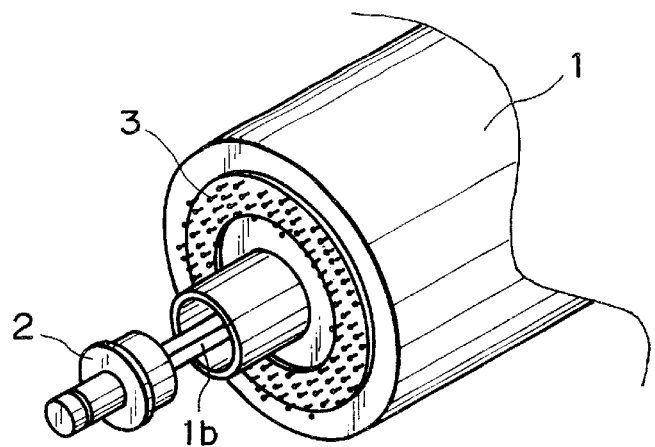
FIG. 34 is a perspective view of an example of a disposition of a surface fastener (annular arrangement).
Figure 35:
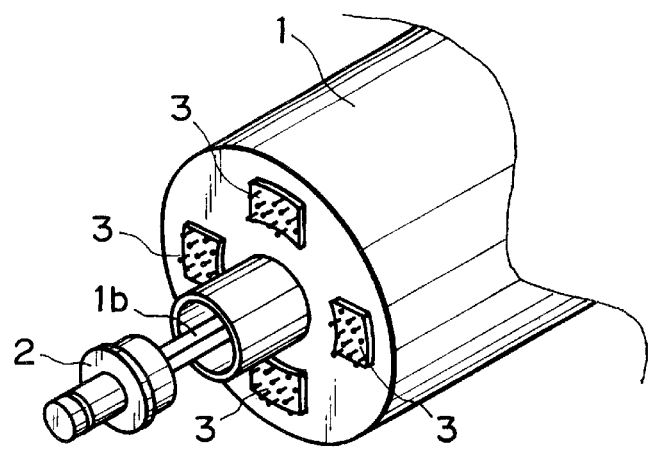
FIG. 35 is a perspective view of an example of a disposition of a surface fastener (divided arrangement).
Figure 36:
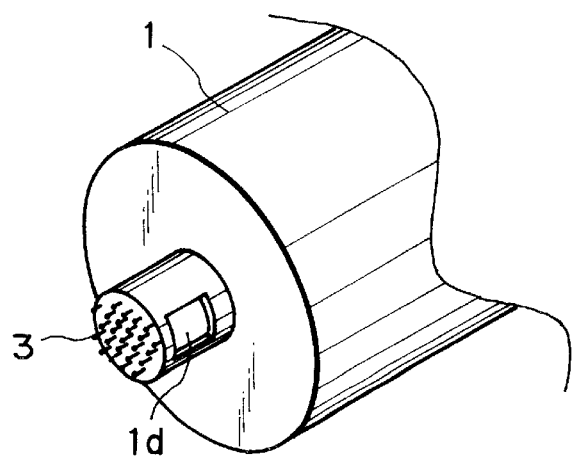
FIG. 36 is a perspective view of a further example of a disposition of the surface fastener (discharging opening).

For example, a surface fastener may be structured as shown in FIG. 34, 35, or 36.

FIG. 34 shows a design in which the toner supply container side 3 of a surface fastener covers virtually the entirety of one of the end surfaces of the toner bottle 1.

FIG. 35 shows a design in which the toner supply container side 3 is divided into a plurality of pieces, which are attached to one of the end surfaces of the toner bottle 1, being evenly distributed in the circumferential direction.

FIG. 36 shows a design in which the toner supply container side 3 is attached to the end of the toner outlet 1, which is where the toner discharge hole 1d is located in FIGS. 34 and 35, and the toner discharging hole id of the toner outlet 1a is located in the side wall of the toner outlet 1a.

As is evident from the above described designs, the location on the toner bottle 1, to which the toner supply container side 3 of a surface fastener is attached, may be freely selected, depending on toner container configuration. However, when the toner supply container side 3 is divided into a plurality of pieces, which are separately attached to one of the end surfaces of the toner bottle 1, the main assembly side 30, or the apparatus main assembly side, of the surface fastener must be configured so that it covers virtually the entirety of the end surface of the driving portion on the main assembly side as shown in FIG. 34.

Next, an embodiment of a process cartridge in accordance with the present invention will be described.

Embodiment 2

First, referring to FIGS. 37–46, the process cartridge in this embodiment, and an image forming apparatus in which the cartridge is mountable, will be concretely described.

As for the order of the descriptions, first, referring to FIGS. 37–40, the overall structure of the process cartridge, and the overall structure of the image forming apparatus in which the process cartridge is mounted, will be described with, and then, referring to FIGS. 41–46, the surface fastener which constitutes the driving force transmitting mechanism for transmitting driving force to the process cartridge from the image forming apparatus main assembly will be described in terms of its structure.

Overall Structure

Figure 37:
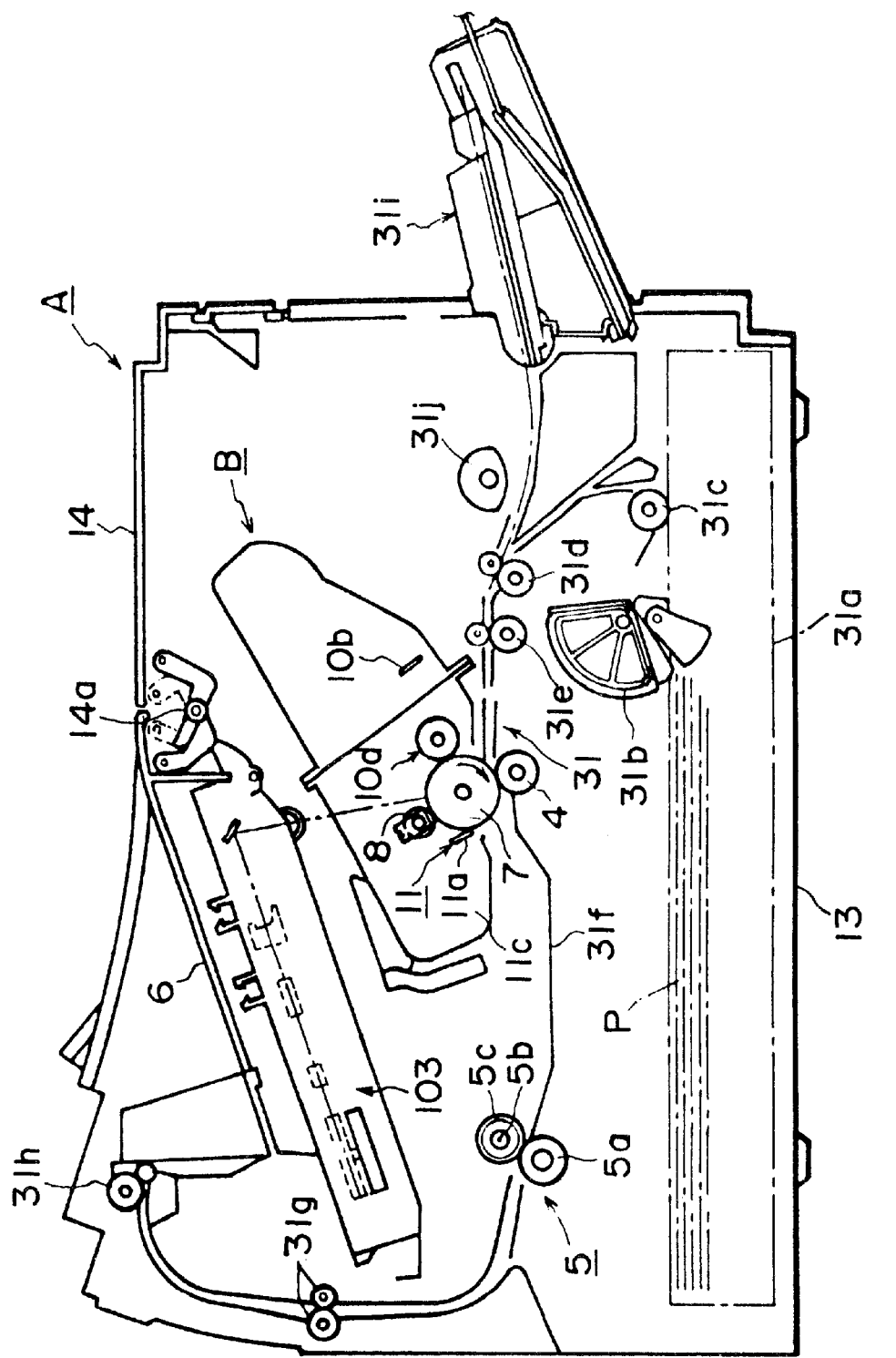
FIG. 37 is a structure schematic longitudinal sectional view of an electrophotographic image forming apparatus (laser beam printer).
Figure 38:
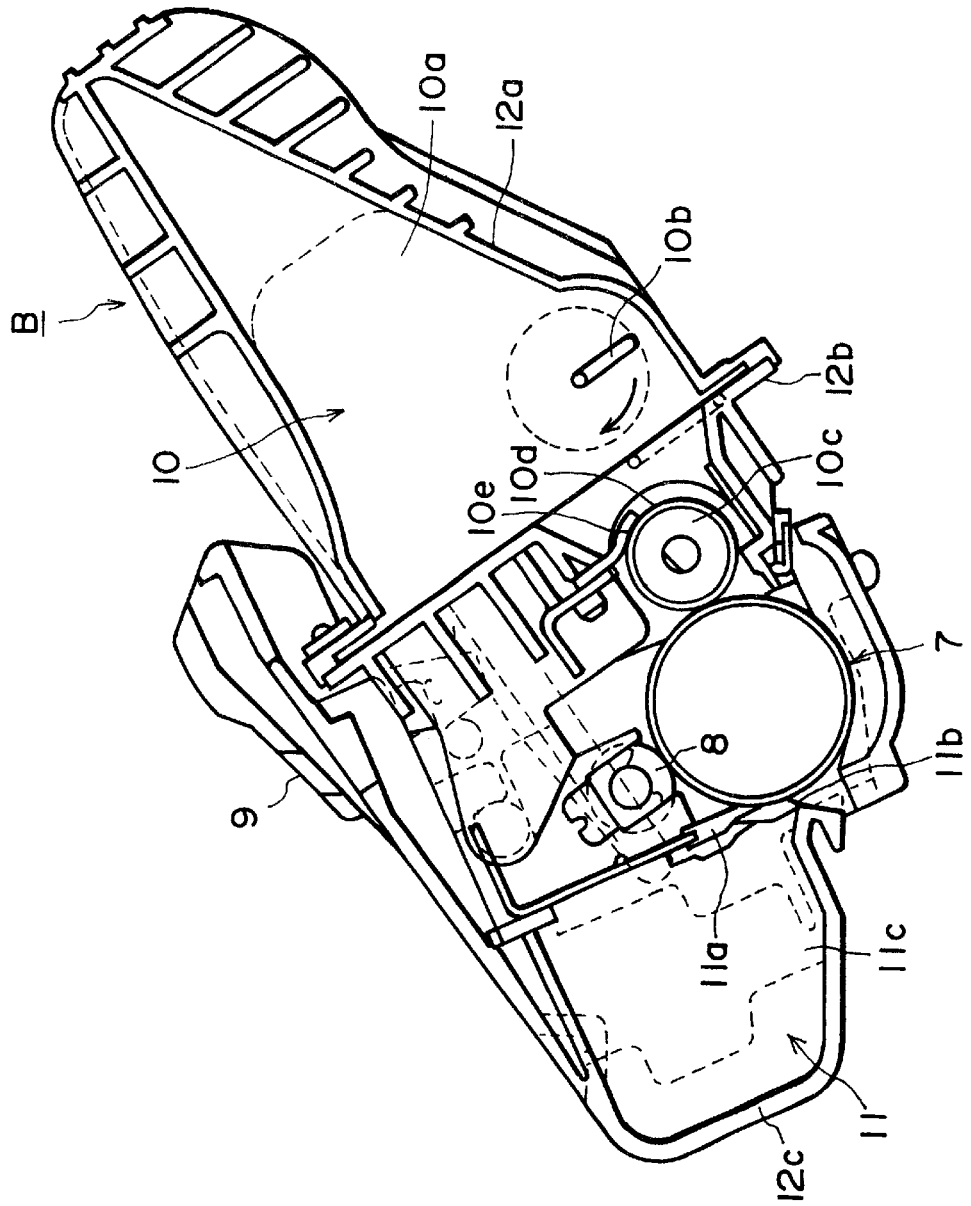
FIG. 38 is a structure schematic longitudinal sectional view of a process cartridge.
Figure 39:
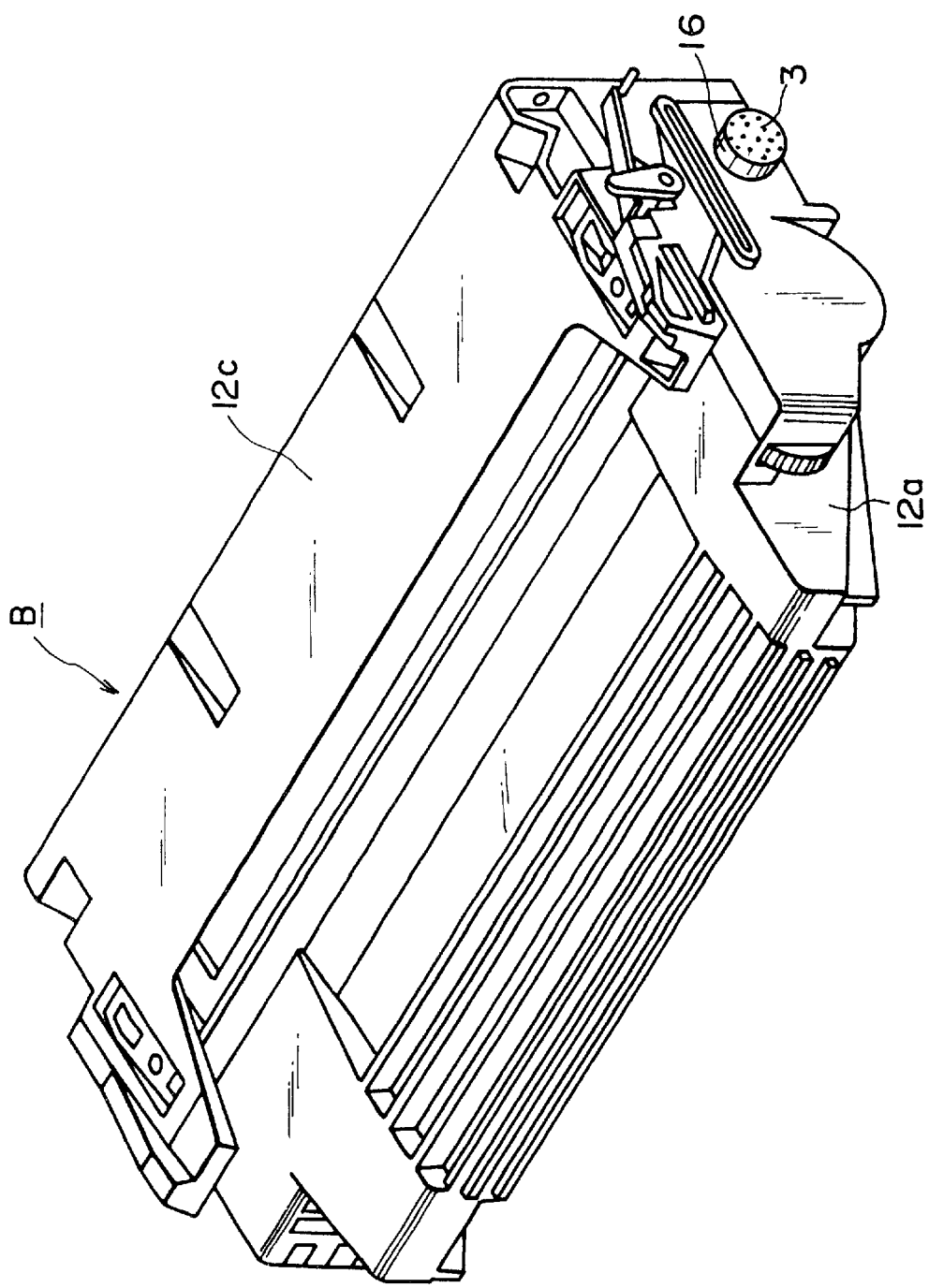
FIG. 39 is a perspective view of an outer appearances of a process cartridge.
Figure 40:
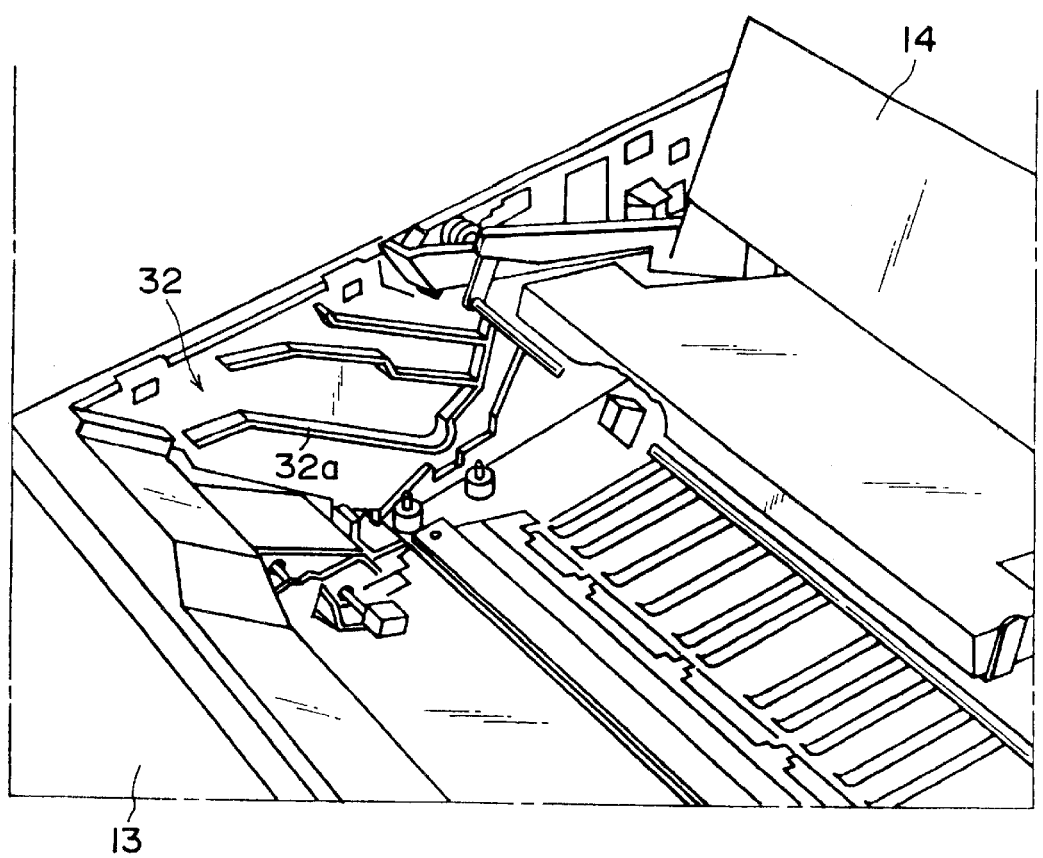
FIG. 40 is a perspective view of a mounting portion of a process cartridge.

FIG. 37 is a rough vertical sectional view of the image forming apparatus in which the process cartridge has been removably mounted, for showing the structure of the image forming apparatus. FIG. 38 is a rough sectional view of the process cartridge, for showing the structure thereof. FIG. 39 is an external perspective view of the process cartridge, and FIG. 40 is a perspective view of the process cartridge mounting space in the apparatus main assembly, for showing the structure thereof.

Referring to FIG. 37, in this electrophotographic image forming apparatus A (laser beam printer), a laser beam modulated with the image formation information is projected from an optical portion 103 to the electrophotographic photoconductive member in the form of a drum, to form a latent image on the photoconductive drum. This latent image is developed into a toner image. In synchronism with the formation of the toner image, a paper P, as recording medium, is fed from the sheet feeding cassette 31a into the apparatus main assembly, and is further conveyed by a conveying means 31 comprising a pickup roller 31b, a conveying roller pair 31c, a conveying roller pair 31d, a registration roller pair 31e, and the like. As the paper P is conveyed, the toner image having been formed on the peripheral surface of the aforementioned photoconductive drum disposed in the process cartridge B is transferred onto the paper P by applying electrical voltage to a transfer roller 4 as a transferring means. Then, the paper P is conveyed to a fixing means while being guided by a guiding plate 31f. This fixing means 5 comprises a driving roller 5a, and a fixing roller 5c containing a heater 5b. As the paper P is conveyed through the fixing means 5, heat and pressure are applied to the toner image and paper P to fix the toner image to the paper P. Then, this paper P is conveyed through a reversing path and discharged in to a delivery tray 6, by a discharge roller pair 31g. Incidentally, this image forming apparatus is structured so that the paper P can be manually fed into the apparatus main assembly by the combination of a manual feeder tray 31i and a roller 31j.

On the other hand, the process cartridge B comprises an electrophotographic photoconductive member, and at least one processing means. As for the processing means, there are a charging means for charging an electrophotographic photoconductive member, a developing means for developing a latent image having been formed on an electrophotographic photoconductive member, a cleaning means for removing the toner particles remaining on the peripheral surface of the electrophotographic photoconductive drum, and the like means. Referring to FIGS. 38 and 39, in the process cartridge B in this embodiment, a photoconductive member 7, that is, an electro-photographic photosensitive member, having a photoconductive layer, is rotated, and as the photoconductive drum 7 rotates, the peripheral surface of the photoconductive drum 7 is uniformly charged by applying voltage to a charge roller 8, that is, a charging means. Then, the charged peripheral surface of the photoconductive drum 7 is exposed to a beam of light projected from the optical portion 103 while being modulated with image formation data. As a result, a latent image is formed on the peripheral surface of the photoconductive drum 7. This latent image is developed by the developing means 10.

As for the developing means 10, the toner within a toner holding portion 10a is sent out by a toner moving member 10b, and a development roller 10d containing a stationary magnet 10c is rotated to form a thin layer of triboelectrically charged toner particles by a development blade 10e. The toner particles in the thin layer of toner are transferred onto the photoconductive drum 7 in a manner to reflect the latent image. As a result, a toner image, or a visible image, which reflects the latent image, is formed on the peripheral surface of the photoconductive drum 7. Then, the toner image on the peripheral surface of the photoconductive drum 7 is transferred onto the paper P by applying to a transfer roller 4, voltage which is opposite in polarity to the toner image. Thereafter, the toner particles remaining on the photoconductive drum 7 are removed by the cleaning means 11; the toner particles are scraped away by a cleaning blade 11a, are caught by a toner particle catching sheet 11b, and are collected into a removed toner particle collection bin 11c.

The various components, for example, the photoconductive drum, of the process cartridge are disposed in a cartridge frame comprising a toner container 12b for holding toner, developing means holding frame 12b for holding the developing members such as the development roller 10d, and a cleaning means holding frame 12c. More specifically, the developing means holding frame 12b in which the developing means has been disposed is welded to the toner container 12b, forming a development unit. The photoconductive drum 7, cleaning means 11, and the like are attached to the cleaning means holding frame 12c, forming a cleaning unit. Then, the developing unit is joined with the cleaning unit, forming the process cartridge, which is removably mountable in the cartridge mounting means of the main assembly 13 of an image forming apparatus.

As for the cartridge mounting means, as a cover 14 is opened about an axis 14a, the cartridge mounting space is exposed, in which a pair of cartridge guiding members 32 are attached to the left and right walls, one for one, in parallel with each other, as shown in FIG. 40 (which shows only one of the lateral walls of the cartridge mounting space). The left and right cartridge guiding member 32 each are provided with a guiding portions 32a for guiding the process cartridge B when the process cartridge B is inserted into the apparatus main assembly. The guiding portions 32a are in parallel with each other. The cartridge B is inserted into the image forming apparatus A, with the bosses projecting perpendicularly from the lengthwise ends of the frame of the cartridge B guided by these guiding portions 32a. Then, as the cover 14 is closed, the process cartridge B is properly set in the image forming apparatus B.

As the process cartridge B is inserted into the image forming apparatus A, the surface fastener member on the cartridge side engages with the surface fastener member on the image forming apparatus main assembly side, enabling the photoconductive member 7 and the like to be rotationally driven by the driving force from the apparatus main assembly 13.

Structure of Driving Force Transmitting Portion

Next, the structure of the driving force transmitting means, that is, the structure of a mechanism for transmitting driving force from the image forming apparatus main assembly 13 to the process cartridge B, will be described.

Figure 41:
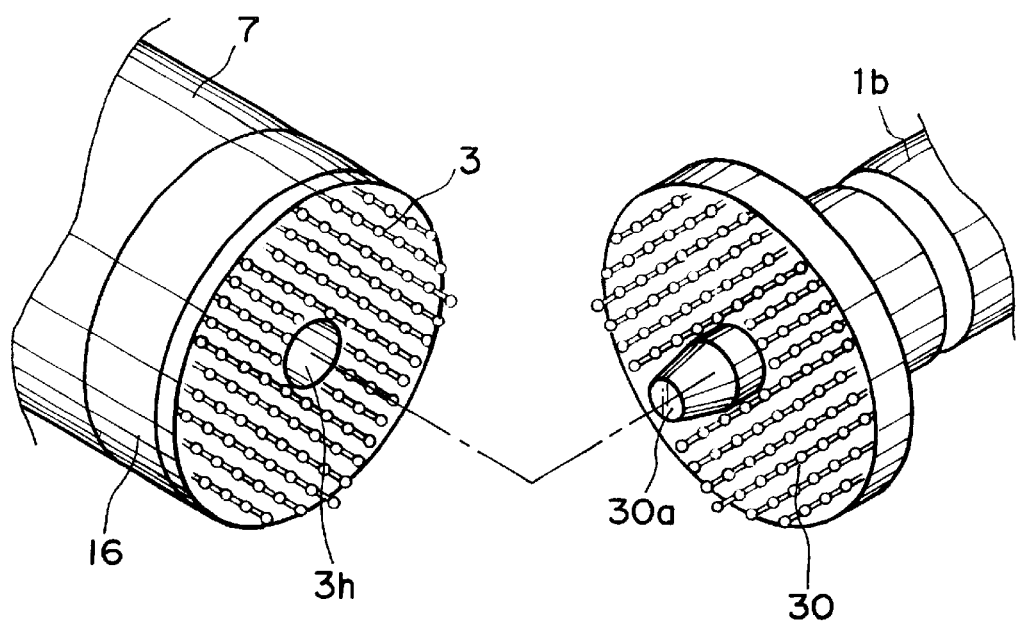
FIG. 41 is a schematic perspective view of a main assembly side surface fastener and a cartridge side surface fastener.
Figure 42:
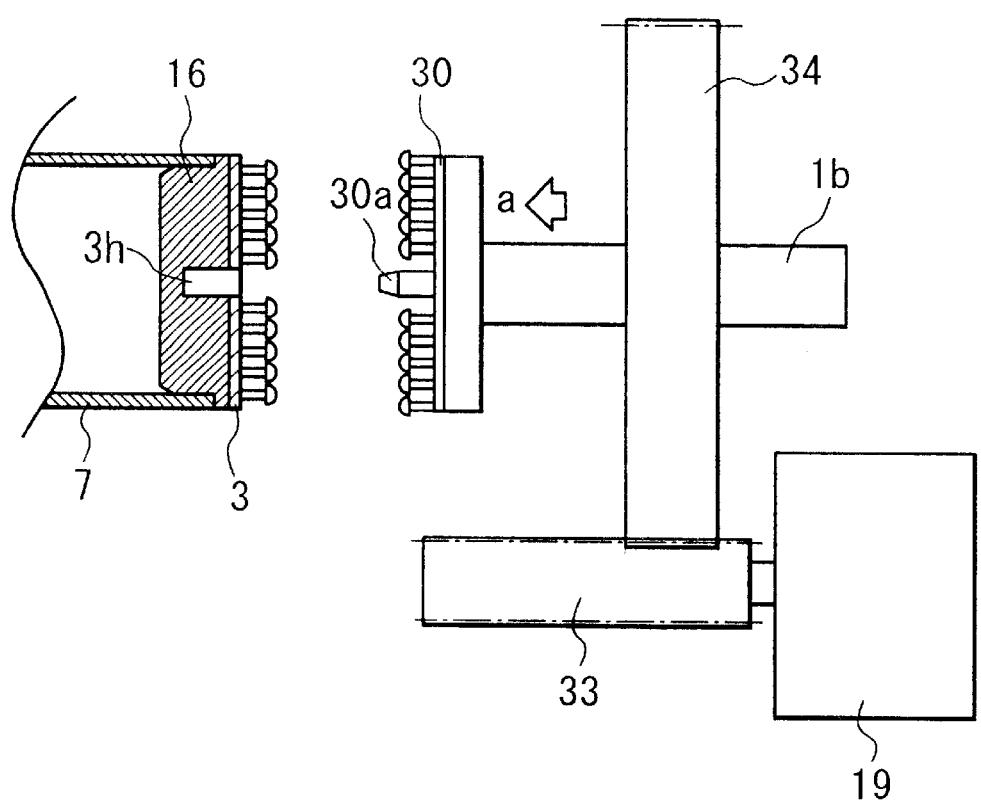
FIG. 42 is a schematic side view of a main assembly side surface fastener and a cartridge side surface fastener.
Figure 43:
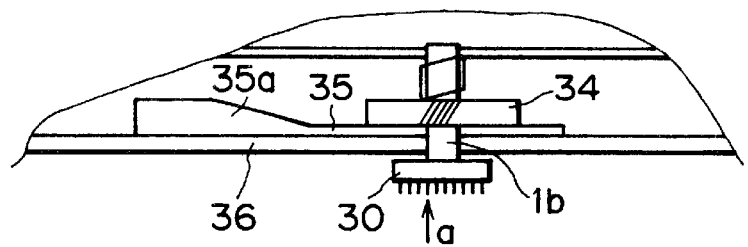
FIG. 43 is a top plan view of a drive transmitting means of a main assembly of an apparatus when the opening and closing cover is closed.

Referring to FIGS. 41 and 42, the photoconductive drum 7 is provided with the cartridge side 3 of the cartridge fastener, that is, a surface fastener, which is attached to one end of the photoconductive drum 7.

On the other hand, the image forming apparatus main assembly is provided with the main assembly side 30 of the surface fastener. This fastener component 30 on the main assembly side is positioned relative to the drive shaft 1b so that as the process cartridge B is inserted into the apparatus main assembly 13, the axial line of the main assembly side 30 of the surface fastener aligns with that of the photoconductive drum 7. To this drive shaft 1b, a rotational force is transmitted from the pinion gear 33 of a motor 19 through a transmission gear 34. The main assembly side 30 of the surface fastener is attached to the end portion of this drive shaft 1b.

Referring to FIG. 42, to the drive shaft 1b, the transmission gear 34 is solidly fixed, which is a helical gear like the pinion gear 33. The twist angle of these helical gears is such that as the drive shaft 1b is rotated in the direction for image formation, thrust is generated in the direction to push the transmission gear 34 in the direction indicated by an arrow mark Ua/U. Thus, the drive shaft 1b integral with the transmission gear 34 is pressed against the photoconductive drum 7, causing the main assembly side 30 of the surface fastener, fitted around the drive shaft 1b, to engage with the drum side 3 of the surface fastener, which is placed on the photoconductive drum 7.

Also referring to FIGS. 41 and 42, in order to further increase the accuracy with which the photoconductive drum 7 aligns with the drive shaft 1b on the main assembly side, the main assembly side 30 of the surface fastener and the drum side 3 of the surface fastener may be provided with an alignment shaft 30a and an alignment hole, which are positioned in the center thereof, respectively. More specifically, in such a case, the drum flange 16 to which the drum side 3 of the surface fastener is attached is provided with a center hole 3h, and the alignment shaft 30a of the main assembly side 30 of the surface fastener is fitted into the alignment hole 3h of the drum flange 16 through the center hole of the drum side 3 of the surface fastener. Incidentally, the drum flange 16 is inserted into one end of the hollow, cylindrical photoconductive drum 7, and is solidly fixed thereto. The rotational axes of the alignment shaft 30a, or an engagement projection, and the center hole 3h, or the engagement recess, coincide with the rotational axes of the driving force transmitting portion of the apparatus main assembly side and the driving force receiving portion of the toner bottle 1. Instead, the recess for alignment and engagement, and the projection for alignment and engagement, may be provided on the apparatus main assembly side and the toner bottle side, respectively. With the provision of one of the above described structural arrangements, or the like, the both sides align with each other with higher accuracy, eliminating the possibility that the engagement between the two sides is disrupted as driving force is transmitted. Therefore, the photoconductive drum 7 can be rotationally driven surely and accurately. This type of structural arrangement is particularly effective when it is applied to a driving force transmitting portion for transmitting driving force to the photoconductive drum 7 or the like, which is required to have an extremely high degree of rotational accuracy.

The structural arrangement in this embodiment may be applied to the means for transmitting driving force to the toner bottle 1, described regarding the first embodiment, as well as various driving force transmitting means other than the above described driving force transmitting means.

Figure 44:
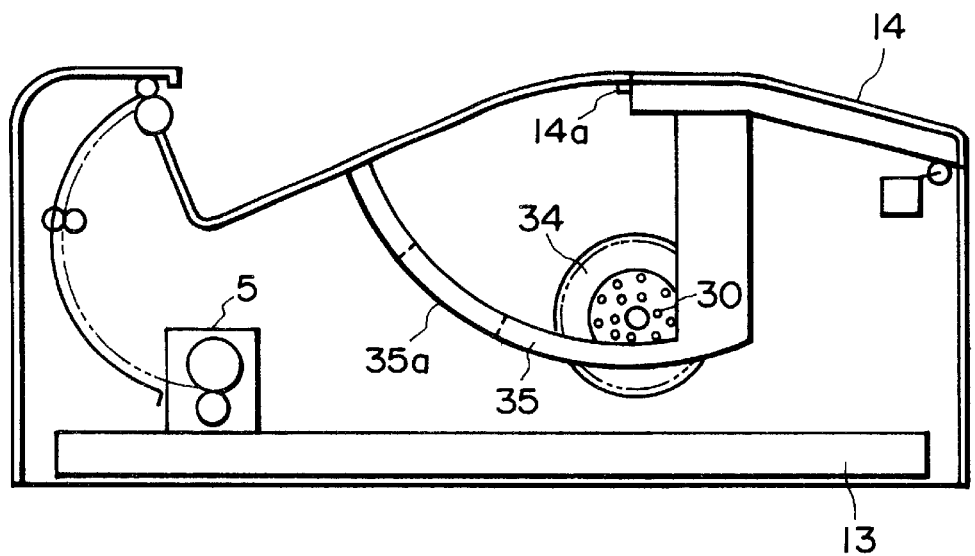
FIG. 44 is a front view of a surface fastener drive transmitting means provided in the main assembly when the cover is closed.
Figure 45:
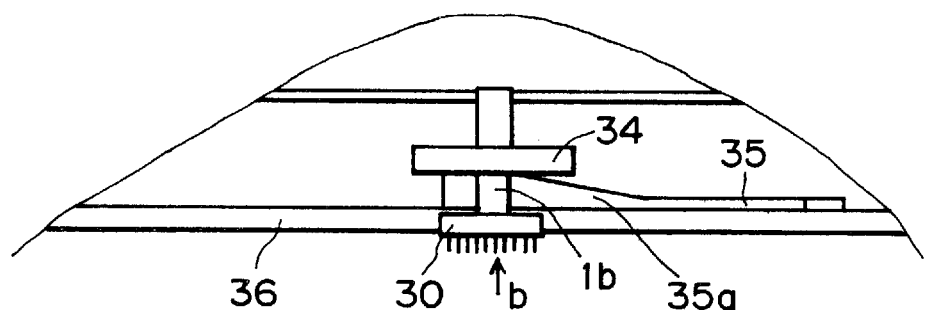
FIG. 45 is a top plan view of a surface fastener drive transmitting means provided in the main assembly when the cover is opened.
Figure 46:
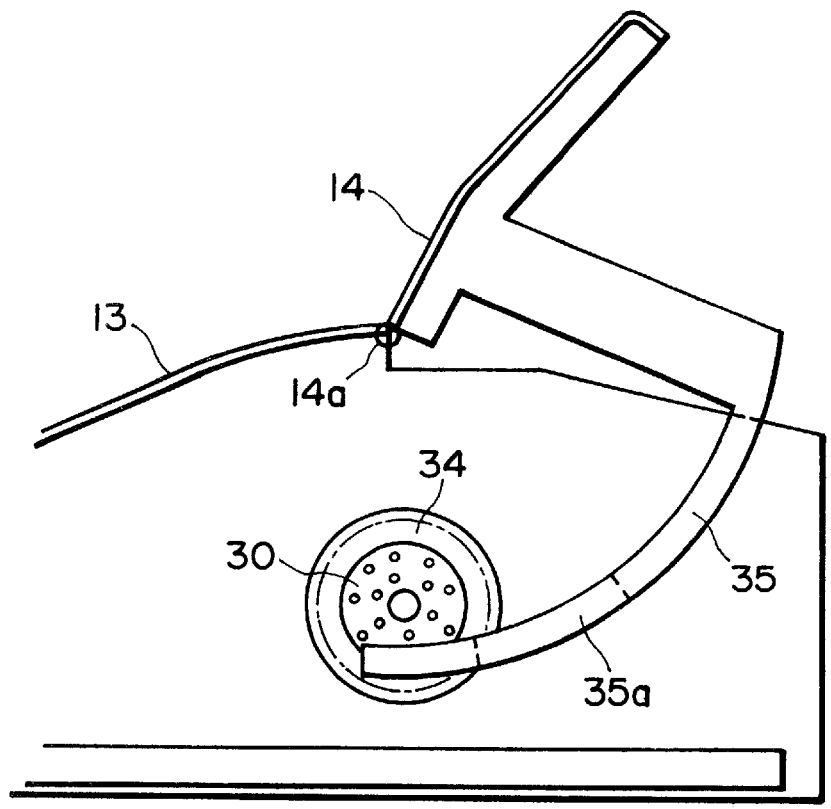
FIG. 46 is a front view of a surface fastener drive transmitting means provided in the main assembly when the cover is opened.

Referring to FIG. 44, the image forming apparatus main assembly 13 is provided with a fastener disengaging member 35, which is attached to the cover 14a. The surface fastener disengaging member 35 has a cylindrical curvature and rotates about an axis 14a. The end portion of the fastener disengaging member 35 constitutes a cam portion 35a, which gradually increases in thickness toward the tip. Thus, as the cover 14 is opened to remove the process cartridge B as shown in FIG. 46, the cam portion 35a enters between the wall 36 and transmission gear 34 as shown in FIG. 45, moving the transmission gear 34 in the direction indicated by an arrow mark b. As a result, the drive shaft 1b, and the main assembly side 30 of the surface fastener attached to the drive shaft 1b, are moved away from the wall 36, being therefore disengaged from the drum side 3 of the surface fastener attached to the photoconductive drum 7, to allow the process cartridge B to be smoothly removed.

As is evident in the foregoing descriptions of the first and second embodiments, the present invention provides the following effects:

(1) During an operation for replacing a used toner supply container with a brand-new one, it is unnecessary to align the brand-new toner supply container with the apparatus main assembly, in terms of rotational axis and rotational phase, as it was in the past. Thus, as a user simply places the brand-new toner supply container into the main assembly of an image forming apparatus, and closes the front cover of the apparatus, the toner supply container engages with the driving portion of the apparatus main assembly, and is readied for toner delivery, improving drastically toner replenishment efficiency.

(2) The employment of a surface fastener as a means for transmitting driving force to a toner supply container ensures that the driving force receiving portion of the toner supply container is simply and surely engaged with the driving force transmitting portion of the image forming apparatus main assembly by simply inserting the toner supply container into the apparatus main assembly. Therefore, engagement failures such as those which occurred in the past, do not occur. Thus, it is possible to provide a highly reliably toner supply container which assures toner replenishment.

(3) The employment of a surface fastener as the driving force transmitting portion between a toner supply container and the image forming apparatus main assembly drastically reduces the thickness of the driving force transmitting portion in terms of the rotational axis direction, contributing to the saving of the internal space of the image forming apparatus main assembly and the size reduction of the image forming apparatus main assembly.

(4) The employment of a surface fastener as a means for transmitting driving force to a toner supply container eliminates a complicated structural arrangement such as a combination of a member with a projection and a member with a recess, required by a conventional coupling. Thus, it substantially contributes to the cost reduction of the means for transmitting driving force to a toner supply container.

(5) The foregoing listed effects of the present invention regarding a toner supply container are also true of the driving force transmission between a process cartridge and the image forming apparatus main assembly.

(6) An image forming apparatus can be reduced in size.

Embodiment 3

Next, referring to FIGS. 47 and 48, the toner supply container in the third embodiment of the present invention will be described.

Figure 47:
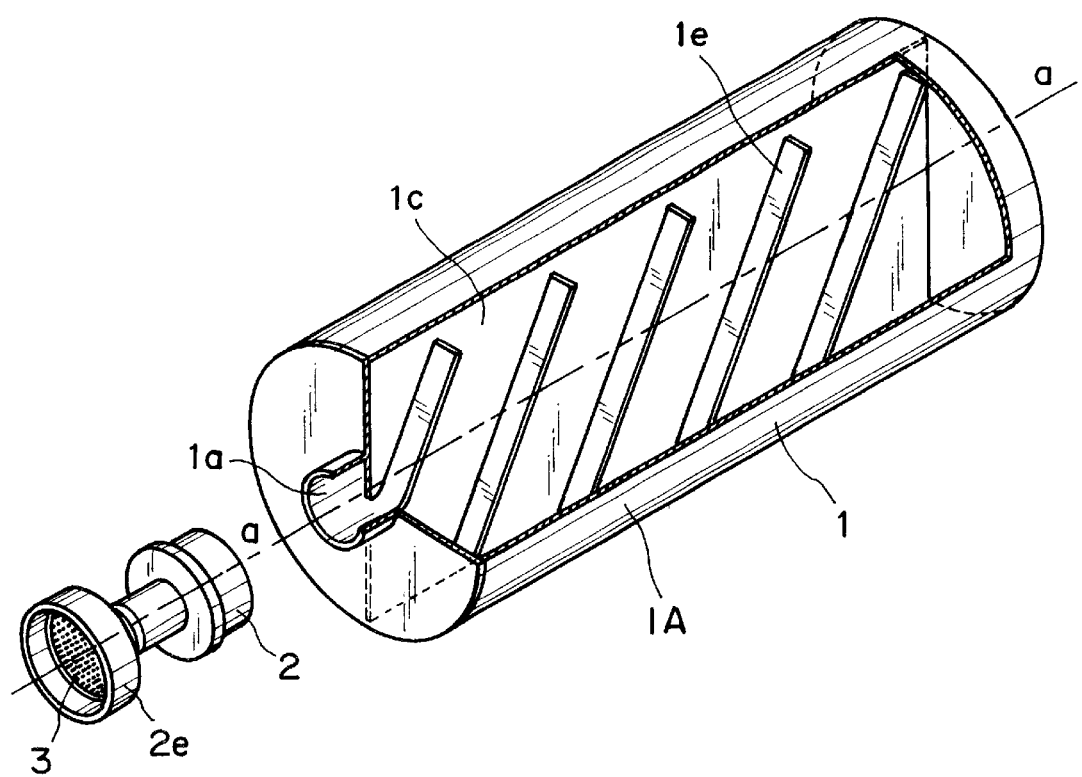
FIG. 47 is a perspective view of a toner supply container according to Embodiment 3 of the presentation.
Figure 48:
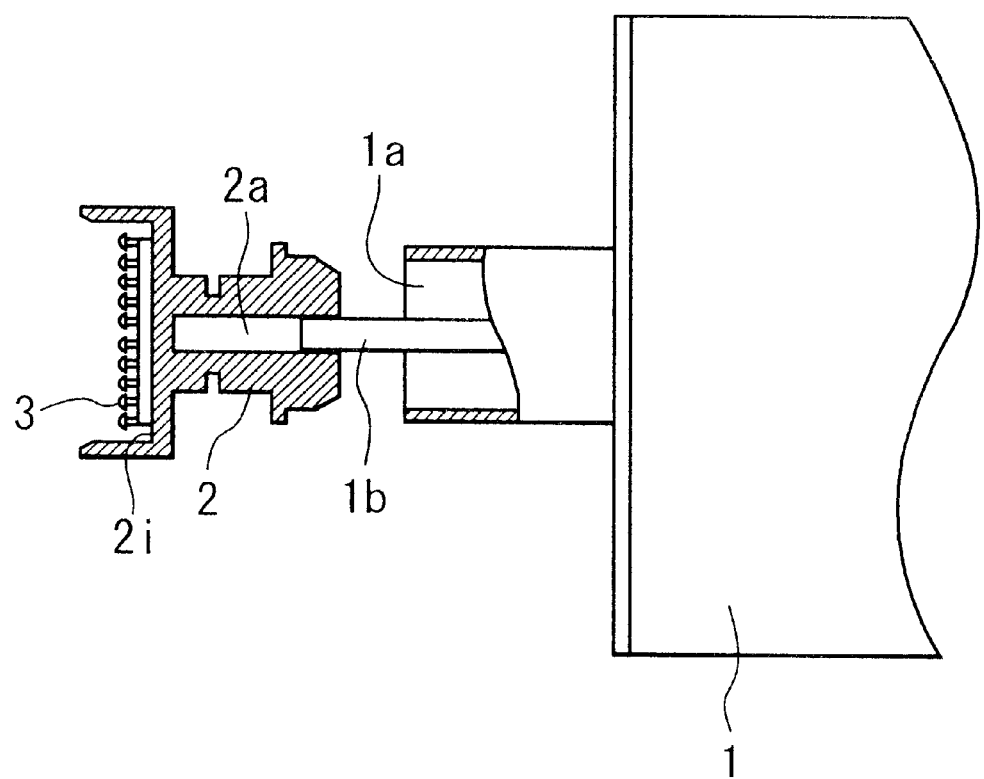
FIG. 48 is a partial enlarged sectional view of a drive transmitting portion of the toner supply container.

FIG. 47 is a perspective view of an example of the toner supply container in this embodiment. FIG. 48 is a sectional view of the driving force transmitting portion for driving the toner supply container, for showing the structure thereof.

In this embodiment, the sealing member 2 is provided with a barrier 2e, that is, a circular wall, which perpendicularly projects in a manner to surround the toner supply container side 3 of the surface fastener, so that small pieces which come off from the surface fastener are prevented from scattering. This structural arrangement is the essential difference of this embodiment from the first and second embodiments. The other structural arrangements of this embodiment are the same as those of the first and second embodiments, and therefore, will be described.

Sealing Member

Figure 49:
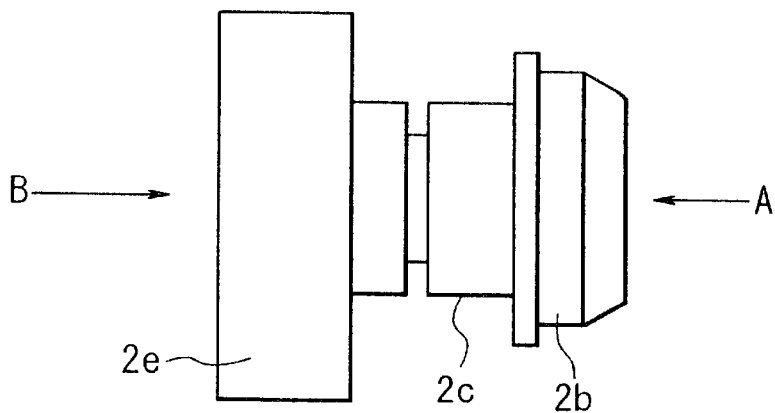
FIG. 49 is a front view of a sealing member of the toner supply container.
Figure 50:
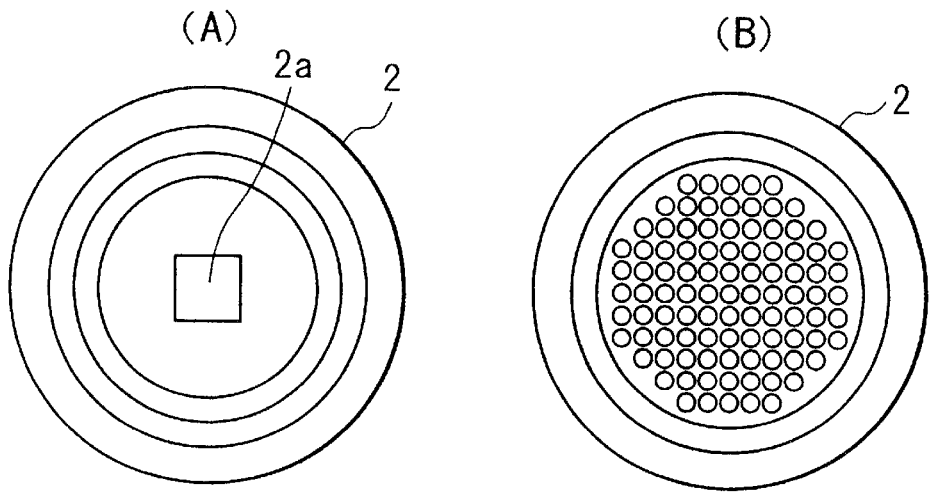
FIG. 50(A) is a view of the sealing member as shown in FIG. 49 as seen in the direction of arrow A.
FIG. 50(B) is a view of the sealing member as shown in FIG. 49 in the direction of arrow B.
Figure 51:
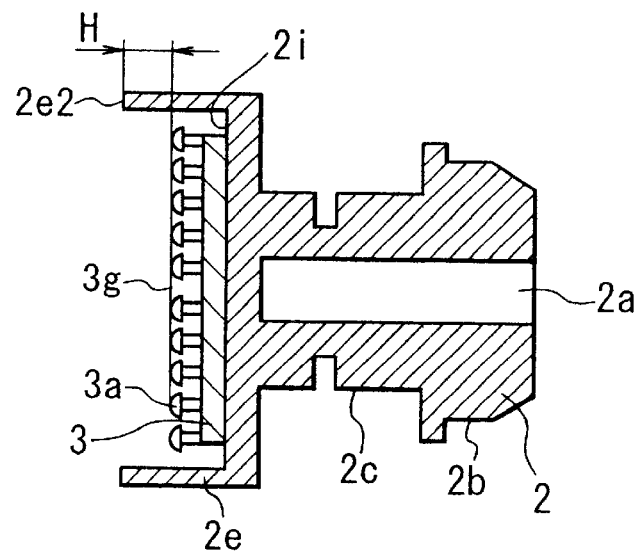
FIG. 51 is a sectional front view of the sealing member.

Next, referring to FIGS. 49–51, the sealing member 2 in this embodiment will be described. FIG. 49 is a view of the sealing member 2 as seen from the direction perpendicular to its axial line. FIGS. 50(A) and 50(B) are views of the sealing member 2 as seen from the directions indicated by arrow marks Ua/U and b in FIG. 49. FIG. 51 is a sectional view of the sealing member 2 at a plane inclusive of its axial line.

In FIGS. 49–51, a referential code 2b designates a sealing portion, which fits into the toner outlet 1a of the toner supply container 1 to resealably seal the toner outlet 1a. The external diameter of this sealing portion 2b is set to be larger by an appropriate amount than the internal diameter of the hole of the toner outlet 1a. As the sealing portion 2b is pressed into the toner discharge hole of the toner outlet 2b, the sealing member 2 hermetically seals the toner discharge hole of the toner outlet 2b.

The sealing member 2 is provided with a hole 2a as a driving force transmitting means, into which the drive shaft 1b is fitted so that the driving force which the sealing member 2 receives from the apparatus main assembly 100 is transmitted to the driving shaft 1b. The axial line of this hole 2a coincides with that of the sealing member 2. The hole 2b extends through the sealing portion 2b and coupling portion 2c of the sealing member 2. The cross section of the hole 2b is the same in shape as the drive shaft 1b, and is rendered slightly larger in size than the drive shaft 1b. Thus, the drive shaft 1b loosely fits in the hole 2a.

Since the drive shaft 1b loosely fits in the hole 2a, the bottle main structure 1A and sealing member 2 lock with each other in terms of the rotational direction of the toner bottle main structure 1A, while being allowed to freely move relative to each other in terms of their axial direction. Thus, when the toner supply container is mounted into the toner supplying apparatus, the sealing member 2 can be separated from the bottom main assembly 1A to unseal (open) the toner outlet hole, as will be described later.

The length by which the hole 2a and drive shaft 1b engage with each other in terms of their axial direction is sufficient to prevent the drive shaft 1b from becoming disengaged from the hole 2a when the sealing member 2 is separated from the toner bottle main structure 1A. Thus, even when the sealing member 2 is apart from the toner bottle main structure 1A, the drive shaft 1b can receive a driving force through the sealing member 2.

Although the above described structure was employed in this embodiment, the drive shaft and drive shaft engagement hole may be provided on the sealing member side and the toner bottle main structure side, respectively.

Although the sealing member 2 is preferred to be formed of resinous material such as plastic by injection molding, it may be formed of a material other than the resinous material and by a manufacturing method other than injection molding. Further, it may be formed in one piece, or may be molded in multiple pieces, which are joined together.

Further, the sealing member 2 is required to have a proper amount of elasticity so that it can be pressed into the toner outlet 1a to hermetically seal the toner outlet 1a. For this purpose, the low density polyethylene is most desirable as the material for the sealing member 2. Also, polypropylene or straight chain polyamide, that is, nylon(commercial name), high density polyethylene, or the like, may be used with desirable results.

Structure of Surface Fastener

Next, referring to FIGS. 52 and 53, the structure of the surface fastener component 3 will be described.

Figure 52:
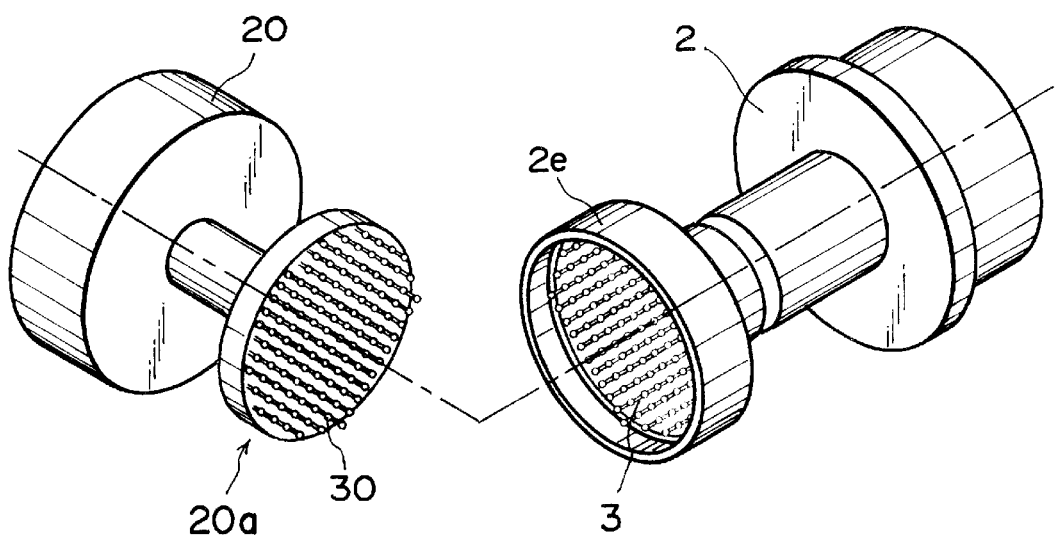
FIG. 52 is a perspective view of a surface fastener means for the drive transmitting portion and the driving force receiving portion according to Embodiment 3.
Figure 53:
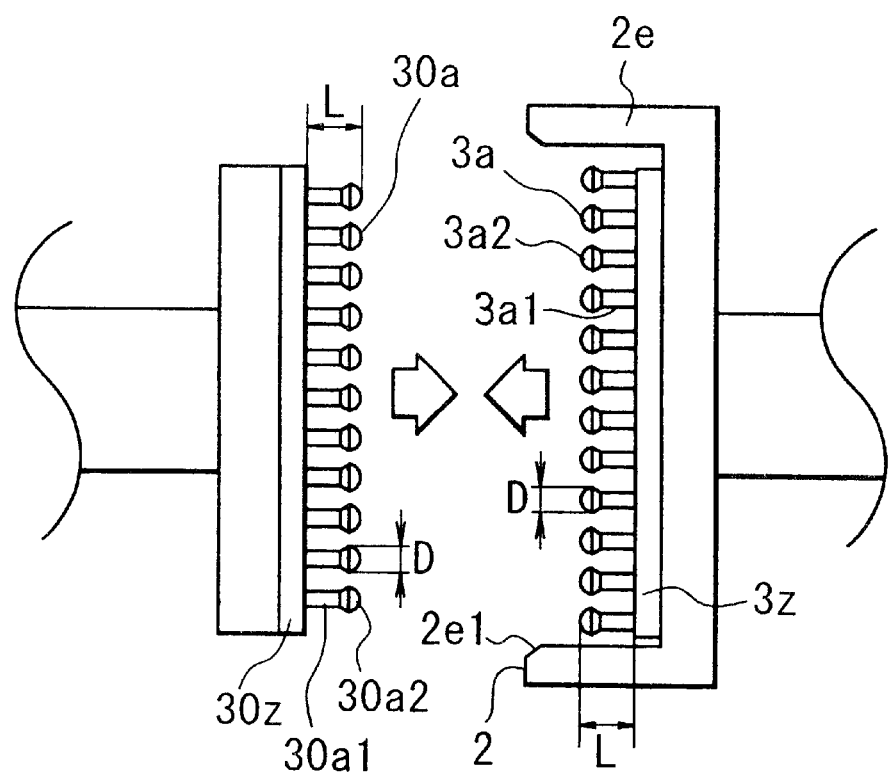
FIG. 53 is an enlarged front view of the surface fastener.

FIG. 52 is an enlarged perspective view of the surface fastener between the driving force transmitting portion of the image forming apparatus main assembly, and the driving force receiving portion of the toner supply container, and FIG. 53 is a sectional view of the surface fastener of the toner supply container.

The surface fastener component 3 constitutes the driving force receiving portion of the toner supply container 1, and receives the driving force from the main assembly side 30 of the surface fastener of the driving force transmitting portion of the toner supplying apparatus.

As for the definition of a surface fastener according to the present invention, it means a connecting means which comprises two sides with a flat functional surface having a plurality of tiny elastically deformable projections, which become hooked with the counterparts on the opposing component of the connecting means, to keep the two sides connected to each other, can be locked, functional surface to functional surface, to each other by pressing one side to the other, functional surface to functional surface. More specifically, each projection 3a of the functional surface comprises a stem portion 3a1 and a head portion 3a2. The head portion 3a2 of the projection 3a is greater in diameter than the stem portion 3a, and is rendered semispherical, on the side opposite to the stem portion 3a1. Thus, as the two sides of the connecting means are pressed against each other, functional surface to functional surface, the projections on the functional surface of one side lock with those on the functional surface of the other side.

Referring to FIG. 53, each projection 3a comprises a stem portion 3a1, and a head portion 3a2 which is greater in external diameter than the stem portion 3a1. The head portion 3a2 is given a spherical curvature, on the side opposite to the stem portion 3a1. The main assembly side 30 of the surface fastener on the main assembly side is basically the same as the toner supply container side 3 of the surface fastener, in that it has a base 30z, and a plurality of projection 30a. The head portion 30a2 of the projection 30a is greater in external diameter than the stem portion 30a1 of the projection 30a. The projections 3a and 30a are integral with the bases 3z and 30z, or are integrally attached to the bases 3z and 30z, respectively. The bases 3z and 30z in this embodiment are shaped like a disk. However, the shapes of the bases 3z and 30z do not need to be limited to that of a disk. For example, they may be that of a hollow cone. When the bases 3z and 30z are in the form of a hollow cone, if the projections 30a on the driving side are on the outward side of the hollow cone, the projections 3a on the driven side will be on the inward side of the hollow cone, and vice versa.

As for one aspect of the essential characteristics of the surface-to-surface fastening means, even though each projection 3a (30a) is very tiny, the two sets of the large number of the projections 3a (30a) engage with each other, providing, as a whole, a large amount of tensile disengagement force. On the other hand, all that has to be done in order to separate the two sides of the surface-to-surface fastening means, is to individually and sequentially disengage each projection 3a (30a) of one side of the surface-to-surface fastening means from only a small number of the projections 30a (3a) of the other side, requiring only a small force. In other words, the surface-to-surface fastening means is characterized in that two sides of the surface-to-surface fastening means can be very easily connected or disconnected.

Another aspect of the essential characteristics of the surface-to-surface fastening means is that when the surface-to-surface fastening means in accordance with the present invention is used as a coupling means, the coupling means does not require the rotational phase synchronization between the two sides of the coupling as is required by a conventional coupling comprising a male side and a female side. This is due to the fact that the large number of very tiny elastically deformable projections 3a (30a), with which the functional surface of each side of the surface-to-surface fastening means, or the coupling means in this embodiment, are evenly distributed across the entirety of the functional surface, and therefore, the two sets of the large number of the projections mesh with each other regardless of the rotational phase synchronization between the two sides; in other words, two sides securely bond with each other. Therefore, when a user replaces the toner bottle 1 in the apparatus main assembly with a brand-new toner bottle 1, the user can set the brand-new toner bottle 1 in the apparatus main assembly 100 without being concerned with the rotational phase of the replacement toner bottle 1. In other words, the employment of the surface-to-surface fastening means as a means for coupling the toner bottle 1 with the driving force transmitting portion of the apparatus main assembly 100 drastically improves the operability of the apparatus, and eliminates the coupling failure which results from the synchronism in rotational phase, or the like problems.

The toner supply container side 3 of the surface-to-surface fastening means is attached to the end of the sealing member 2, and engages with the main assembly side 30 of the surface-to-surface fastening means attached to the end of the driving force transmitting portion of the apparatus main assembly 100. It plays a role in transmitting the driving force from the apparatus main assembly 100 to the toner bottle 1 through the sealing member 2.

In this embodiment, the length (L in FIG. 53) of the projection 3a of the toner supply container side 3 of the surface fastener is desired to be in a range of 0.5–5.0 mm, preferably, in a range of 1.0–2.0 mm. The diameter (D in FIG. 53) of the projection 3a is desired to be in a range of 0.1–2.0 mm, preferably, in a range of 0.5–1.0 mm.

As for the material for the surface fastener described above, resinous material such as plastic is desirable, and as for the production method therefor, injection molding is desirable. However, a material and production method other than the above may be employed. The toner supply container side 3 and main assembly side 30 of the surface fastener are required to have a proper amount of elasticity, when they are engaged or disengaged. Therefore, it is preferable that resinous material, for example, polyolefin resin, straight chain polyamide resin such as nylon (commercial name), polypropylene resin, or the like is employed as the material for the two sides 3 and 30 of the surface fastener.

First Barrier Portion

Next, referring to FIGS. 47–53, a first barrier portion 2e of the sealing member 2, which best characterizes this embodiment, will be described.

The basic structures and functions of the sealing member 2, and the toner supply container side 3 and main assembly side 30 of the surface fastener, are as described above. During the replacement of the toner supply container 1, the toner supply container side 3 and main apparatus side 30 of the surface fastener must be disengaged from each other, and in order to disengage them, a substantial amount of load acts upon the two sides 3 and 30. In addition, in the case of the surface fastener in this embodiment, which transmits driving force while the two sides 3 and 30 are in engagement, the two sides 3 and 30 of the surface fastener are subjected to a substantial amount of stress while driving force is transmitted. As the two sides 3 and 30 of the surface fastener are subject to a large amount of stress, some of the very tiny projections 3a (30a) of the two sides 3 and 30 of the surface fastener sometimes partially come off, break, and/or are shaved, becoming fragmentary or fuzzy rubbish (which hereinafter will be referred to as "fastener residue"). If this fastener residue scatters within the electrophotographic image forming apparatus main assembly, it may cause a problem such as production of an unsatisfactory image. As one of the countermeasures for such a problem, it is possible to strengthen the tiny projections themselves and/or the bonding force between the projections 3a (30a) and the base of the two sides 3 and 30 of the surface fastener to prevent the projections 3a (30a) from coming off from the base or being shaved. However, since the projections 3a and 30a are extremely tiny, it is impossible to completely prevent the projections 3a and 30a from leaving residues.

Thus, in this embodiment, the following countermeasure is adopted. Referring to FIGS. 47, 48, and 51, the sealing member 2 is provided with a continuous first barrier which surrounds the toner supply container side 3 of the surface fastener, so that the residues from both sides 3 and 30 of the surface fastener are captured to prevent the residues from scattering within the image forming apparatus. Referring to FIG. 51, this first barrier 2e extends in the direction opposite to the toner bottle main structure, perpendicular to the end surface 2i to which the toner supply container side 3 of the surface fastener is pasted. In this embodiment, the first barrier 2e is cylindrical, and surrounds the toner supply container side 3 of the surface fastener. Thus, the first barrier 2e is perpendicular to the end surface 2i.

Figure 64:
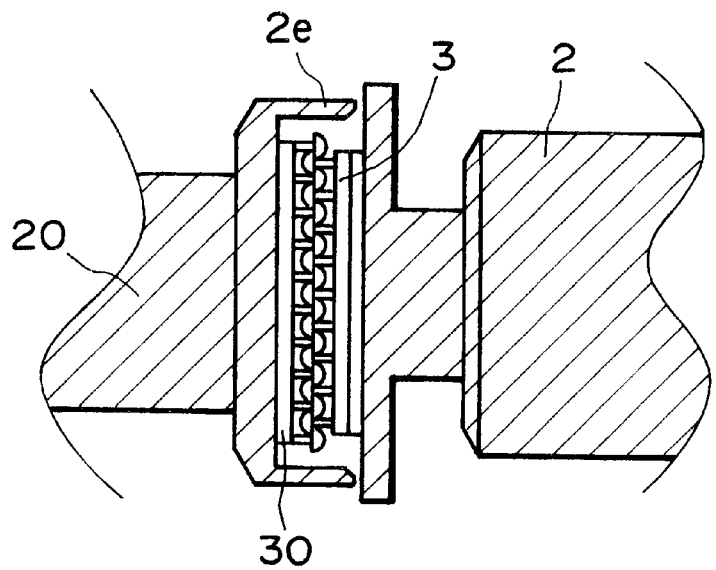
FIG. 64 is a partial enlarged sectional view all of an example of engagement between the main assembly of the image forming apparatus and the toner supply container.

The gist of this embodiment of the present invention is that the foreign substances, which come off from the toner supply container side 3 and main assembly sides 30 of the surface fastener are caught by the barrier 2e, in order to prevent them from scattering within the image forming apparatus main assembly. Although in this embodiment, the first barrier 2e is constructed in a manner to surround the toner supply container side 3 of the surface fastener, the first barrier 2e may be attached to the image forming apparatus side 30 of the surface fastener in a manner to surround the apparatus side 30 as shown in FIG. 64. Such an arrangement is not contrary to the gist of this embodiment of the present invention.

Incidentally, it is normal practice that the image forming apparatus main assembly 100 is replenished with toner several tens of times through the entirety of its service life. Each time the apparatus main assembly 100 is replenished with toner, the residues from the toner supply container side 3 and main assembly sides 30 of the surface fastener accumulate within the enclosure of the first barrier 2e. Thus, if the apparatus side 30 of the surface fastener is provided with the first barrier 2e, there is a possibility that the foreign substances, or the residues, from the container and apparatus main assembly sides 3 and 30 will eventually spill out of the first barrier 2e, and scatter within the image forming apparatus main assembly, resulting in such a problem as formation of an image of inferior quality.

In other words, the placement of the first barrier on the main assembly side degrades an image forming apparatus in terms of reliability. Thus, the foreign substances which have accumulated on the first barrier 2e of the image forming apparatus main assembly 100 side must be regularly removed. Therefore, it is preferable that the first barrier 2e is provided on the toner container side as it is in this embodiment, so that the foreign substances which have collected on the first barrier 2e are removed from within the image forming apparatus main assembly, together with the toner supply container 1 as the toner supply container 1 is replaced with a brand-new one.

Next, the configuration of the first barrier 2e will be described. In this embodiment, the toner container side 3 of the surface fastener is approximately circular, and therefore, the first barrier 2e is rendered also virtually cylindrical to match the circumference of the toner container side 3 of the surface fastener. However, the first barrier 2e may be configured in any shape, for example, triangular or square pillar, as long as the first barrier 2e completely surrounds the toner container side 3 of the surface fastener.

However, when the driving force transmitting portion 20 on the image forming apparatus main assembly side 30 is approximately the same in configuration and size as the driving force receiving portion on the toner supply container side, and is in the noncylindrical form, for example, a user must align a toner supply container in terms of its circumferential direction when mounting the toner supply container. Thus, it is preferable from the standpoint of operability that the driving force transmitting portion 20 and driving force receiving portion be nearly cylindrical.

Regarding the height of the first barrier 2e (measurement H between the hypothetical plane 3g in contact with the entirety of the protrusions 3a of the toner container side 3a of the surface fastener, and the tip 2e2 of the first barrier 2e, in terms of the axial direction of the sealing member 2), if the measurement H is too small, the first barrier 2e is not effective in collecting the residues from the toner container side 3 of the surface fastener, possibly allowing the residues to scatter within the image forming apparatus main assembly. On the contrary, if the measurement H is too large, the internal space of the image forming apparatus main assembly 100 needs to be increased, contradicting the effort to reduce the apparatus size. Thus, the first barrier 2e is preferably extended at least to the aforementioned hypothetical plane 3g, further preferably is extended outward by 1–30 mm, even further preferably, 3–25 mm, beyond the aforementioned hypothetical plane 3g. With the provision of such a structural arrangement, the residues can be very effectively caught without contradicting the effort to reduce the size of the image forming apparatus main assembly 100. Incidentally, the distance the first barrier 2e protrudes has only to be large enough to enable the first barrier 2e to effectively collect the residues from the toner container side 3 and main assembly side 30 of the surface fastener to prevent the residues from scattering in the image forming apparatus main assembly 100. Thus, this distance the first barrier 2e protrudes has little to do with the gist of the present invention. Therefore, this distance may be set to an optimal value for enabling the first barrier 2e to satisfactorily carry out its function. Further, setting the distance the first barrier 2e protrudes, to a value which is large enough for satisfactorily carrying out its function, but is not large enough to contradict the size reduction of the image forming apparatus main assembly 100, makes it easier to align the coupling portions of the toner supply container 1 and image forming apparatus main assembly 100 when mounting the former into the latter. Further, the entire inward edge of the tip of the first barrier 2e may be chamfered to create a guiding surface 2e1 (surface C) as shown in FIG. 52. The provision of the guiding surface 2e1 prevents the toner supply container 1 from squarely colliding with the image forming apparatus main assembly 100 when the former is inserted into the latter, improving the operability.

In addition to the above described structural arrangement, the inward surface of the first barrier 2e (surface which faces the toner supply container side 3 of the surface fastener) may be provided with an adhering means for reliably catching the residues from the toner supply container side 3 and apparatus main assembly side 30 of the surface fastener, since such a means ensures that the residues are prevented from scattering in the image forming apparatus main assembly.

As for the adhering means, any means will suffice as long as it provides a sufficient amount of adhesive force to carry out the above described functions. For example, the adhesive agent may be coated on the first barrier 2e, or commercial double-sided or single-sided adhesive tape may be placed on the first barrier 2e.

Figure 65:
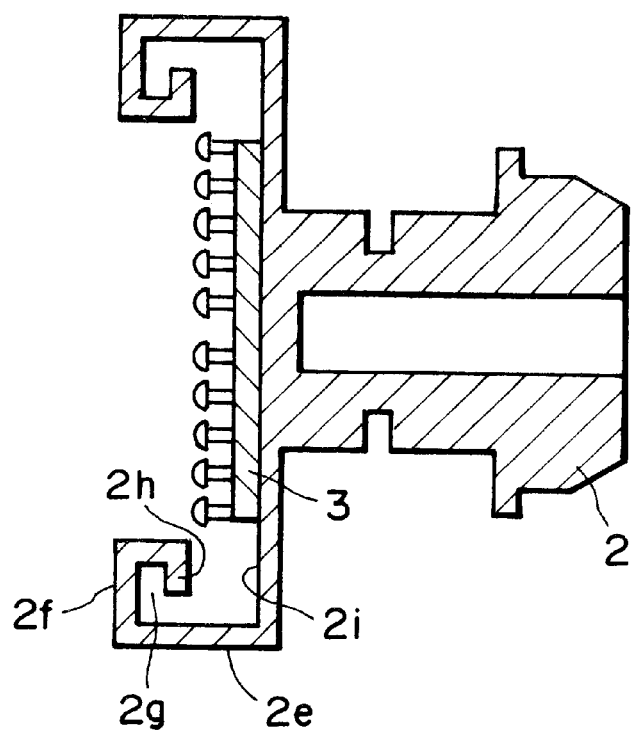
FIG. 65 is a sectional view of another example of a projected portion provided in the sealing member.
Figure 66:
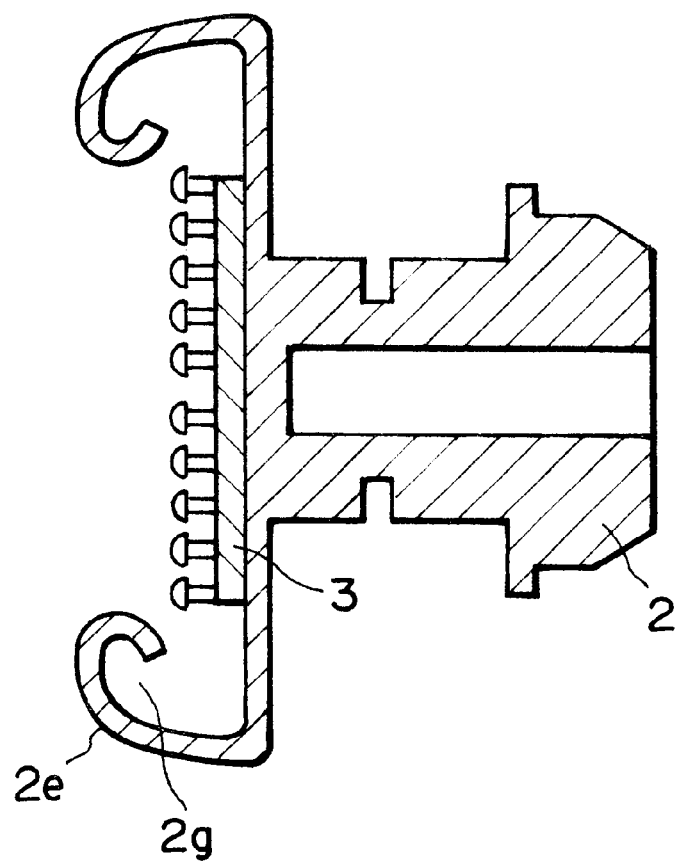
FIG. 66 is a sectional view of another example of a projected portion provided in the sealing member.

Further, referring to FIG. 65, the first barrier 2e may be constructed so that its cross section at a plane inclusive of the axial line of the sealing member 2 looks like the cross section of a pouch. In this case, the residues from the toner supply container side 3 of the surface fastener are virtually confined within the pouch-like portion 2g of the first barrier 2e, being prevented from scattering in the image forming apparatus main assembly, during the mounting or dismounting of the toner supply container 1. Thus, the residues can be prevented from scattering in the image forming apparatus, without providing the inward surface of the first barrier 2e with an adhering means such as those described above; the residues can be prevented from scattering in the image forming apparatus main assembly, with the employment of the inexpensive and simple structural arrangement.

The first barrier 2e may be integrally formed with the sealing member 2, or formed independently from the sealing member 2. In the latter case, the first barrier 2e is attached to the sealing member 2 with the use of adhesive.

Separating Method

Figure 54:
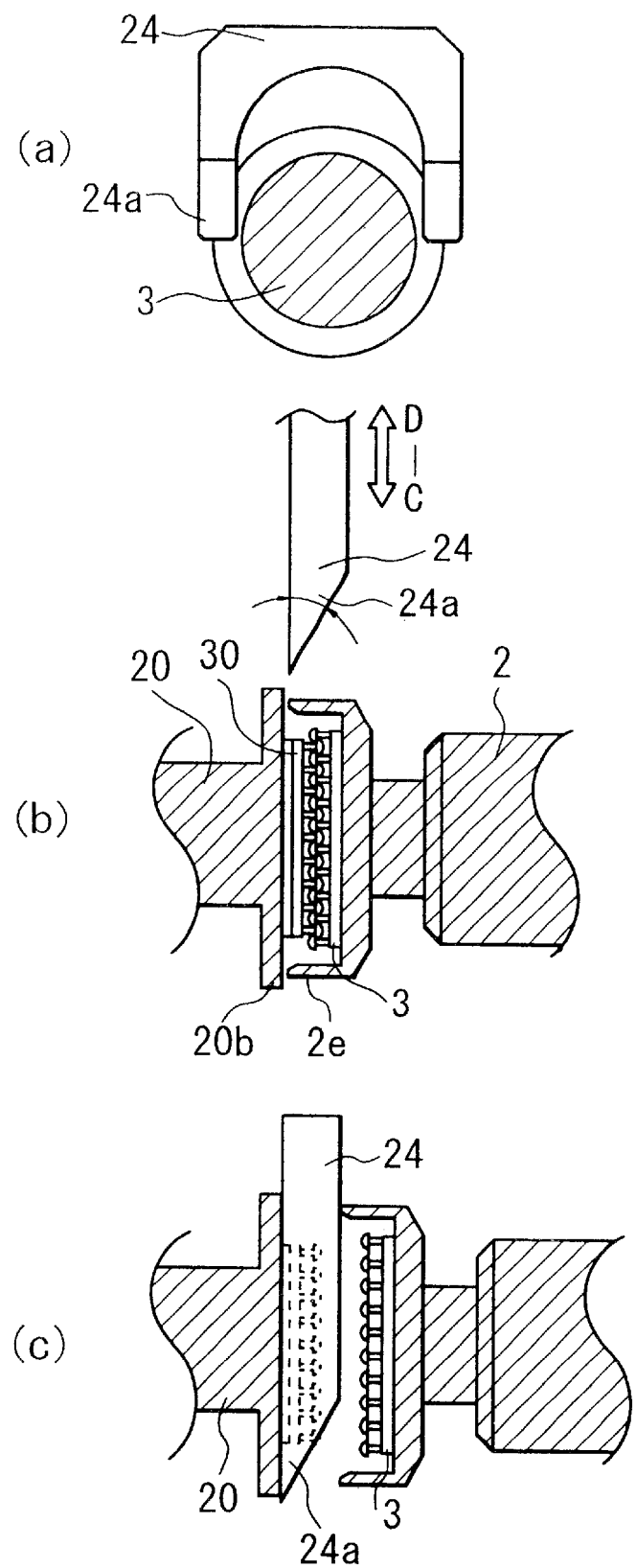
FIG. 54 is side views of the separating mechanism for the fasteners.

Next, referring to FIG. 54, a method for separating the toner supply container side 3 of the surface fastener from the main assembly side 30 of the surface fastener will be described.

After the completion of the toner supplying operation, that is, after the toner bottle 1 becomes empty, the empty toner bottle must be replaced with a brand-new toner bottle. In order to remove the old empty bottle, the sealing member side 3 and main assembly side 30 of the surface fastener, which have been remaining engaged with each other, must be separated from each other.

Referring to FIG. 54(a), a referential code 24 designates a separating member with a wedge-like edge 24a. This separating member 24 is disposed within the image forming apparatus main assembly, and is movable in the directions C and D indicated by a bidirectional arrow mark. In order to separate the toner supply container side 3 of the surface fastener from the main assembly side 30 of the surface fastener, the separating member 24 with the wedge-shaped edge 24a is moved into the interface between the first barrier 2e and the end surface 20b of the driving force transmitting portion 20 of the apparatus main assembly, in the direction C to disengage the toner supply container side 3 of the surface fastener from the main apparatus side 30 of the surface fastener as shown in FIG. 54(c). The end surface 20b of the driving force transmitting portion 20 of the apparatus main assembly is in the form of a disk, and is the same in diameter as is at least the first barrier 2e. As a result, the toner bottle 1 is caused to retract by the separating member 24. The movement of the separating member 24 with the wedge-like edge 24a may be linked to the opening/closing movement of the front cover 100c of the image forming apparatus main assembly 100, so that as the front cover 100c is opened, the separating member 24 with the wedge-like edge 24a descends in the direction C to separate the toner supply container side 3 of the surface fastener from the main assembly side 30 of the surface fastener, whereas as the front cover 100c is closed, the separating member 24 with the wedge-like edge 24a moves in the direction D. Further, instead of linking the movement of the separating member 24 with the wedge-like edge 24a to the movement of the front cover 100c of the apparatus main assembly 100, an additional motor or the like may be provided to move the separating member 24 with the wedge-like edge 24a independently from the movement of the front cover 100c, or a lever (unshown) for manually moving the separating member 24 with the wedge-like edge 24a may be provided. In other words, it does not matter how the separating member 24 with the wedge-like edge 24a is moved.

Figure 55:
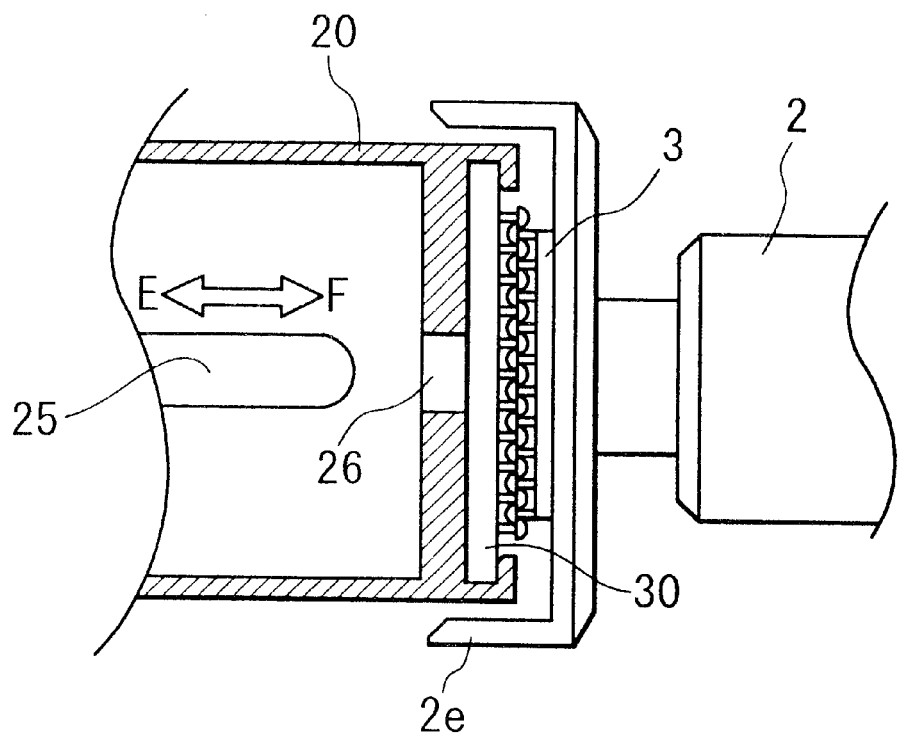
FIG. 55 is a side view of another example of the separating means for the surface fastener.
Figure 56:
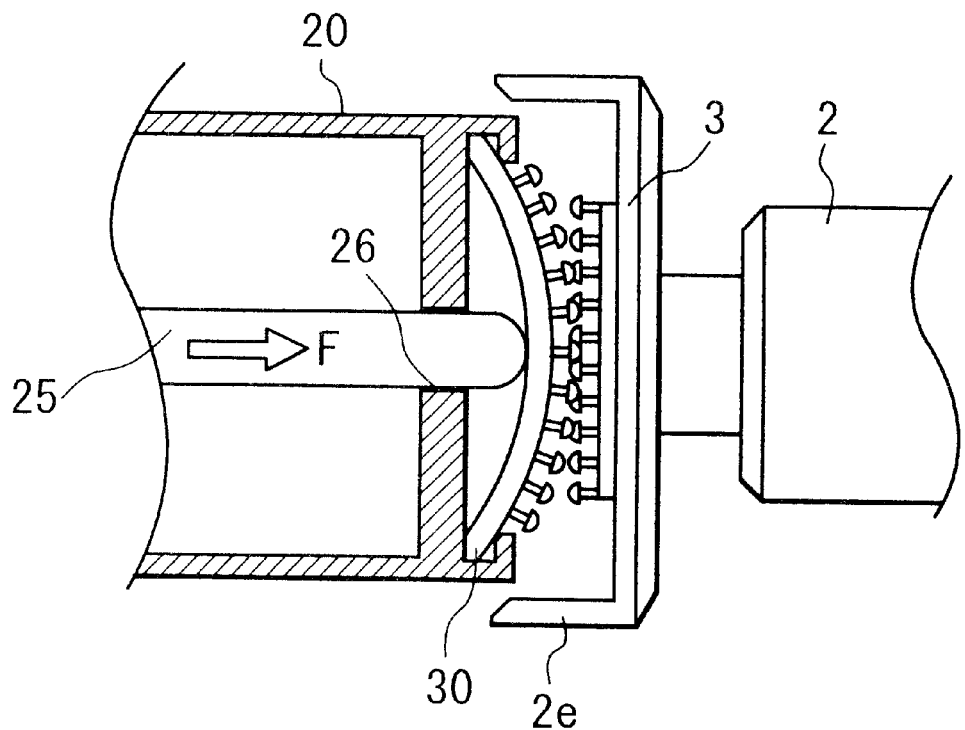
FIG. 56 is a side view of a further example of the separating means for the surface fastener.
Figure 57:
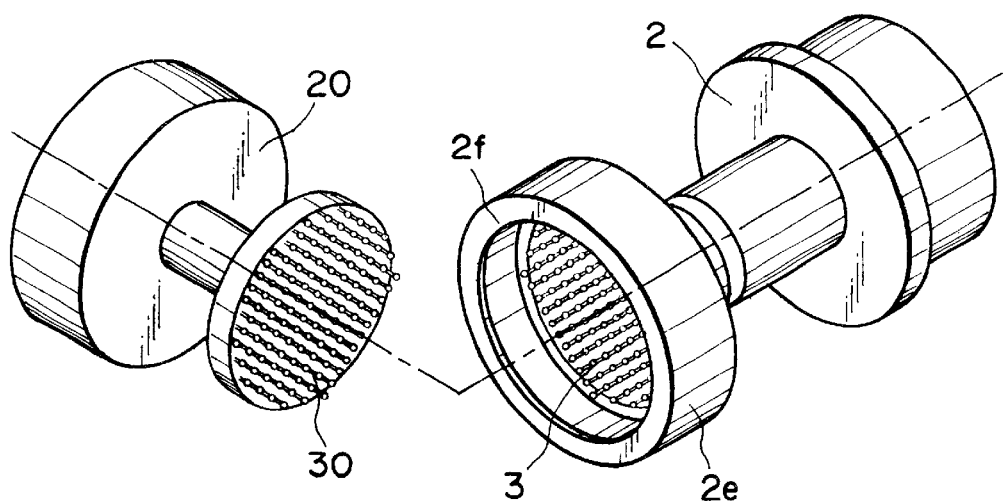
FIG. 57 is a perspective view of fastener means for the drive transmitting portion.
Figure 58:
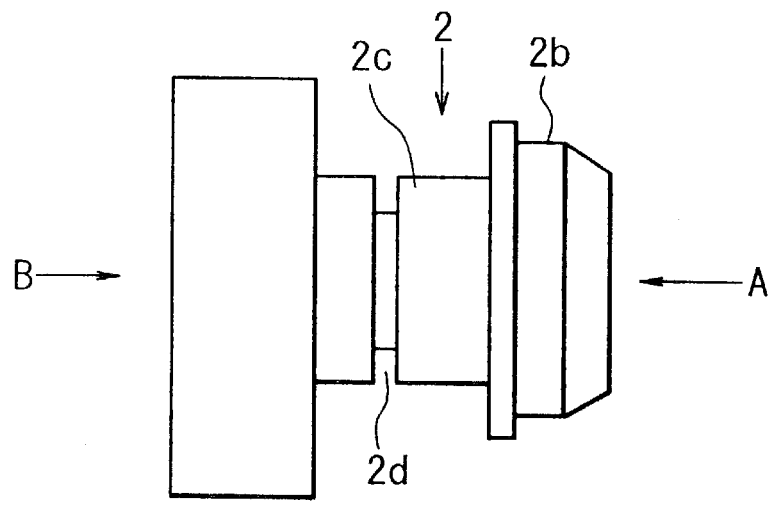
FIG. 58 is a front view of a sealing member of the toner supply container.
Figure 59:
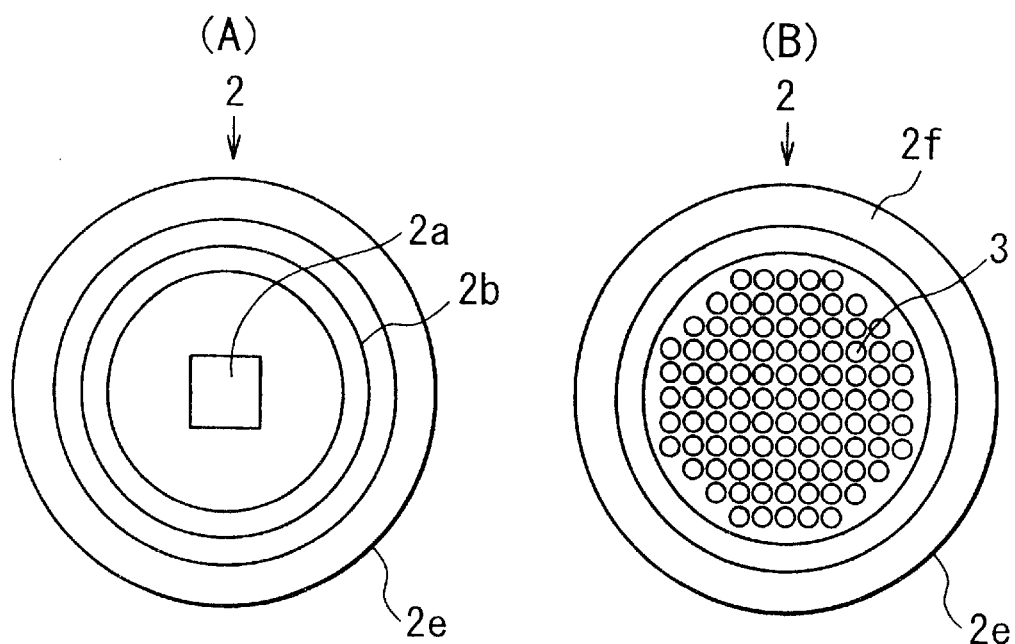
FIG. 59(A) is a view of the sealing member as shown in FIG. 58 as seen in the direction of arrow A.
FIG. 59(B) is a view of the sealing member as shown in FIG. 58 in the direction arrow B.

Next, referring to FIGS. 55 and 56, another method for separating the toner supply container side 3 and main assembly side 30 of the surface fastener will be described.

According to this method, the driving portion 20 of the apparatus main assembly 100 is provided with a pushing rod 25, which is disposed on the rear side of the driving portion 20. This pushing rod 25 is enabled to move in the directions E and F indicated by a double-headed arrow. Further, the end wall of the driving portion 20, to which the apparatus main assembly side 30 of the surface fastener is attached, is provided with a through hole, which is located in the center of the wall. In order to separate the main assembly side 30 of the surface fastener from the toner supply container side 3 of the surface fastener, the pushing rod 25 is moved in the direction F from the base side of the main assembly side 30 as shown in FIG. 56, to push the main assembly side 30. As a result, the main assembly side 30 is warped in a manner to spherically bulge toward the toner supply container side 3 as shown in FIG. 56. Since the main assembly side 30 is formed of resin, it elastically deforms, causing the projections 30a of the main assembly side 30 to individually and sequentially disengage from their counterparts on the toner supply container side 3, starting from the peripheries of the surface fastener. As a result, the main assembly side 30 becomes separated from the toner supply container side 3.

Obviously, the above described two methods for separating the toner supply container side 3 and main assembly side 30 of the surface fastener may be employed in combination. When the two methods are employed in combination, first, the main assembly side 30 is pushed out by the pushing rod 25 to semispherically warp the main assembly side 30 toward the toner supply container side 3, and then, the two sides 30 and 3 of the surface fastener are separated by the above described separating member 24 with the wedge-like edge 24a. Thus, the two sides 30 and 3 of the surface fastener are separated more smoothly, that is, in an effortless manner.

According to the present invention, there are no specific requirements regarding the above described separating method. In other words, the employment of a separating method other than the above described one does not cause any problem, which is obvious.

Embodiment 4

FIGS. 57 to 61 show the fourth embodiment of the present invention. This embodiment is substantially different from the above described third embodiment in that the sealing member 2 is provided with a second barrier 2f in addition to the above described first barrier 2e. Otherwise, this embodiment is the same in structure as the preceding embodiments.

The second barrier 2f has an effect of checking the residues, which have come off from the toner supply side 3 and main assembly side 30 of the surface fastener, and have been caught by the first barrier 2e, to prevent the residues from scattering in the image forming apparatus main assembly.

Referring to FIGS. 57–61, the second barrier 2f is in the form of a disk and inwardly projects from the edge of the first barrier 2, or the adjacencies thereof. In this case, "inwardly" means toward the rotational axis of the sealing member 2.

As for the configuration of the second barrier 2f, in this embodiment, the toner supply container side 3 of the surface fastener is virtually circular, and so is the contour of the edge of the first barrier 2e. Therefore, the second barrier 2f is given a virtually round shape to match their shapes. However, the second barrier 2f may be given any shape according to the configuration of the first barrier 2e, the configuration of the toner supply container side 3 of the surface fastener, and/or constraints related to apparatus design and manufacture, as long as the second barrier 2f continuously extends 360° in the circumferential direction of the first barrier 2e, in contact with the internal surface of the first barrier 2e.

Figure 60:
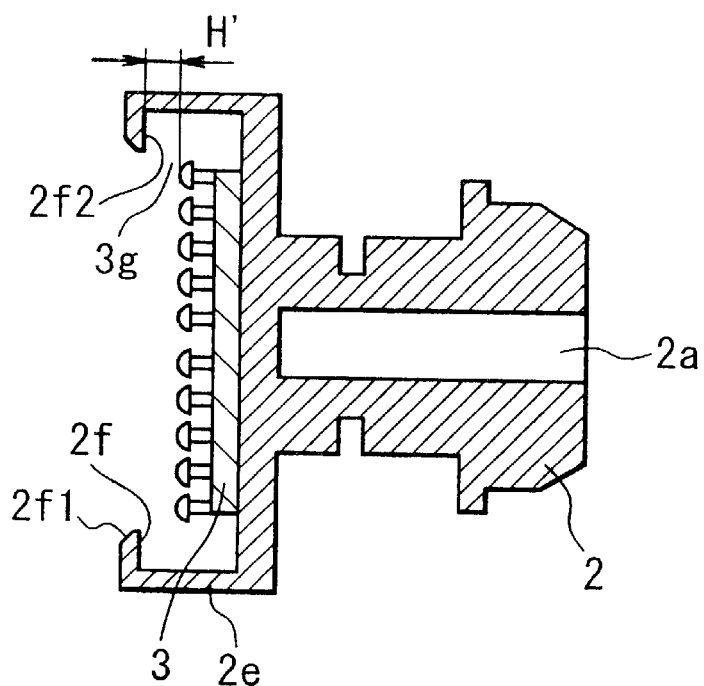
FIG. 60 is a sectional front view of a sealing member.
Figure 61:
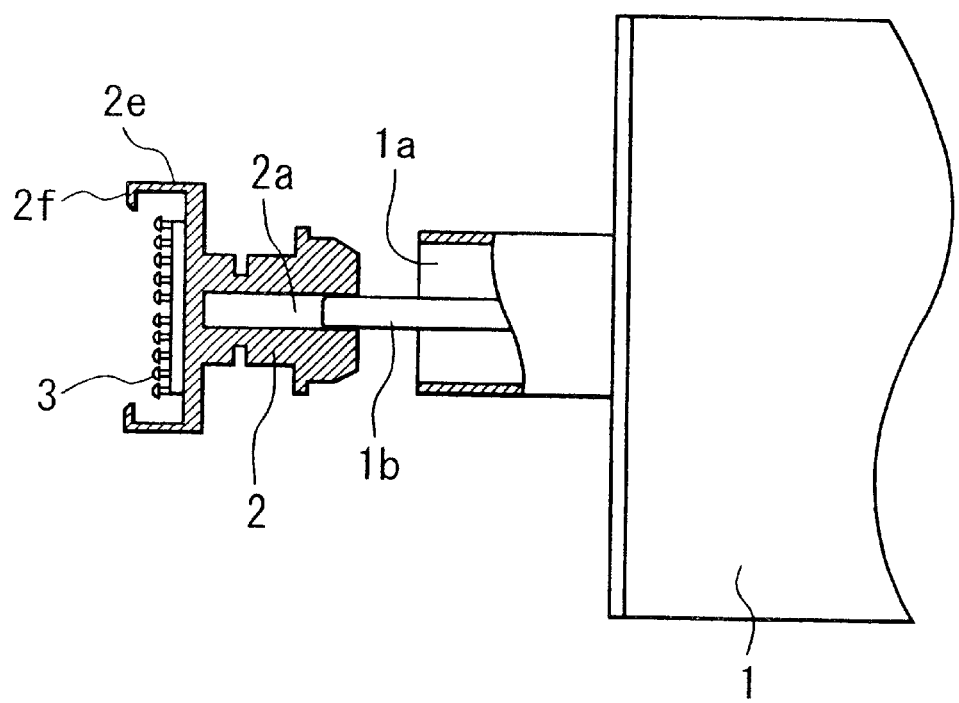
FIG. 61 is a partial enlarged sectional view of a drive transmitting portion of the toner supply container.

However, if the portion of the second barrier 2f, into which the driving force transmitting portion 20 on the image forming apparatus main assembly side is inserted, is rendered approximately the same in size as the driving force transmitting portion 20, it becomes easier to align the coupling portion of the toner supply container 1 and the coupling portion on the image forming apparatus main assembly 100, when mounting the toner supply container 1 into the image forming apparatus main assembly 100. Further, the entire inward edge of the tip of the first barrier 2f may be chamfered to create a guiding surface 2e1 (surface C) as shown in FIG. 60. The provision of the guiding surface 2f1 prevents the toner supply container 1 from squarely colliding with the image forming apparatus main assembly 100 when the former is inserted into the latter, improving the operability.

Further, when the driving force transmitting portion 20 on the image forming apparatus main assembly side is approximately the same in configuration and size as the driving force receiving portion on the toner supply container side, and is in the noncylindrical form, for example, in the form of a triangle or polygonal pillar, a user must align a toner supply container in terms of rotational phase when mounting the toner supply container. Thus, it is preferable from the standpoint of operability that the driving force transmitting portion 20 and driving force receiving portion by virtually cylindrical.

Regarding the distance (measurement H' in FIG. 60) between the inward surface of the second barrier 2f and the aforementioned theoretical contact surface 3g of the toner supply container side 3 of the surface fastener, if the distance H' is too small, the second barrier 2*f* is not effective in collecting the residues from the toner container side 3 and main assembly side 30 of the surface fastener, possibly allowing the residues to scatter within the image forming apparatus main assembly. On the contrary, if the distance H' is too large, the internal space of the image forming apparatus main assembly 100 needs to be increased, contradicting the effort to reduce the apparatus size. Thus, the distance H' between the aforementioned hypothetical engagement surface 3*g*, and the inward surface 2*f*2 of the second barrier 2*f* is desired to be set to approximately 30 mm, preferably, 3–25 mm. With the provision of such a structural arrangement, the residues can be very effectively caught without contracting the effort to reduce the size of the image forming apparatus main assembly 100. Incidentally, the distance H' between the second barrier 2*f* and the toner supply container side 3 of the surface fastener has only to be sufficient to effectively collect the residues from the toner container side 3 and main assembly side 30 of the surface fastener to prevent the residues from scattering in the electrophotographic image forming apparatus main assembly 100. Thus, this distance H' has little to do with the gist of the present invention. Therefore, this distance may be set to an optimal value for enabling the first and second barriers 2*e* and 2*f* to satisfactorily carry out their functions.

In addition to the above described structural arrangement, at least one of the inward surfaces of the first barrier 2*e* and the inward surface of the second barrier 2*f* (surfaces which face the toner supply container side 3 of the surface fastener) may be provided with an adhering means for reliably catching the residues from the toner supply container side 3 and apparatus main assembly side 30 of the surface fastener, since such a means ensures that the residues are prevented from scattering in the image forming apparatus main assembly.

Further, referring to FIG. 65, the sealing member 2 may be provided with a third barrier 2*h*, which protrudes toward the first barrier 2*e* from the edge of the second barrier 2*f* in the radius direction of the sealing member 2, so that a pouch-like portion 2*g* is formed by the barrier portion of the sealing member 2; the cross section of the barrier portion of the sealing member 2 at a plane inclusive of the axial line of the sealing member 2 appears like the cross section of a pouch. The provision of such a structural arrangement further increases the effectiveness of the barrier portion in capturing and retaining the residues from the toner supply container side 3 of the surface fastener. Although the third barrier 2*h* here is constructed so that it appears, in cross section, like a key as shown in FIG. 65, it may be constructed so that it simply protrudes straight toward the surface 2*i* of the sealing member 2, to which the toner supply container side 3 of the surface fastener is pasted.

Further, although the barrier portion of the sealing member 2 shown in FIG. 65 consists of a plurality of straight walls, it may consists of a curved continuous wall which forms a pouch-like portion 2*g*, or a combination of a straight wall and a curved wall, with no problem.

Further, the barrier portion of the sealing member 2 may be constructed as an integral part of the sealing member 2, or as a single or plurality of pieces independent from the sealing member 2. In the latter case, the barrier portion is attached to the sealing member 2 by gluing or the like method.

Embodiment 5

Figure 62:
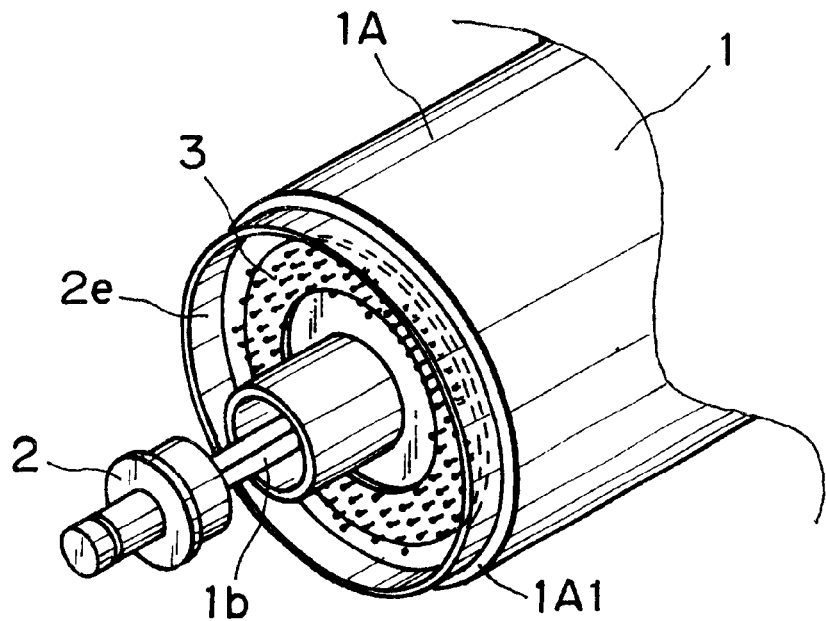
FIG. 62 is a perspective view of a toner supply container according to Embodiment 3 of the presentation.
Figure 63:
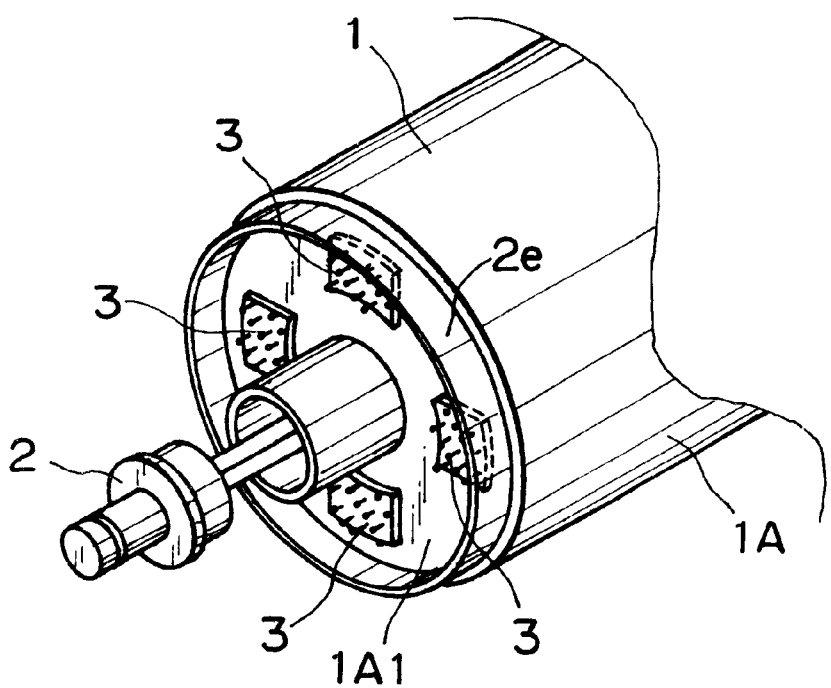
FIG. 63 is a perspective view of a toner supply container according to Embodiment 3 of the presentation.

FIGS. 62 and 63 show the fifth embodiment of the present invention. In this case, the toner supply container side 3 of the surface fastener is attached to a part of the toner supply container, other than the sealing member 2, and the positions of the first and second barriers 2*e* and 2*f* have been changed according to the position of the toner supply container side 3 of the surface fastener. Otherwise, the fifth embodiment is the same as the preceding embodiments.

Thus, referring to FIGS. 62 and 63, the toner supply container side 3 of the surface fastener, and the first barrier 2*e*, will be described regarding their structures and positionings.

According to the present invention, the structure and positioning of the toner supply container side 3 of the surface fastener, and those of the first barrier 2*e*, are not limited to such that the toner supply container side 3 and the first barrier 2*e* are placed at the end of the sealing member 2 as described before. The locations to which the toner supply container side 3 of the surface fastener and the first barrier 2*e* are placed may be freely selected as long as the locations allows driving force to be transmitted to the toner bottle 1.

For example, FIG. 62 shows a case in which the toner supply container side 3 of the surface fastener has been constructed and positioned to cover virtually the entirety of one of the end surfaces 1A1 of the toner bottle main structure 1A, and the first barrier 2*e* also has been constructed and positioned to entirely surround the edge of the end surface 1A1 of the toner bottle main structure 1A.

FIG. 63 shows a case in which the toner supply container side 3 of the surface fastener has been constructed as a plurality of pieces 3, and attached to one of the end surfaces 1A1 of the toner bottle main structure 1A, being evenly distributed in the circumferential direction, and the first barrier 2*e* has been constructed and positioned to entirely surround the edge of the end surface 1A1 of the toner bottle main structure 1A.

As is evident from the above described cases, the location on the toner bottle 1*q*, to which the toner supply container side 3 of the surface fastener is attached, may be freely selected, depending on toner container configuration. However, when the toner supply container side 3 is divided into the plurality of pieces as shown in FIG. 63, the main assembly side 30, or the counterpart of the toner supply container side 3, of the surface fastener must be constructed so that it covers virtually the entirety of the end surface of the driving portion 20 on the main assembly side as shown in FIG. 62.

Obviously, the first barrier 2*e* is desired to be constructed and positioned to entirely surround the toner supply container side 3 of the surface fastener along its edge.

Except for the above described structure and positioning, the first barrier 2*e* in this fifth embodiment is virtually the same as those in the first and second embodiment. Further, in this embodiment, the sealing member 2 is provided with only the first barrier 2*e*. Preferably, however, the sealing member 2 is desired to be provided with the second barrier 2*f*, as in the first and second embodiments, to ensure that the residues from the toner supply container side 3 and main assembly side 30 of the surface fastener are prevented from scattering. Further, the employment of the driving force transmitting mechanism does not need to be limited to the driving force transmission between the image forming apparatus main assembly and toner supply container; it may be employed for transmitting driving force between the components in an apparatus other than an image forming apparatus.

As is evident from the foregoing descriptions, the third to fifth embodiments demonstrate the following effects:

(1) Should fragments, fuzz, and the like result from the surface fastener, they can be efficiently captured; such a problem as formation of an image of inferior quality can be prevented by the employment of an inexpensive structural arrangement;

(2) The opposing sides of the surface fastener can be easily aligned with each other, using an expensive structural arrangement, when mounting a toner supply container;

(3) During an operation for replacing a used toner supply container with a brand-new one, it is unnecessary to align the rotational axis of the brand-new toner supply container relative to that of the apparatus main assembly as it was in the past. Thus, as a user simply places the brand-new toner supply container into the main assembly of an image forming apparatus, and closes the front cover of the apparatus, the toner supply container engages with the driving portion of the apparatus main assembly, and is readied for toner delivery, improving drastically toner replenishment efficiency.

(4) The employment of a surface fastener as a means for transmitting driving force to a toner supply container ensures that the driving force receiving portion of the toner supply container is simply and surely engaged with the diving force transmitting portion of the image forming apparatus main assembly by simply inserting the toner supply container into the apparatus main assembly. Therefore, engagement failures such as those which occurred with the conventional means, do not occur. Thus, it is possible to provide a highly reliably toner supply container which assures toner replenishment.

(5) The employment of a surface fastener as the driving force transmitting portion between a toner supply container and the image forming apparatus main assembly drastically reduces the thickness of the structures of the driving force transmitting portion, driving force receiving portion, and their adjacencies, in terms of the rotational axis direction, substantially contributing to the saving of the internal space of the image forming apparatus main assembly and the size reduction of the image forming apparatus main assembly.

(6) The employment of a surface fastener as a means for transmitting driving force to a toner supply container eliminates a complicated structural arrangement required by a conventional coupling, that is, a combination of a member with a projection and a member with a recess. Thus, it substantially contributes to the cost reduction of the driving force receiving portion.

Other Embodiments

Next, the process cartridge B and the other image forming apparatus components in accordance with the present invention will be described.

In the preceding embodiments, the process cartridge B was for forming a monochromatic image. However, the present invention is also applicable, with desirable results, to a process cartridge which comprises a plurality of developing means and forms a multicolor image (for example, dichromatic image, trichromatic image, or full-color image).

Further, the present invention is compatible with to various well-known developing methods, for example, two component magnetic brush developing method, cascade developing method, touch-down developing method, and cloud developing method.

The electrophotographic photoconductive member to which the present invention is applicable is as follows. As for the photoconductive material compatible with the present invention, it is possible to list amorphous silicon, amorphous selenium, zinc oxide, titanium oxide, organic photoconductor (OPC), and the like. As for the configuration of the base member on which the photoconductive material is placed, the base member may be a rotatable member such as a drum or a belt, or may be in the form of a sheet. Generally, a drum or a belt is employed. In the case of a drum type photoconductive member, a photoconductive member is fitted around a cylindrical base formed of aluminum alloy or the like, or photoconductive material is coated on the peripheral surface of a cylindrical base formed of aluminum alloy or the like.

Regarding the charging means, one of the so-called contact charging methods was used in the preceding embodiments. Obviously, however, one of the conventional charging methods other than the contact charging methods may be used. According to one of such methods, a piece of tungsten wire is surrounded on three sides by a metallic shield such as aluminum shield; positive or negative ions generated by applying high voltage to the tungsten wire are moved to the surface of the photoconductive drum to uniformly charge the peripheral surface of the photoconductive drum.

The charging means may be in the form of a blade (charge blade), a pad, a block, a rod, a wire, or the like, in addition to the aforementioned roller.

As for the cleaning method for cleaning the toner particles remaining on the photoconductive drum, the cleaning means may be in the form of a blade, a fur brush, a magnetic brush, or the like.

The above described process cartridge means a cartridge which is removably mountable in an image forming apparatus and comprises at least an electrophotographic photoconductive member as an image bearing member. The process cartridge may include at least one processing means, in addition to the photoconductive member. In other words, in addition to the above described process cartridge, the process cartridge may be a cartridge which is removably mountable in the main assembly of an image forming apparatus, and in which an electrophotographic photoconductive member and a charging member are integrally disposed; a cartridge which is removably mountable in the main assembly of an image forming apparatus, and in which an electrophotographic photoconductive member and a developing member are integrally disposed; a cartridge which is removably mountable in the main assembly of an image forming apparatus, and in which an electrophotographic photoconductive member and a cleaning member are integrally disposed; and a cartridge which is removably mountable in the main assembly of an image forming apparatus, and in which an electrophotographic photoconductive member and a combination of two or more of the aforementioned processing means, are integrally disposed.

In other words, the aforementioned process cartridge means: a cartridge which is removably mountable in the main assembly of an image forming apparatus, and in which a charging means, a developing means or a cleaning means, and an electrophotographic photoconductive member, are integrally disposed; a cartridge which is removably mountable in the main assembly of an image forming apparatus, and in which at least one means among a charging means, a developing means, and a cleaning means, and an electrophotographic photoconductive member are integrally disposed; and a cartridge which is removably mountable in the main assembly of an image forming apparatus, and in which an electrophotographic photoconductive member and at least a developing means are integrally disposed.

The present invention is also applicable to a development cartridge which is removably mountable in the main assembly of an image forming apparatus, and in which a developing member and developer are integrally disposed.

Further, in the preceding embodiments, a laser beam printer was referred to as an image forming apparatus. However, the application of the present invention does not need to be limited to a laser beam printer. In other words, the present invention is applicable to an image forming apparatus other than a laser beam printer, for example, an electrophotographic copying machine, a facsimile machine, a word processor, and the like, which is obvious.

Further, the application of a driving force transmitting mechanism in accordance with the present invention, in which driving force is transmitted through the engagement between the two sides of a surface fastener, does not need to be limited to the driving force transmission between the main assembly of an image forming apparatus, and a process cartridge. In other words, a driving force transmitting mechanism in accordance with the present invention can also be used for transmitting driving force between the two components in an apparatus other than an image forming apparatus.

In the foregoing embodiments, it is preferable that the loop side of the surface fastener in the form of a hook-and-loop fastener is provided in the main assembly of the apparatus, since then the chips produced from the hook portions are less scattered in the main assembly. in addition, the barrier or extended portion is preferably provided on the hook side of the fastener, since the hooks are reltively easyly worn to produce chips. it is preferable that the barrier or the extended portion is provided in the main assembly of the apparatus in the case of the step-stem type fastener, since then the chips produced from the stem is less scattered in the main assembly of the apparatus.

While the invention has been described with reference to the structures disclosed herein, it is not confined to the details set forth, and this application is intended to cover such modifications or changes as may come within the purposes of the improvements or the scope of the following claims.

What is claimed is:

1. A developer supply container, detachably mountable to an image forming apparatus, for supplying a developer to the image forming apparatus, said developer supply container comprising:
   a container body for containing a developer, said container body being provided with an opening for permitting discharge of the developer;
   a driving force receiving portion for receiving a driving force for feeding the developer in said container body toward said opening, the driving force being supplied from a driving force supplying portion provided in the image forming apparatus; and
   a surface fastener, provided on said driving force receiving portion, for disengageable engagement with a surface fastener provided on the driving force supplying portion by relative movement toward each other.

2. A developer supply container according to claim 1, wherein each of said surface fastener of said driving force receiving portion and the surface fastener of the driving force supplying portion includes a plurality of elastically deformable projections, which are engageable with each other.

3. A developer supply container according to claim 2, wherein each projection of said plurality of projections of said surface fastener of said driving force receiving portion and the plurality of projections of the surface fastener of the driving force supplying portion is thicker at a free end than at a base end thereof.

4. A developer supply container according to claim 2, wherein one of said plurality of projections of said surface fastener of said driving force receiving portion and the plurality of the projections of the surface fastener of the driving force supplying portion are configured in the form of loops, and
   wherein the other of said plurality of projections of said surface fastener of said driving force receiving portion and the plurality of projections of the surface fastener of the driving force applying portion are configured in the form of hooks.

5. A developer supply container according to claim 2, wherein each projection of said plurality of projections of said surface fastener of said driving force receiving portion and the plurality of projections of the surface fastener of the driving force supplying portion is configured in the form of a frustum of a pyramid.

6. A developer supply container according to claim 2, wherein a free end of each projection of said plurality of projections of said surface fastener of said driving force receiving portion and the plurality of projections of the surface fastener of the driving force supplying portion is rounded.

7. A developer supply container according to claim 1, further comprising a collecting portion for receiving dropouts from said surface fastener of said driving force receiving portion.

8. A developer supply container according to claim 7, wherein said collecting portion comprises a barrier for collecting dropouts at an end portion of said collecting portion.

9. A developer supply container according to claim 7 or 8, wherein said collecting portion surrounds said surface fastner of said driving force receiving portion at a circumference thereof.

10. A developer supply container according to claim 1, further comprising:
    a sealing member for unsealably sealing said opening; and
    a feeding member for feeding the developer in said container body toward said opening,
    wherein said feeding member is integrally rotatable with said sealing member by the driving force received by said driving force receiving portion.

11. A developer supply container according to claim 1, wherein said surface fastener of said driving force receiving portion is disposed at a leading end side of said developer supply container in a mounting direction thereof relative to the image forming apparatus.

12. A developer supply container according to claim 1, wherein said container body has a cylindrical shape.

13. An image forming unit detachably mountable to an image forming apparatus, said image forming unit comprising:
    an image bearing member;
    a driving force receiving portion for receiving a driving force for rotating said image bearing member, the driving force being supplied from a driving force supplying portion provided in the image forming apparatus; and
    a surface fastener, provided on said driving force receiving portion, for disengageable engagement with a surface fastener provided on the driving force supplying portion by relative movement toward each other.

14. An image forming unit according to claim 13, wherein each of said surface fastener of said driving force receiving portion and the surface fastener of the driving force supplying portion includes a plurality of elastically deformable projections, which are engageable with each other.

15. An image forming unit according to claim 14, wherein each projection of said plurality of projections of said surface fastener of said driving force receiving portion and the plurality of projection of the driving force supplying portion is thicker at a free end than at a base end thereof.

16. An image forming unit according to claim 14, wherein one of said plurality of projections of said surface fastener of said driving force receiving portion and the plurality of projections of the surface fastener of the driving force supplying portion are configured in the form of loops, and wherein the other of said plurality of projections of said surface fastener of said driving force receiving portion and the plurality of projections of the surface fastener of the driving force supply portion are configured in the form of hooks.

17. An image forming unit according to claim 14, wherein each projection of said plurality of projections of said surface fastener of said driving force receiving portion and the plurality of projections of the surface fastener of the driving force supplying portion is configured in the form of frustrum of a pyramid.

18. An image forming unit according to claim 14, wherein a free end of each projection of said plurality of projections of said surface fastener of said driving force receiving portion and the plurality of projections of the surface fastener of the driving force supplying portion is rounded.

19. An image forming unit according to claim 13, further comprising a collecting portion for receiving dropouts from said surface fastener of said driving force receiving portion.

20. An image forming unit according to claim 19, wherein said collecting portion comprises a barrier for collecting dropouts at an end portion of said collecting portion.

21. An image forming unit according to claim 19, wherein said collecting portion surrounds said surface fastener of said driving force receiving portion at a circumference thereof.

22. An image forming unit according to claim 13, further comprising as a unit at least one of developing means for developing a latent image on said image bearing member, charging means for electrically charging a surface of said image bearing member, and cleaning means for cleaning the surface of said image bearing member.

23. A developer supply container according to claim 11, wherein a mounting direction of said developer supply container relative to the image forming apparatus is a longitudinal direction of said developer supply container.

24. A developer supply container according to claim 10, wherein said opening is capable of being opened automatically using a connecting force between said surface fastener of said driving force receiving portion and the surface fastener of the driving force supplying portion.

25. A developer supply container according to claim 1, further comprising a feeding portion, provided in said container body, for feeding the developer toward said opening in accordance with rotation of said container body by the driving force.

26. A developer supply container according to claim 25, wherein said container body has a cylindrical shape.

27. A developer supply container for supplying a developer to an image forming apparatus, said developer supply container being detachably mountable to the image forming apparatus, said developer supply container comprising:

a container body for containing a developer;

an opening, provided in said container body, for permitting discharge of the developer from said developer supply container;

a sealing member for unsealably sealing said opening; and a connecting portion for connecting a connecting member of the image forming apparatus with a mounting operation of said developer supply container relative to the image forming apparatus, said connecting portion being movable integrally with said sealing member, wherein said connecting portion is capable of receiving a force for unsealing said sealing member by moving said sealing member relative to said container body in a direction away from said container body, and wherein said connecting portion includes a surface fastener disconnectably connectable with a surface fastener provided in the connecting member of the image forming apparatus.

28. A developer supply container according to claim 27, wherein each of said surface fastener of said connecting portion and the surface fastener of the connecting member includes a plurality of elastically deformable projections, which are engageable with each other.

29. A developer supply container according to claim 28, wherein each projection of said plurality of projections of said surface fastener of said connecting portion and the plurality of projections of the surface fastener of the connecting member is thicker at a free end than at a base end thereof.

30. A developer supply container according to claim 27, wherein one of said plurality of projections of said surface fastener of said connecting portion and the plurality of the projections of the surface fastener of the connecting member are configured in the form of loops, and wherein the other of said plurality of projections of said surface fastener of said connecting portion and the plurality of projections of the surface fastener of the connecting member are configured in the form of hooks.

31. A developer supply container according to claim 27, wherein each projection of said plurality of projections of said surface fastener of said connecting portion and the plurality of projections of the surface fastener of the connecting member is configured in the form of a frustrum of a pyramid.

32. A developer supply container according to claim 27, wherein a free end of each projection of said plurality of projections of said surface fastener of said connecting portion and the plurality of projections of the surface fastener of the connecting member is rounded.

33. A developer supply container according to claim 26, further comprising a collecting portion for receiving dropouts from said surface fastener of said connecting portion.

34. A developer supply container according to claim 33, wherein said collecting portion comprises a barrier for collecting dropouts at an end portion of said collecting portion.

35. A developer supply container according to claim 33 or 34, wherein said collecting portion surrounds said surface fastener of said driving force connecting portion at a circumference thereof.

36. A developer supply container according to claim 27, wherein said surface fastener of said connecting portion is disposed at a leading end side of said developer supply container in a mounting direction thereof relative to the image forming apparatus.

37. A developer supply container according to claim 27, further comprising a feeding portion, provided in said container body, for feeding the developer toward said opening in accordance with rotation of said container body by the driving force.

38. A developer supply container according to claim 37, wherein said feeding portion is rotatable integrally with said container body.

39. a developer supply container according to claim 37, wherein said container body has a cylindrical shape.

* * * * *